(12) United States Patent
Jones

(10) Patent No.: US 8,130,186 B2
(45) Date of Patent: Mar. 6, 2012

(54) DISPLAY DEVICE

(75) Inventor: John C Jones, Malvern (GB)

(73) Assignee: ZBD Displays Limited, Malvern, Worcestershire (GB)

( * ) Notice: Subject to any disclaimer, the term of this patent is extended or adjusted under 35 U.S.C. 154(b) by 1411 days.

(21) Appl. No.: 11/635,083

(22) Filed: Dec. 7, 2006

(65) Prior Publication Data

US 2007/0132685 A1 Jun. 14, 2007

Related U.S. Application Data

(63) Continuation of application No. 10/512,457, filed as application No. PCT/GB03/02354 on May 29, 2003, now abandoned.

(60) Provisional application No. 60/383,610, filed on May 29, 2002.

(51) Int. Cl.
  *G09G 3/36* (2006.01)
  *G09G 3/34* (2006.01)
  *G02F 1/1333* (2006.01)
  *G02F 1/1337* (2006.01)
  *G02B 26/00* (2006.01)

(52) U.S. Cl. ............. 345/87; 345/97; 345/107; 349/85; 349/132; 359/296

(58) Field of Classification Search ............... 345/84–93
See application file for complete search history.

(56) References Cited

U.S. PATENT DOCUMENTS

| | | | |
|---|---|---|---|
| 4,712,877 A | 12/1987 | Inaba | |
| 5,128,663 A | 7/1992 | Coulson | 345/94 |
| 5,379,138 A | 1/1995 | Okada | 349/173 |
| 5,508,711 A * | 4/1996 | Okada | 345/97 |
| 5,724,060 A | 3/1998 | Graham et al. | 345/97 |
| 5,796,459 A * | 8/1998 | Bryan-Brown et al. | 349/132 |
| 6,057,821 A * | 5/2000 | Hughes et al. | 345/97 |
| 6,249,271 B1 * | 6/2001 | Albert et al. | 345/107 |
| 6,445,489 B1 * | 9/2002 | Jacobson et al. | 359/296 |
| 6,639,578 B1 * | 10/2003 | Comiskey et al. | 345/107 |

FOREIGN PATENT DOCUMENTS

| | | | |
|---|---|---|---|
| JP | 03-174514 | * | 7/1991 |
| WO | WO 02/08825 | | 1/2002 |

* cited by examiner

*Primary Examiner* — Alexander S Beck
*Assistant Examiner* — Charles Hicks
(74) *Attorney, Agent, or Firm* — Nixon & Vanderhye P.C.

(57) ABSTRACT

A device is described that comprises a layer of material (254) disposed between first and second cell walls (250,252) and is capable of adopting, and being electrically latched between, at least two stable configurations. The layer of material (254) comprises one or more separate electrically addressable regions (270, 272, 274, 276) and addressing means are provided to write to each of said electrically addressable regions using voltage pulses to selectively latch said layer of material as required. The addressing means is arranged to write to each of said one or more separate electrically addressable region using at least first and second latching scans. The first latching scan being arranged to selectively latch material having a latching threshold within a first range and said second latching scan being arranged to selectively latch material having a latching threshold within a second range, wherein said first latching scan is applied prior to application of said second latching scan and said second latching scan is insufficient to latch material having a latching threshold within said first range. A method for addressing a device is also disclosed.

40 Claims, 28 Drawing Sheets

−/−

−/+

+/−

+/+

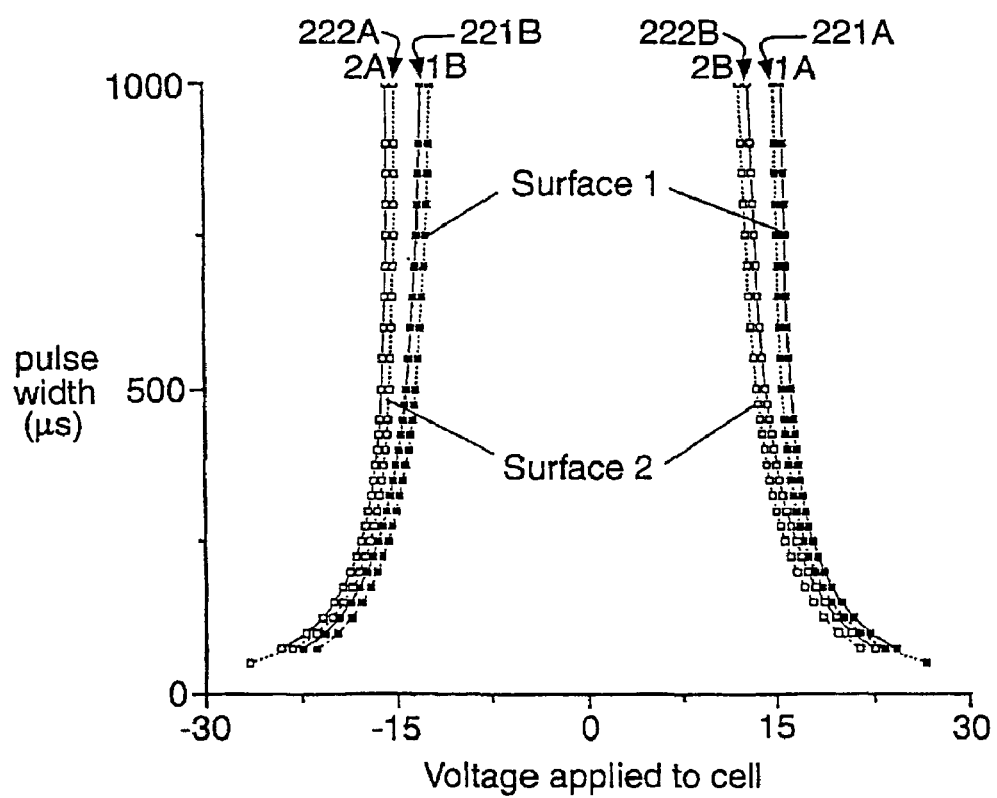

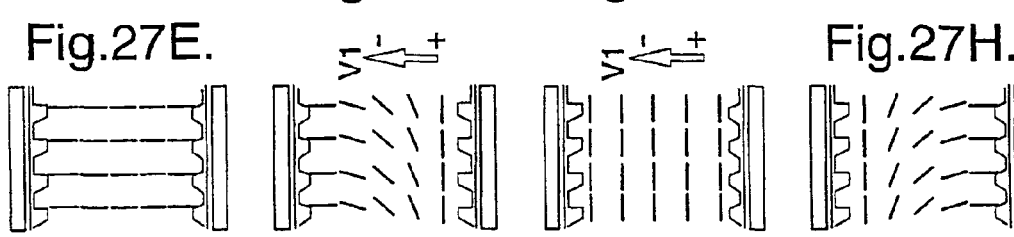
Fig.27E.  Fig.27F.  Fig.27G.  Fig.27H.
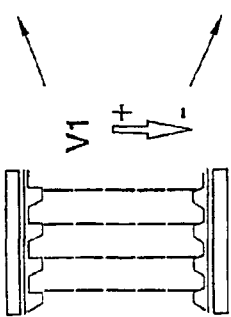
Fig.27C.
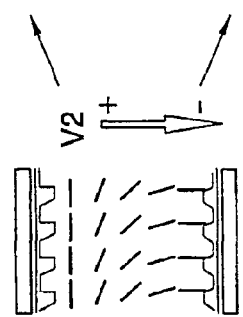
Fig.27D.
Fig.27B.
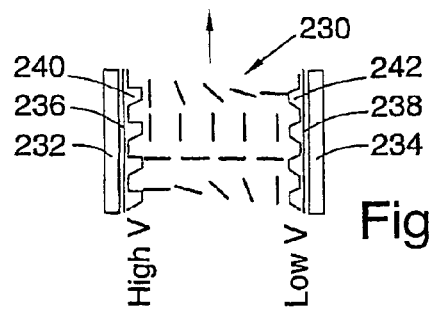
Fig.27A.

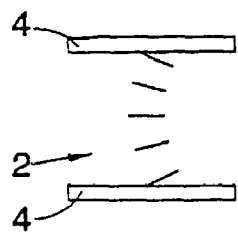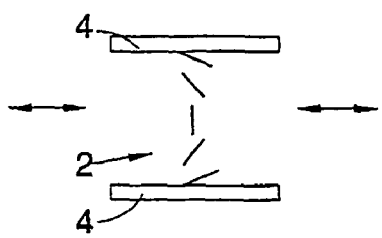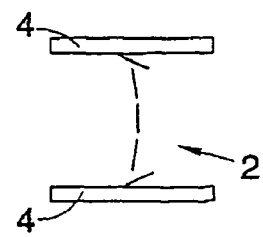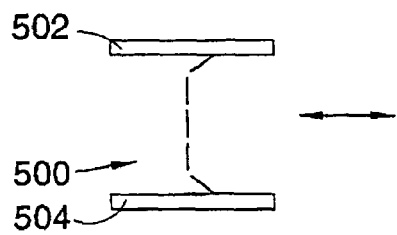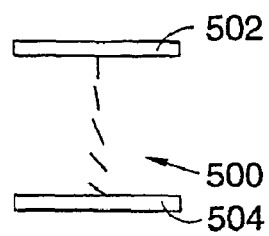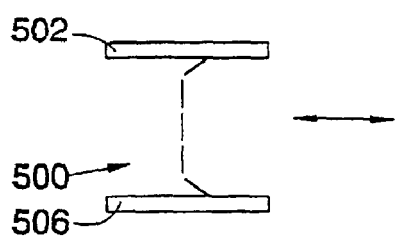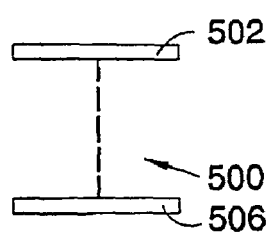

DISPLAY DEVICE

This application is Continuation of application Ser. No. 10/512,457, filed Oct. 26, 2004, now abandoned which is the U.S. national phase of international application PCT/GB03/02354, filed 29 May 2003, which designated the U.S. and claims priority to US Provisional Application No. 60/383,610 filed 29 May 2002. The entire contents of these applications are incorporated herein by reference.

This invention relates to display devices having at least two stable states and more particularly to matrix addressed devices and a method of addressing such devices.

A variety of display devices exist that exhibit two or more states that are stable in the absence of an applied electrical field. The most common devices of this type employ liquid crystal materials. However other devices, such as electrophoretic, electrochromic, micro-electromechanical systems (MEMS), particulate displays, are also known.

Examples of bistable liquid crystal displays include surface stabilised ferroelectric liquid crystal (SSFLC) devices as described by N A Clark and S T Lagerwall, Appl. Phys. Lett., 36, 11, 899 (1980). It has also been shown by Berreman and Heffner in Appl. Phys. Lett., Vol 37, pg 109, 1980 and in patent Applications WO 91/11747 ("Bistable electrochirally controlled liquid crystal optical device") and WO 92/00546 ("Nematic liquid crystal display with surface bistability controlled by a flexoelectric effect") that a nematic liquid crystal material can be switched between two stable states via the use of chiral ions or flexoelectric coupling. A bistable nematic display is also described by Dozov (2003) Proc. SID, pp 946-948. Electrophoretic displays are described by Liang, R. C in (2003) Proc. SID, pp 838-841, and electrochromic displays are also known. Powder based displays of the type described by Hattori et al (2003) Proc. SID, pp 846-849 are also known.

WO 97/14990 teaches how a zenithally bistable device (ZBD) may be constructed using a surface alignment grating of a given design such that nematic liquid crystal molecules can adopt two stable pretilt angles in the same azimuthal plane. One of these states is a high pretilt state, whilst the other is a low pretilt state and a device is described which can adopt, and can be readily switched between, either of the two stable liquid crystal configurations. The two zenithally stable liquid crystal configurations of WO 97/14990 persist after the driving electrical signals have been removed and the device has been shown to be highly resistant to mechanical shock, provide microsecond latching times at low driving voltages (<20V) and allow a high degree of multiplexability; see E. L. Wood et al. "Zenithal bistable device (ZBD) suitable for portable applications", *Proceedings of SID*, 2000, v 31, 11.2, p 124-127 (2000). Recently, it has also been shown by Jones et al, (2003) Proc. SID, pp 954-959 that the latching threshold for such a ZBD device can alter in response to previously applied voltage pulses (e.g. a d.c. balance or blanking pulse).

WO99/34251 teaches another ZBD device having a negative dielectric anisotropy material in a twisted nematic configuration. Alternative bistable devices are also described in WO 01/40853, EP1139151A1, EP1139152A1 and EP1139150A1. Patent application WO 02/08825 describes a zenithally stable device exhibiting multi-stability with more than two stable states.

Ferroelectric and ZBD devices of the type described above operate using polar latching. In other words, a pulse of a first polarity (say a positive pulse) causes latching into the first stable state whilst a pulse of a second polarity (e.g. a negative pulse) causes latching into the second stable state. Bistable cholesteric and bistable twisted nematic display operate using flow effects; in such devices the pulse shape, rather than polarity, can be selected to switch to any one of the stable states.

To provide displays having a number of separately addressable elements it is common to construct a liquid crystal device with a series of row electrodes on one cell wall and a series of column electrodes on the other cell wall. In this way a matrix of separately addressable elements is formed and a given voltage can be applied to each individual element of the device by applying certain voltages to given rows and columns. The technique of applying appropriate column and row voltage waveforms to individually latch each element of the display in turn is commonly termed multiplexing.

It should be noted that herein the terms row and columns are not intended to restrict the waveforms to application to a particular set of electrodes. Rather the terms are used simply to distinguish the two sets of electrodes and could be consistently interchanged throughout. Also, other electrodes are possible, from alphanumeric characters, to axial and radial circular electrodes. Arrangements also exist for in-plane electrodes used either on their own or together with out of plane electric fields.

Bistable liquid crystal devices conventionally use the so-called 'line at a time' multiplexing scheme. Data is continuously applied to one set of electrodes (e.g. columns) during the time taken to write an entire frame and the other set of electrodes (e.g. rows) are sequentially addressed with a strobe voltage. The resultant waveform at a pixel (i.e. the combination of the strobe and data waveforms) either causes latching of the pixel into the opposite state (i.e. when a select data pulse is applied), or leaves it unchanged (i.e. when a non-select data pulse is applied).

Two general types of line at a time addressing schemes are known; two field addressing and blanking. With two-field operation the frame is divided into two fields for addressing the black pixels and white pixels separately; known waveforms for implementing such a scheme are shown in FIG. 1. With blanked operation, the addressing pulse is preceded some time earlier by a blanking pulse that indiscriminately selects one state regardless of the applied data. Known waveforms to implement a blanked scheme are illustrated in FIG. 2. The blank may be applied a line or lines ahead, or may be applied for a whole frame or a given number of lines.

As described above, the combination of the strobe voltage pulse with a select data pulse causes latching whilst the combination of the strobe voltage pulse with a non-select data pulse does not cause latching. The voltage and duration of the select and non-select data waveforms are conventionally chosen to ensure that, when combined with the strobe pulse, a pixel is either latched or not as required; i.e. each pixel is selectively latched. The data and strobe pulses are thus chosen in light of the latching response of the particular display being addressed.

The latching response of a typical prior art bistable liquid crystal device is illustrated in FIG. 3. In this example, electrical pulses of the correct polarity and sufficient energy begin to nucleate domains of one state causing (say) a change in the reflectivity. These small domains remain after the pulse with no further change in reflectivity. Applying pulses that are more energetic causes further domains to be created, and the area of the new state to increase. The reflectivity increases from (say) 0% to 10% at $(\tau V)_{10}$ and 90% at $(\tau V)_{90}$ and eventually the pixel is fully latched into the new state. The width of the latching transition is termed partial latching. By convention, this is taken as the width of the transition measured on an area of the display that cannot be resolved by unaided eye.

Furthermore, as shown schematically in FIG. 4, two or more areas of a display panel 2 may have different latching characteristics. For example, a first area 4 may have a different latching threshold to a second area 6. The latching curve differences across the cell may arise from unwanted variations such as random variations in the alignment and surface energy, or longer range variations of cell gap, voltage (e.g. through resistive losses along the electrodes, or through differences between driver circuits), and temperature. The response for the first area 4 and the second area 6 are shown in FIG. 5 as curves 8 and 10 respectively. Again, the dotted lines represent the 10% latching point and the solid lines the 90% latching point.

An example of how the strobe voltage ($V_s$) and data voltage ($V_d$) would conventionally be selected in this instance is indicated by the dotted lines 12 in FIG. 5. Here, the magnitude of $V_s$ and $V_d$ are chosen so that the resultant $V_s+V_d$ causes the desired change of state for both the first and second areas, whereas $V_s-V_d$ is insufficient to latch either area. Clearly, this means that $V_d$ is required to be high, to counter variations across the cell. If there were no variation, $V_d$ could approach the partial latch width of the device. The magnitude of the required $V_d$ is given by:

$$V_d \geq \frac{|V_{100\%}(\text{Area1})| - |V_{0\%}(\text{Area2})|}{2} \quad (1)$$

which can typically lie between 4V and 8V (depending on the size of the display).

A consequence of the relatively high data voltage (e.g. 4V to 8V) is a high power consumption of the display panel. For example, assuming a polar response of the type described above the data waveforms are usually bipolar pulses (+/– and –/+) to ensure dc balance. With a large number of rows, the energy (E) dissipated by a panel of cell gap f, capacitance C is dominated by the data waveform voltage ($V_d$) and lies within the range of:

$$\tfrac{1}{2} f \cdot C V_d^2 \leq E \leq f \cdot C V_d^2 \quad (2)$$

depending on the image displayed. It can thus be seen that a data voltage has a significant effect on the power consumption of the panel.

Furthermore, applying a high data voltage to each column can also have a detrimental effect on the optical properties of rows other than the line being addressed at any one particular time. As described above, bistable cholesteric and bistable twisted nematic displays are caused to latch by flow effects, whilst ferroelectric and zenithal bistable device are caused to latch using polar switching. However, most bistable liquid crystal devices will also respond to the RMS signal of the applied field in addition to any polar latching response. For a positive dielectric anisotropy material the director orients parallel to the applied field, whereas for a negative material, the liquid crystal orients perpendicular to the field. The amount of liquid crystal reorientation to an RMS signal is related directly to the elastic constants of the liquid crystal and inversely to the dielectric anisotropy.

In such devices, the re-orientation of the director caused by the RMS effect can cause an undesirable change in orientation (and hence optical transient) when addressing the display. For example, areas of the display that are dark before and after the addressing signal may change to light during the addressing signal, causing a distracting "flash" of the image. To help reduce this effect, materials are chosen so that the Fréedericksz transition is at a high voltage and the gradient of the transition is low. However, this can severely limit the choice of material for a device.

A further problem associated with the use of high data voltages, and present in zenithal bistable devices, is the effect of any RMS voltage leading to unwanted latching of one (for positive dielectric anistropy mixtures used in a ZBD device, the continuous) state. This effect is termed "growback". Similar effects also occur in other devices, for example the bistable twisted nematic device.

Although bistable displays only have two stable states, greyscale can be provided in a number of ways. For example, greyscale can be achieved using temporal and/or spatial dither where the perception of grey-levels is provided by switching each pixel "on" and "off" at a rate faster than the viewer can perceive or by dividing each pixel into two or more weighted and separately addressable sub-pixel regions.

Employing spatial and/or temporal dither techniques in bistable display devices is at the expense of increased complexity, and hence unit cost. For example spatial dither increases the number of row and column drivers, requires thinner tracks thereby increasing track resistance and resistive powers losses in the panel and also requires more accurate etching to ensure linearity of the greyscale response. Increasing the number of separately addressable regions also increases the proportion of the display in which inter-pixel gaps are present; this reduces the aperture ratio of the device. It is for these reasons, that passively addressed bistable devices known to those skilled in the art are, for the present at least, somewhat limited in there ability to produce high numbers of grey-levels and moving video images.

Analogue (or domain) greyscale is also known. This is where partial (i.e. incomplete) switching of domains within a separately addressable pixel area is used so that different grey-levels can be formed from varying the number and/or size of domains in the pixel. This has previously been used in ferroelectric liquid crystals and bistable cholesterics. For example, see GB 2315876 where the addition of balls to provide nucleation sites for analogue grey scale is described.

The principal disadvantage associated with the use of domain grey-scale is that there is no operating window for the addressing waveform; that is, each grey-level is achieved with a specific addressing waveform. Ensuring the desired waveform is applied to a particular pixel is problematical because changes to the waveform applied to the rows and/or columns may arise due to losses along the resistive electrodes, variations caused by the temperature of the driving circuitry (which will depend on use and therefore will vary across the panel) or batch differences for the driving circuits. Changes in the response of the liquid crystal to the same field may also occur across the device arising, for example, from variations of cell gap, thickness of alignment layer, cell temperature, alignment of the liquid crystal, and possibly image history. Any such deviations cause a change in the electro-optic response, and hence an error in the observed analogue grey level.

It is also known to provide devices having multiple thresholds in order to attain analogue greyscale. In such devices, each pixel is sub-divided into areas which respond differently to applied electric fields; for example by forming holes in the electrodes, including passive dielectric layers or inducing alignment variations etc. One example of inducing multiple threshold is provided in Bryan-Brown et al, (1998) proceedings of Asia Display, p 1051-1052, where it is demonstrated that grey-scale may be achieved in a zenithally bistable device using gratings of different pitch and shape that allow partial switching of an area of a pixel. A similar analogue greyscale technique is described for SSFLCs in Bonnett, Towler, Kishimoto, Tagawa and Uchida (1997) "Limitations and performance of MTM Greyscale for FLCs", *Proceedings of the 18th International Displays Research Conference*, L46-L47.

Analogue addressing of multiple threshold bistable LCDs such as those described above, still relies on line-at-a-time addressing as described above for a two-state bistable device: a strobe signal is applied to a first electrode (say, the rows) and appropriate data signal applied to the set of electrodes on the opposite internal surface of the display (say, the columns). Selection between the different states is achieved by modulating the data signal so that it combines with the strobe to latch one or more of the sub-pixel regions, leading to the desired intermediate state.

Addressing multiple thresholds exacerbates the problems described above that are associated with the use of a high data voltage. For example, assume the lowest data voltage required to ensure discrimination between two data signals (i.e. ±Vd=latch and not-latch) across an entire panel due to random variations is given by $|Vd_{min}|$. For m grays to be discriminated (ie non-overlapping addressing windows) the data voltage must be $(m-1)Vd_{min}$. Take, for example, the case where 4V data is needed to display a black and white image across a whole panel. If the each pixel is subdivided into three areas to provide four separately distinguishable and addressable analogue levels, the voltage swing required to ensure that each grey is addressed at all parts of the panel is then increased to 12V. This adds expense to the cost of the drivers required, the power dissipated during update is high, and the contrast of the panel is severely reduced by unwanted "flash" whilst addressing.

According to a first aspect of the invention, a device comprises a layer of material disposed between first and second cell walls and is capable of adopting, and being electrically latched between, at least two stable configurations, said layer of material comprising one or more separate electrically addressable regions and said device further comprising addressing means to write to each of said electrically addressable regions using voltage pulses to selectively latch said layer of material as required, wherein the addressing means writes to each of said one or more separate electrically addressable region using at least first and second latching scans, said first latching scan being arranged to selectively latch material having a latching threshold within a first range and said second latching scan being arranged to selectively latch material having a latching threshold within a second range, wherein said first latching scan is applied prior to application of said second latching scan and said second latching scan is insufficient to latch material having a latching threshold within said first range.

In this manner, the first latching scan will selectively latch material within each electrically addressable region that has a threshold within the first range. In other words, the required stable configuration of material having a threshold within the first range will be selected by the addressing means during the first scan; this may require application of a voltage pulse sufficient to provide latching (i.e. to alter the material from one stable configuration to another), or a voltage pulse insufficient to latch the material, depending on the initial configuration of the material and the final desired configuration. A certain required pattern (e.g. an image to be displayed) is thus written across the device to any regions thereof having a latching threshold within the first range. Preferably, the first latching scan will also indiscriminately latch (i.e. blank) material having a latching threshold within said second range.

After application of the first latching scan, the second latching scan is applied. This second latching scan is arranged to selectively latch material having a threshold within the second range into the required state. In other words, the required stable configuration of material having a threshold within the second range will be selected by the addressing means during the second scan; this may require application of a voltage pulse sufficient to provide latching or to prevent latching depending on the initial configuration of the material. The second latching scan is arranged so it does not latch material having a threshold within the first range. A certain pattern (e.g. an image to be displayed) is thus written across the device to any regions thereof having a threshold within the second range.

Further scans may also be applied, as described below, but each scan follows the basic rule of latching material within a selected range but having no latching effect on material within the threshold ranges of preceding scans. In this manner the entire layer of material on the display is sequentially addressed by a series of two or more latching scans that latch regions of reducing latching threshold (e.g. by applying a voltage pulse of reduced duration or voltage).

It should be noted that when a polar bistable device (e.g. a ZBD device) is used, the latching threshold within the first and second ranges will each comprise sub-ranges defining the continuous-to-defect and defect-to-continuous transitions (e.g. see FIG. 12). One such transition (say, defect-to-continuous) will be over a sub-range of a first (say, positive) polarity whilst the. second sub-range (say, continuous-to-defect) will be over a sub-range of a second (say, negative) polarity. However, for a particular device, defining one such transition (e.g. continuous-to-defect) inherently defines the second transition (e.g. defect-to-continuous).

Selective latching during the second latching scan may have some overlap with selective latching of the first latching scan. An overlap can advantageously be used to overcome problems associated with asymmetry in the latching responses as described below with reference to FIG. 12 to 14. The term "first range" as used herein thus means any material with a latching threshold within a range that is selectively latched by said first scan but is not latched by said second scan.

The device may have defined regions in which the material latches within the first and second (and any subsequent) ranges, or such threshold changes may arise from manufacturing or other random variations. The technique may also be used to allow devices to be addressed over larger temperature ranges. For example, at a first temperature the whole display may have a threshold within said first range whereas at a second temperature the whole display may have a threshold within the second range. As the temperature of the device varies from the first temperature to the second temperature, the proportion of the device being selectively latched by the first latching scan will gradually reduce from one hundred percent to zero.

The use of multiple scans in accordance with this invention to address a device having two or more stable configurations thus provides a number of advantages. Firstly, in the case of a device having a number of regions of different latching threshold, the different latching regions can be addressed sequentially using the two or more scans. This allows the number of regions that can be separately addressed to be greater than the number of separate electrically addressable regions thereby reducing the interpixel gap and/or providing a device of higher resolution. The two different latching regions can be deliberately fabricated or may arise from random variations. If the regions are deliberately fabricated, the ratio of the different latching regions within each separate electrically addressable region can be controlled or "weighted" to provide greyscale as described in more detail below.

In the case of a multiplexed device, the use of two or more scans in accordance with the invention will reduce the data voltage required for each scan. As illustrated by equation (2) above, reducing the data voltage will significantly reduce the power consumption of the device even though the number of scans is increased. In fact, the present invention allows the minimum data voltage that is required to address the entire device to be reduced by a factor approaching the number of scans. Hence, the use of a first latching scan and a second latching scan would almost halve the power consumption of a device compared to a prior art single scan. A number of further advantages associated with a reduced data voltage include a reduction in optical transients or so-called "flash" and less "growback" into one state from another.

Furthermore, the present invention can be used to increase the range of latching thresholds over which the device can be operated. This means, for example, an image can be written to the device across a wider temperature range (allowing for instance displays to be operated without temperature sensors), or used in combination with a manufacturing processes that has wider batch-to-batch/panel-to-panel variations than acceptable using prior art devices. It would be appreciated by the skilled person that reducing power consumption and increasing the range of thresholds within which the device can operate are complementary. Increasing the range of device operation is at the expense of an increased number of scans or an increased data voltage per latching scan.

Advantageously, said first latching scan comprises an initial blanking waveform to latch all of said material into one of said at least two stable configurations. In other words, a blanked addressing scheme may be used. The blanking scan may comprise a mono-polar, a bi-polar pulse, or a pulse of any required shape. A variety of such blanking pulses, which are preferably dc balanced, are known and used in prior art blanked addressing schemes. A further blanking waveform may also be applied between the first and second latching scans. The further blanking is arranged to indiscriminately latch material having a threshold within the second range, but to have no effect on the material selectively latched during the first scan (i.e. material having a threshold within the first range). Alternatively, the blanking effect of the first latching scan on material having a latching threshold within the second range may negate the need for the further blanking pulse.

Conveniently, the addressing means applies one or more further latching scans after application of said second latching scan, wherein each further latching scan is arranged to selectively latch material having a latching threshold within a given range but is insufficient to latch material having a threshold within the threshold range of any preceding scan. It is also preferred that each scan indiscriminately latches (i.e. blanks) any material having a latching threshold within the given range of all subsequent latching scan.

Preferably, latching of said material is polarity dependent. The desired state in polarity dependent materials can be selected using a voltage pulse of the appropriate magnitude, duration and polarity. Example of such devices include the ZBD and SSFLC devices described above in which a pulse of (say) positive polarity latches into a first state whilst a pulse of negative polarity latches into a second state. It should also be recognised that the invention is equally applicable to non-polarity dependent devices such as bistable cholesteric and bistable twisted nematic devices where latching between states is controlled by pulse shape. It is advantageous, when using polarity dependent materials, for said first latching scan to latch material using a latching pulse of a first polarity and said second scan to latch material using a latching pulse of an opposite polarity to the latching pulse of first polarity.

It should be noted that each latching pulse may be combined with one or more further pulses of opposite polarity to ensure dc balance is maintained. For example, each latching pulse (i.e. the pulse that causes the selective latching) may be preceded or followed by a pulse of opposite polarity that is shaped so as not to cause latching. Alternatively, the first latching scan and the second latching scan may comprise latching pulses of the same polarity (e.g. positive) and a blanking pulse of the opposite polarity (e.g. negative) is applied between said first and second scans to blank (only) material having a threshold within the second range. DC balancing may also be performed over several scans.

Conveniently, said layer of material comprises a first region arranged to have a latching threshold within said first range and a second region arranged to have a latching threshold within said second range. A number of techniques may be used to provide different threshold regions within a device, as described above. In addition to altering the properties of the material, for example by controlling alignment of material at the surface, the electrode properties may be altered. The provision of separate latching regions of different and known thresholds enables driving from the same (scan line) driving circuit, thereby reducing the number of electronic drivers required and hence the cost of the panel.

Advantageously, when further (i.e. third and subsequent) latching scans are applied, said layer of material comprises one or more further regions, each of said further regions having a latching threshold within the given range of a further latching scan.

Conveniently, the layer of material comprises a plurality of separate electrically addressable regions. Advantageously, each of the plurality of separate electrically addressable regions comprise two or more regions of different latching threshold. The proportion of said layer of material having regions of different latching threshold may advantageously be weighted within each separate electrically addressable region. This allow spatial dither to be implemented.

It should be appreciated that the provision of regions having different latching threshold within a device is known. However, prior art devices exploit such threshold differences using analogue greyscale techniques. Analogue greyscale applies a latching voltage within a predetermined range in a single scan; a proportion of the separate electrically addressable region is latched depending on the voltage applied. Prior art analogue greyscale thus provides no ability to selectively latch material of different thresholds and within a single separate electrically addressable area to different state. It should be noted that the present invention may thus be combined with analogue greyscale techniques. For example, the first latching scan could be arranged to cause partial latching of material having a threshold within the first range. Similarly, the second and any further latching scans could be arranged to cause partial latching.

It is preferred that row electrodes are provided on said first cell wall and column electrodes are provided on said second cell wall thereby providing a matrix of separately addressable regions. In such an arrangement, said at least first and second latching scans are advantageously applied by the addressing means to each separate electrically addressable area by application of strobe voltage pulses to said row electrodes and data voltage pulses to said column electrodes, said strobe and data voltage pulses being arranged to produce the required resultant voltage pulse at each separate addressable region. This allows the implementation of so-called line at a time addressing.

Conveniently, the energy or time-voltage product of the voltage pulse of the first latching scan is greater than the energy of the voltage pulse of the second latching scan. The energy may be varied from scan to scan by reducing the pulse voltage, the pulse width or both the voltage and pulse width. Different properties may also be varied between subsequent scans; for example, the voltage of the strobe pulse could be reduced from the first scan to the second scan whilst the pulse duration is reduced (or the pulse shape changed etc) from the second scan to the third scan. It would be appreciated that, for certain devices, the energy of the pulse may be invariant and the pulse shape or timing (e.g. delay) changed to alter the latching effect of the pulse.

Conveniently, the addressing means is arranged to supply select or non-select data pulses to latch or not latch respectively. In other words, line at a time addressing can be implemented using select and non-select data pulses in combination with a strobe pulse to provide select and non-select resultant pulses.

Advantageously, each row is addressed in turn with both said first latching scan and said second latching scan (i.e. sequentially addressed). Alternatively, it may prove advantageous in certain circumstances with said first latching scan and subsequently for every row to be addressed with said second latching scan (i.e. subsequently addressed).

Furthermore, a combination of subsequent and sequential addressing may be used so that a proportion of the display is latched by the first and second latching scans, and then a second portion of the display is latched by the first and second latching scans. For example, the top half of the display me be latched using the first and second latching scans, followed by latching of the bottom half of the display by the first and second latching scans.

In order to prevent charge build up over time, it is preferred that the applied data and strobe waveforms are substantially dc balanced.

A skilled person would recognise that the present invention can be implemented using any one of a number of different addressing schemes. In fact, the majority of prior art blanked and two field schemes could be adapted in accordance with the present invention.

Advantageously the device is configured such that, for each separate electrically addressable region, the addressing means is arranged to latch material having a latching threshold within the second range into the same configuration as material having a latching threshold with the first range. In this manner the required pattern can be written to each separately electrically addressable region of the device irrespective of any variations in the latching threshold across the device. In the case of a multiplexed device this reduces the data voltage required, and the power consumption of the device can thus be reduced as described below.

Alternatively, the device may be advantageously configured such that, for each separate electrically addressable region, the addressing means is arranged so as to be capable of selectively latching material having a latching threshold with the second range into a different configuration to material having a latching threshold with the first range. Hence, any material within a separate electrically addressable regions and having a threshold within the first range can be selectively latched into a stable configuration different to that adopted by material within that region having a second threshold. This has numerous advantages, especially when each separate addressable region is fabricated with well defined areas of different latching threshold. In particular, such an arrangement allows the amount of scan electronics and electrodes to be reduced in a device whilst maintaining the same number of elements that can be latched into the state required.

Conveniently, selective latching during said first and/or said second scan is arranged to partially latch material having a threshold within said first range or said second range respectively. In other words, known analogue greyscale techniques can be used in conjunction with the present invention.

The device may advantageously comprise a photosensitive layer such that the latching threshold of said layer of material is variable in response to optical illumination. For example, a photo-conductive layer may be included in the device to enable the latching threshold of the layer of material to be alter. This would allows the threshold to be altered between frames, and could be used to control the amount of said layer of material that forms the first region having a latching threshold within said first range and/or the amount of said layer of material that forms the second region having a latching threshold within said second range.

Colour filter elements may also be advantageously provided.

Advantageously, the layer of material comprises liquid crystal such as a nematic liquid crystal material. Herein, the term nematic shall include long pitch cholesteric material. Chiral dopants may also be included in the nematic liquid crystal to impart any required twist.

Advantageously, the transition between said two stable configurations is mediated by an alignment transition at said first cell wall.

Conveniently, the surface of the first cell wall that is in contact with said layer of nematic liquid crystal material is profiled so as to provide at least two stable surface alignment configurations of the liquid crystal material in the vicinity of said first cell wall. A number of known techniques may be used to provide the profiled surface, such as photolithography or the embossing of a deformable material.

A mono-stable surface treatment may be applied to the internal surface of the second cell wall. For example, a homeotropic surfactant or a planar homogenous layer such as a rubbed polymer.

The profiled surface of said first cell wall conveniently comprises a bistable surface alignment grating structure. Alternatively, any suitably profiled bistable surface, for example of the type described in WO 01/40853, EP1139151A1, EP1139152A1 or EP1139150A1, may be employed.

Advantageously, the surface of the second cell wall that is in contact with said layer of nematic liquid crystal material is profiled so as to provide at least two stable surface alignment configurations of the liquid crystal material in the vicinity of said second cell wall. Again, the profiled surface of said second cell wall advantageously comprises a bistable surface alignment grating structure.

Advantageously, the device may be arranged to provide a π-cell configuration.

In such a pi-cell configuration, the layer of liquid crystal material is switchable between at least a first state and a second state, said first state and said second state having sufficiently low splay to enable rapid electrical switching therebetween, wherein the internal surface of said first cell wall is arranged to provide two or more surface alignment configurations of different pretilt to said layer of liquid crystal material.

In other words, the first and second states are non-splayed states that can be rapidly switched between. The internal surface of the first cell wall may comprise a surface profile that provides two or more alignment configurations to give the two stable surface alignment configurations. For example, the internal surface may comprises a surface alignment grating embossed in a layer of material carried on the internal surface of the first cell wall. The pi-cell device may advantageously be arranged so that the first state and/or the second state persist in the absence of an applied electric field.

The pi-cell of the present invention thus provides a liquid crystal device that has advantages over known pi-cells. For example, the stability of the substantially non-splayed states in the absence of an applied electric field means that images written to a device will persist when addressing voltages are removed. This enables the fast switching speed of the pi-cell configuration to be coupled with the ability to store images in the absence of an applied electric field. The inherent stability of the device thus allows areas of devices to be addressed only when image update is required, thus enabling the power consumption of a device to be reduced when static or slowly updated images are displayed. This allows, for example, e-books and laptops to be formed that are capable of displaying high-resolution TV video rate images when required, but can use a reduced update rate to conserve battery power when a lower frequency of update, or partial update, is used.

The pi-cell device also removes the need for an initial (slow) addressing step to switch material from a splayed state to the non-splayed state or the use of polymer stabilisation matrices to stabilise a particular non-splayed state. As described below, even is a splayed state is formed, the surface transition increases the speed with which the non-splayed state can be selected.

The terms bend, splay and twist arise from consideration of the elastic deformations of a nematic liquid crystal material and is described in more detail in chapter 3 of "The physics of liquid crystals" by De Gennes and Prost, 1993 (second edition), Oxford University Press (ISBN 0198520247). In brief, any deformation of a nematic liquid crystal material may be described in terms of splay, bend and twist deformation components. In a device, any configuration adopted by liquid crystal material can be described using the three deformation components (i.e. splay, bend and twist).

Most alignment states will include two or more elastic deformations. This is particularly true for parallel-walled cells, where uniform change in tilt from one surface to another includes both splay and bend deformations. Moreover, in the vicinity of grating aligned surfaces the director may undergo substantial elastic deformation and also include both splay and bend. In such instances at some distance away from the surface profile (typically within one pitch distance of the repeating profile into the bulk of the cell) the director variations in two-dimensions will diminish, and the surface is said to provide a uniform pre-tilt. Further into the bulk of the cell the director variation within a particular state is uni-dimensional, varying in the direction parallel to the device plane normal according to the applied field and the elastic deformation associated with the interaction of the two surfaces. Note, the term pre-tilt is taken to mean this uniform alignment of the director in close proximity to the surface and induced by the structure of said surface. The tilt of the director represents the local orientation of the director field that may vary under the action of an alignment or electric field.

The term non-splayed states is used herein to mean a liquid crystal configuration in which the splay component is small; for example, a state in which the dominant deformation component is bend. It should be noted that a homeotropic state has zero splay and thus falls within the definition of a substantially non-splayed state.

A particularly important example of a non-splayed state is the bend state. In a bend state the tilt of the director in the bulk of the cell is equal to or greater than the pretilt of both alignment walls. In particular the bend state will usually have a point within the bulk of the cell where the director is aligned perpendicular to the cell-plane For this reason, as described at line 56 of column 1 of U.S. Pat. No. 6,512,569, such a non-splayed, bend state may sometimes be termed a vertical, or "V-state". Furthermore, in such a bend state, the bend deformation either side of vertically aligned director is in opposing directions. As described in more detail below, the twist component is determined by any in-plane rotation of the liquid crystal director through the thickness of the cell (e.g. from the first cell wall to the second cell wall) and may be selected as desired to tailor the optical response. In other words, splayed and substantially non-splayed states can both be provided in either twisted or untwisted form.

Advantageously, the first state of the pi-cell is a bend state in which the tilt of the liquid crystal material at a point in the bulk of the cell is greater than the pretilt of the liquid crystal material at said first cell wall and said second cell wall. This may be a ZBD defect state.

As described above, zenithal bistable or multistable devices exhibit one or more defect states (i.e. a state in which a liquid crystal defect provides the surface alignment configuration at one surface) and a continuous (non-defect) states. It should be noted that prior art ZBD devices exhibit hybrid aligned nematic defect states planar homogeneous defect states or twisted homogeneous defect states rather than a defect state in which the liquid crystal director (i.e the average direction of the long molecular axes) in the bulk of the cell is orientated in a direction that is substantially perpendicular to the cell walls. The advantage of providing a substantially non-splayed (e.g. bend) defect state of this type is the ability to rapidly switch to the second substantially non-splayed state as described above.

Herein, the cell mid-point is taken as a plane within the liquid crystal material that lies parallel to said first and second cell walls and is located substantially halfway between the plane defining the first cell wall and the plane defining the second cell wall. For a device with one or more grating surfaces, the half-way point is taken to within one grating pitch of the average distance from one surface to the other, where the average is taken over at least the area of one pixel within the device. A point which is substantially half way may be anywhere from ¼ of the distance between the walls to ¾ that distance.

Conveniently, when the pi-cell is switched into said first state, the liquid crystal molecules in the vicinity of the cell mid-point are orientated in a direction that is substantially perpendicular to the first and second cell walls. In other words, the tilt of the liquid crystal material at said point in the bulk of the cell is substantially 90°. This may be the so-called ZBD continuous state.

Electrical addressing signals are applied to the pi-cell device to latch into one of the two states, all of which are non-splayed states and one of which is preferably a bend state. The electrical addressing means is arranged so as to ensure that the zenithal bistable surface within the area of at least one pixel is latched into a continuous state during at least part of the addressing signal. Conveniently, this addressing means is provided at the outset of each pixel-switching event, since it ensures that the director is in a non-splayed state and not in an undesired splayed state. This initial non-splayed state is preferably a HAN state, since this ensures that the change of director field to the subsequent states is rapid.

Preferably, the internal surface of said second cell wall is configured to provide two or more surface alignment configurations of different surface pretilt to said layer of liquid crystal material. In other words, a "double ZBD" pi-cell device is provided in which both surface can impart two or more different surface pretilt angles to the liquid crystal material.

Conveniently, the second state is a substantially homeotropic (continuous) state. In other words, the liquid crystal molecules lie in a direction perpendicular to the cell wall throughout the thickness of cell in the second substantially non-splayed state.

Advantageously, in a double ZBD pi-cell device of the invention, the latching threshold between the two or more surface alignment configurations provided by the internal surface of said first cell wall is greater than the latching thresholds between the two or more stable surface alignment configurations provided by the internal surface of said second cell wall. In such a case, it is also preferred that the surface alignment configuration of lowest pretilt at said second cell wall has a pretilt less than the pretilt of any of the two or more stable alignment configurations provided at said second cell wall; i.e. the pretilt of the ZBD defect state on the surface of higher threshold is higher than the pretilt of the ZBD defect state on the surface of lower threshold.

Preferably, the internal surface of said second cell wall is monostable and arranged to provide a single alignment configuration that imparts a pretilt to said liquid crystal material of less than 90°. Advantageously, the pretilt of each of the two or more surface alignment configurations at said first cell wall is greater than the pretilt provided at said second cell wall. Conveniently, the tilt at the cell mid-point is greater than 5°. Advantageously, any one or more of said at least first state and second state is twisted. In other words, a twisted pi-cell structure may be formed. The twist may advantageously be up to 180°.

The first cell wall and the second cell wall preferably carry electrodes to define a plurality of separate electrically addressable regions. For example, row electrodes are provided on said first cell wall and column electrodes are provided on said second cell wall thereby providing a matrix of separately addressable regions. Some or all of the pixels may include non-linear elements, such as back-to-back diodes, thin-film transistor or silicon logic circuit. Alternatively, the device may be a single pixel fast optical shutter.

It is advantageous, for said second state to be the most energetically favourable state that the liquid crystal material can adopt. For example said second state may be a continuous high-tilt state with the device arranged such that said second substantially non-splayed state is the most energetically favourable state that the liquid crystal material can adopt. In this way, the device will tend to form the second substantially non-splayed state (i.e. the continuous state) when constructed. Hence, the liquid crystal material in the interpixel gaps will form the continuous state which will ensure the first substantially non-splayed state (rather than a splayed state) is always formed within each of the pixels.

For example, if the zenithal bistable surface is arranged to form the high tilt continuous state spontaneously on first cooling then at least part of the inter-pixel gap will remain in a non-splayed state after switching. For example, the grating may be made relatively shallow so that it is still bistable (i.e there is an energy barrier between the high tilt and low tilt states) but the high tilt state is a lower energy than the low tilt defect state. Hence, the inter-pixel gap does not act to nucleate a splay state, but advantageously nucleates the non-splayed states. Unlike previous methods for introducing non-splay state nucleation sites into the inter-pixel gaps (preferably surrounding each pixel) this method can be done at no extra-cost of fabrication, being inherent to the design of the surface. More information on the design of surfaces to control pretilt can be found in the prior art described above.

Advantageously, the layer of liquid crystal material is nematic liquid crystal material. Herein nematic liquid crystal material includes long pitch cholesteric. A chiral dopant may also be mixed to provide any twist that is required. The liquid crystal material advantageously has a positive dielectric anisotropy.

Conveniently, the first cell wall is arranged to provide two surface alignment configurations of different pretilt. In other words, the first cell wall has a bistable surface structure; for example a surface alignment grating. Alternatively, more than two surface alignment configurations may be provided as described in WO 99/34251.

The pi-cell device may also comprise a layer of liquid crystal material disposed between a pair of cell walls, one or both of said cell walls being arranged to provide two or more stable alignment configurations to said layer of liquid crystal material, said two or more stable alignment configurations comprising a continuous state and one or more defect states, said device being switchable between said continuous state and any one of said one or more defect states, wherein one of said one or more defect states is a bend state in which the magnitude of the tilt of the liquid crystal material at a point in the bulk of the cell is greater than the pretilt of the liquid crystal material at either cell wall. Preferably, when said device is in said bend state, the liquid crystal molecules at the midpoint of the cell lie perpendicular to said cell walls A pi-cell liquid crystal device may also be provided in which each of the switched states persist in the absence of an applied electric field.

Furthermore, a pi-cell device may comprise a layer of liquid crystal material located between a pair of cell walls and comprising a plurality of pixels separated by inter-pixel gaps, wherein the internal surface of at least one of said pair of cells walls is arranged, in both said pixel and inter-pixel gaps, to provide two or more surface alignment configurations of different pre-tilt, wherein the material is arranged to adopt a substantially non-splayed state in the absence of an electric field such that the said substantially non-splayed state persists in said inter-pixel gap.

In addition, the pi-cell device may comprise a layer of liquid crystal material disposed between a pair of cell walls, said layer of liquid crystal material being rapidly electrically switchable between at least two substantially non-splayed states, said device also being switchable, prior to use, from a splayed state to either of said non-splayed states wherein the internal surface of at least one of said cell walls is arranged to impart two or more different pretilt angles in the same azimuthal plane. Advantageously, the splayed state can be switched to a non-splayed state in less than 1 second.

Conveniently, the latching threshold between the at least two stable surface alignment configurations of the liquid crystal material at said first cell wall are greater than the latching threshold between the at least two stable surface alignment configurations of the liquid crystal material at said second cell wall. Furthermore, it is preferable that the latching threshold of the liquid crystal material at said first cell wall falls within said first range and the latching threshold of the liquid crystal material at said second cell wall falls within said second range.

It should be appreciated that two or more of said at least two stable configurations are preferably optically distinguishable. A skilled person would recognise how the use of polarisers, retardation films etc could provide optical contrast between the various configurations. Preferably, the layer of material used is bistable. Alternatively, the material may advantageously comprise three or more stable configurations. Electrophoretic particles (for example, a charged particle or a charged droplet of liquid) may also be included in the layer of material.

The layer of material may advantageously comprise droplets of bistable material in a carrier matrix. The droplets may be coloured, and may comprises cholesteric liquid crystal material. The material may alternatively comprises particulates.

A device having a first layer of material as described above may additionally comprising one or more further layers of material, each of said further layers of material being disposed between a pair of cell walls and comprising one or more separate electrically addressable regions, wherein each of the one or more separate electrically addressable regions of each of said further layers of material are electrically connected to said addressing means in parallel with one of the electrically addressable regions of said layer of material. The first layer of material and said one or more further layers of material may be advantageously arranged in an optical stack. In this manner, an optical stack device is provided of the type described in more detail below.

According to a second aspect of the invention, a method of addressing a display device that comprises a constrained layer of material capable of adopting, and being electrically latched between, at least two stable configurations, said layer of material having one or more separate electrically addressable regions is provided. The method comprises the steps of (a) addressing each separate electrically addressable region of said display device with a first latching scan to selectively latch material having a latching threshold within a first range, and (b) subsequently addressing each separate electrically addressable region of said display device with a second latching scan to selectively latch material having a latching threshold within a second range, wherein said second latching scan is insufficient to latch material having a threshold within said first range.

Conveniently, said first latching scan indiscriminately latches (i.e. blanks) material having a latching threshold within said second range into one of said at least two stable configurations.

Advantageously, the method additionally comprising the step, after the steps of addressing said device with said first and second latching scans, of addressing said display with one or more further latching scans, each further latching scan being arranged to selectively latch material having a latching threshold within a given energy range wherein the upper energy of said given energy range is lower than the upper energy of the energy range of the preceding latching scan.

Conveniently, the device comprises a plurality of separate electrically addressable areas.

According to a third aspect of the invention, a method is provided for writing a frame of information to a display device having two or more stable configurations and comprising a matrix of separate electrically addressable regions, wherein said method comprises the step of multiplexing said device using three or more addressing fields. The first field advantageously blanks said display device, and the second field may selectively latches material having a latching threshold within a first range, whilst the third field selectively latches material having a latching threshold within a second range.

The invention will now be described, by way of example only, with reference to the following drawings in which.

Figure 3:
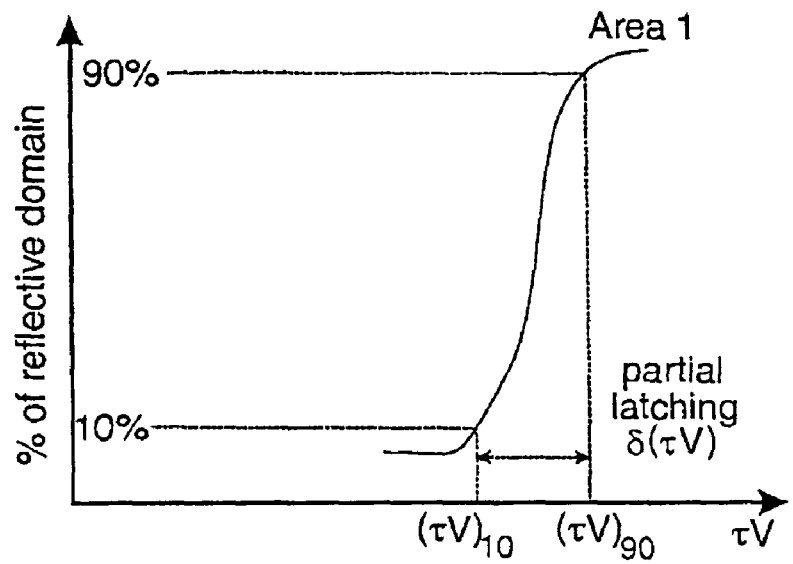
Figure 4:
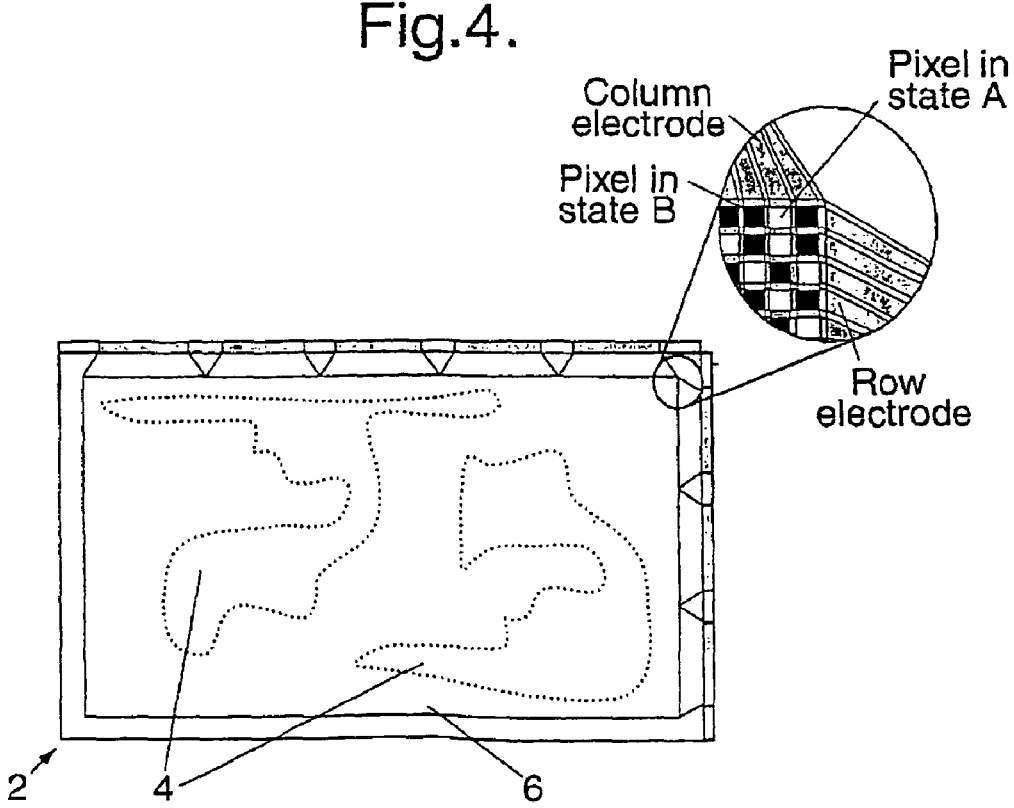
Figure 5:
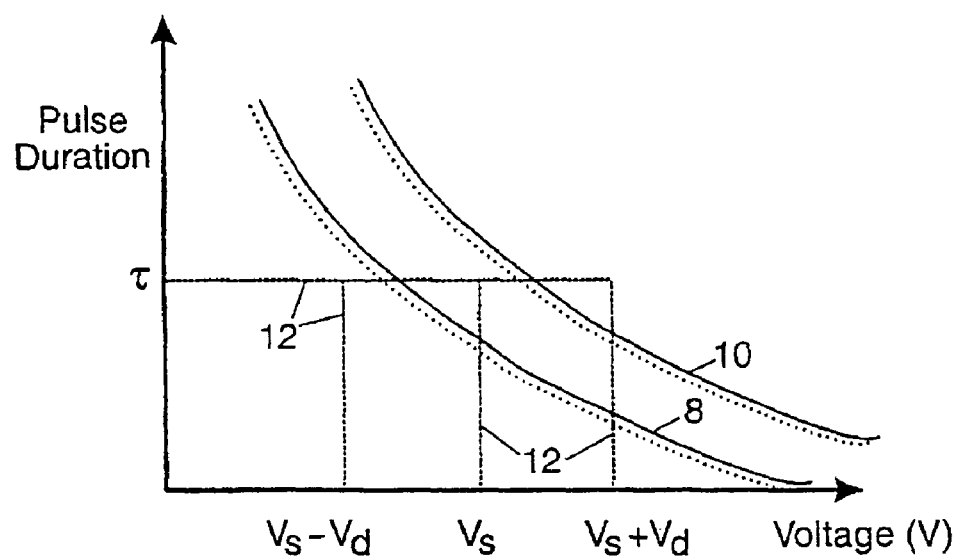
Figure 6:
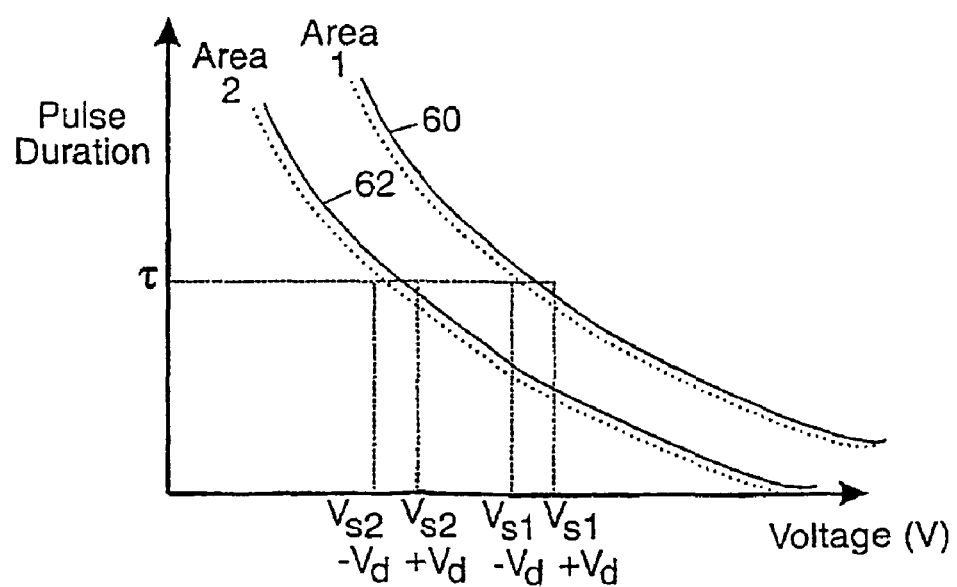
Figure 7:
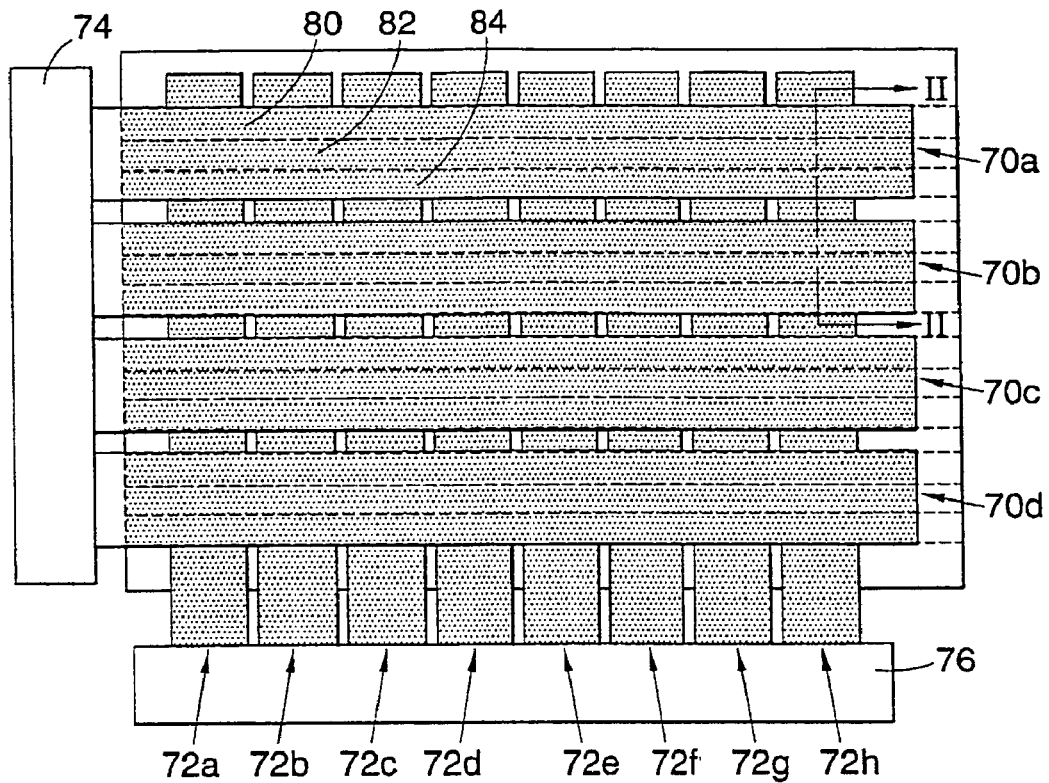
Figure 8:
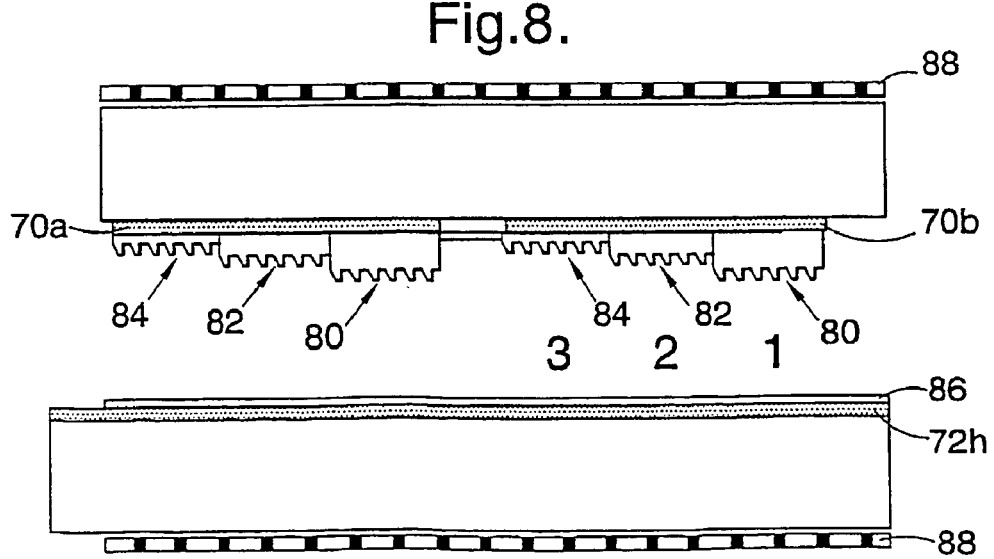
Figure 9:
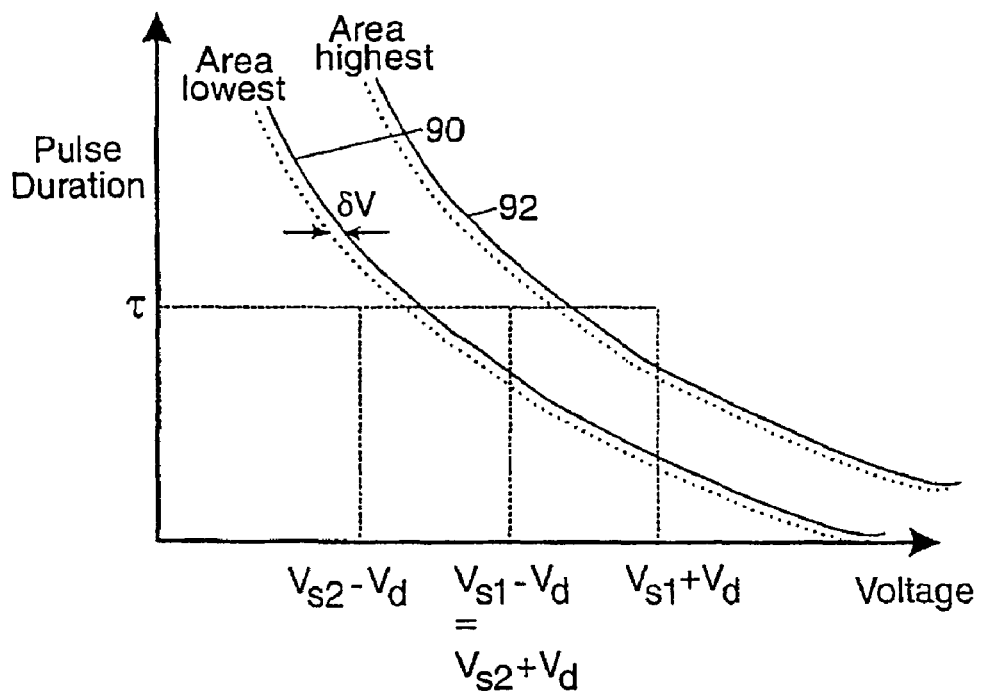
Figure 10:
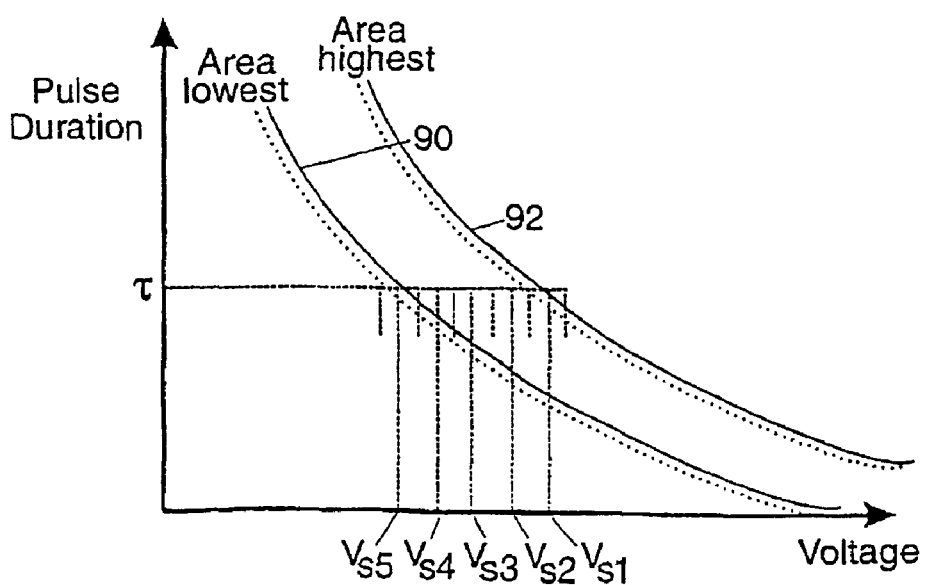
Figure 11:
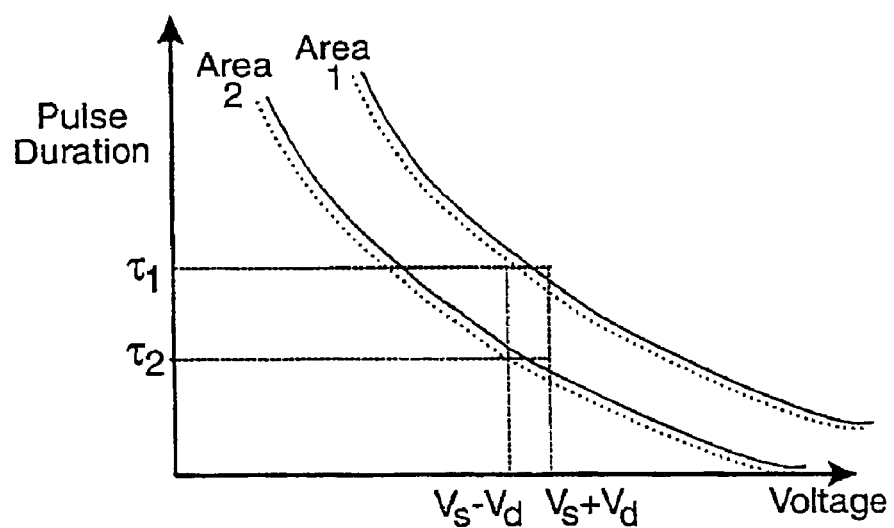
Figure 12:
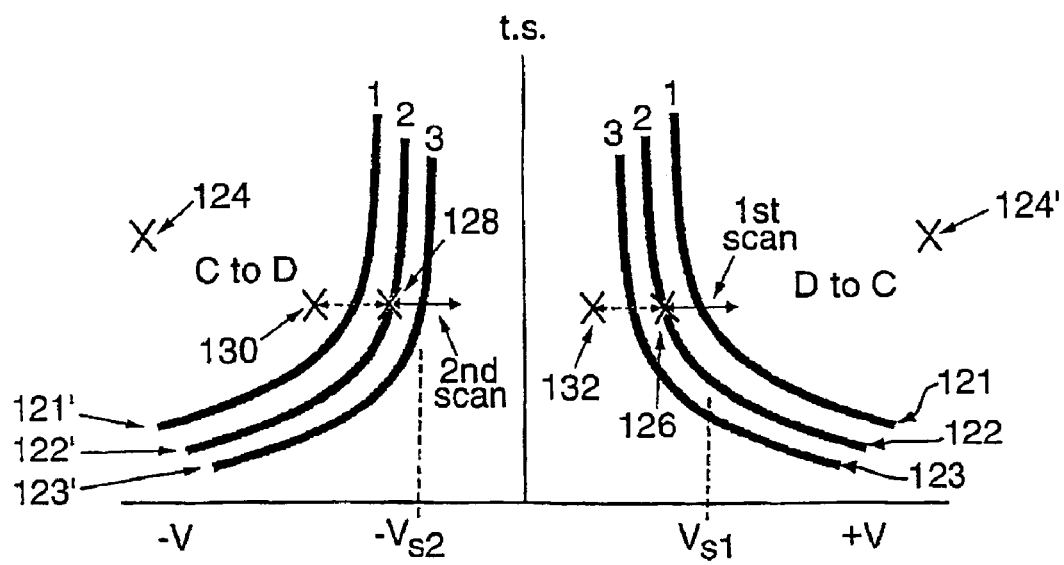
Figure 13:
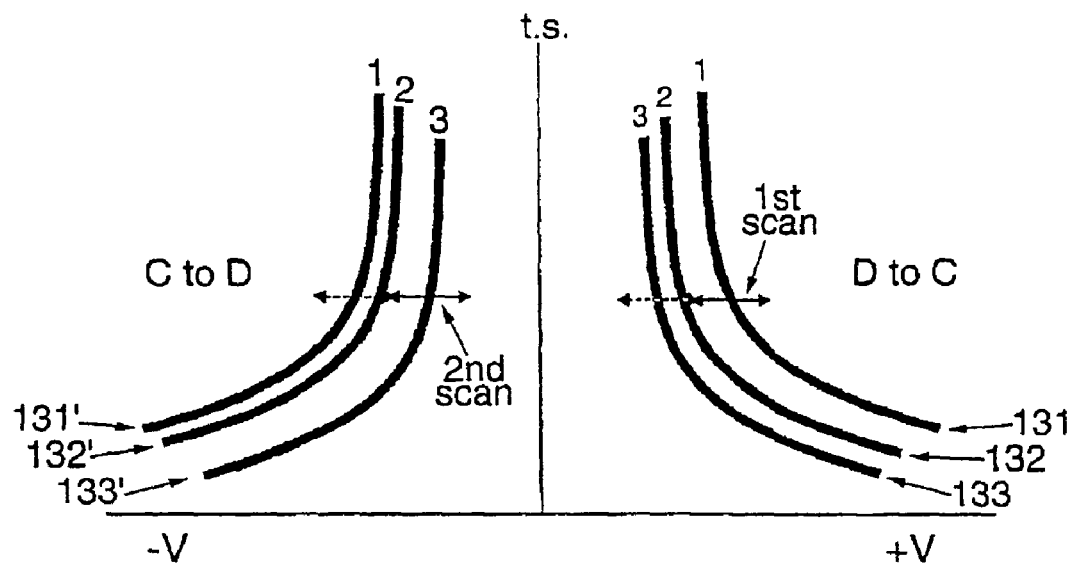
Figure 14:
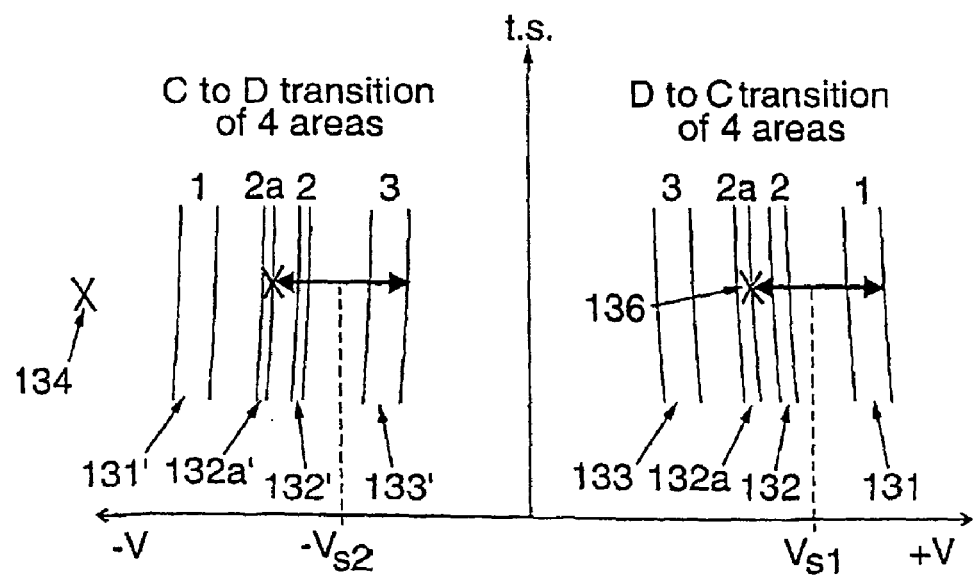
Figure 15A:
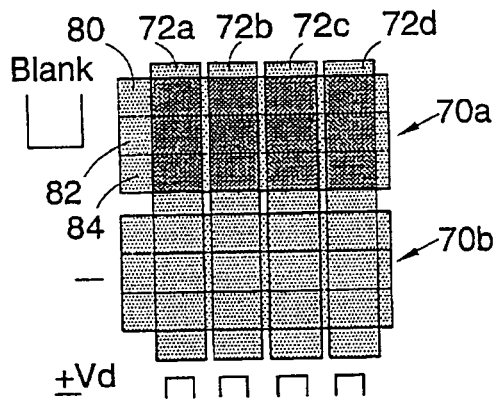
Figure 15B:
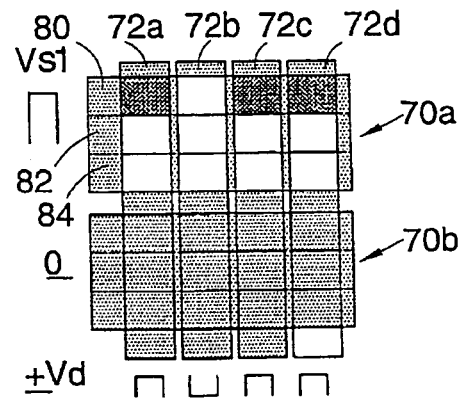
Figure 15C:
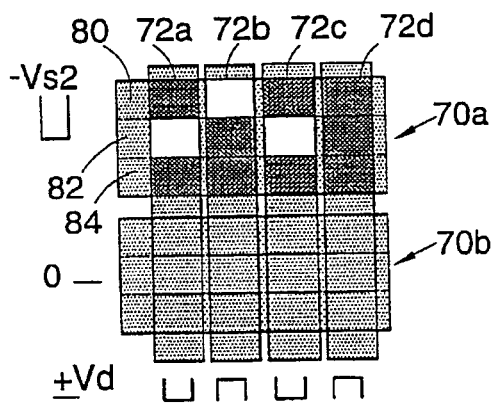
Figure 15D:
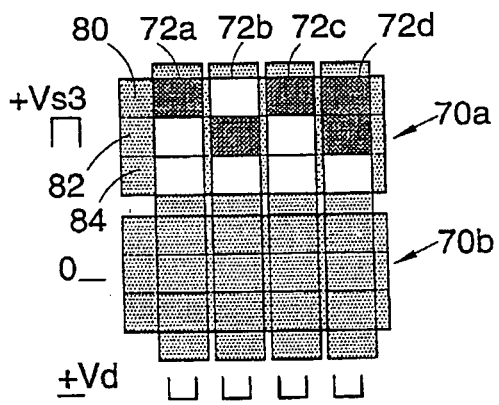
Figure 15E:
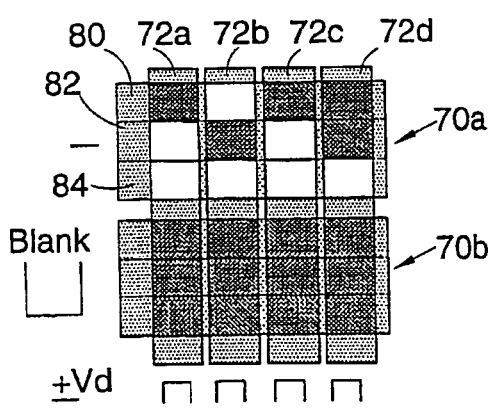
Figure 15F:
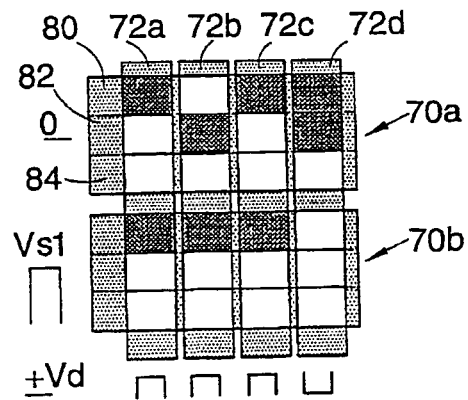
Figure 16:
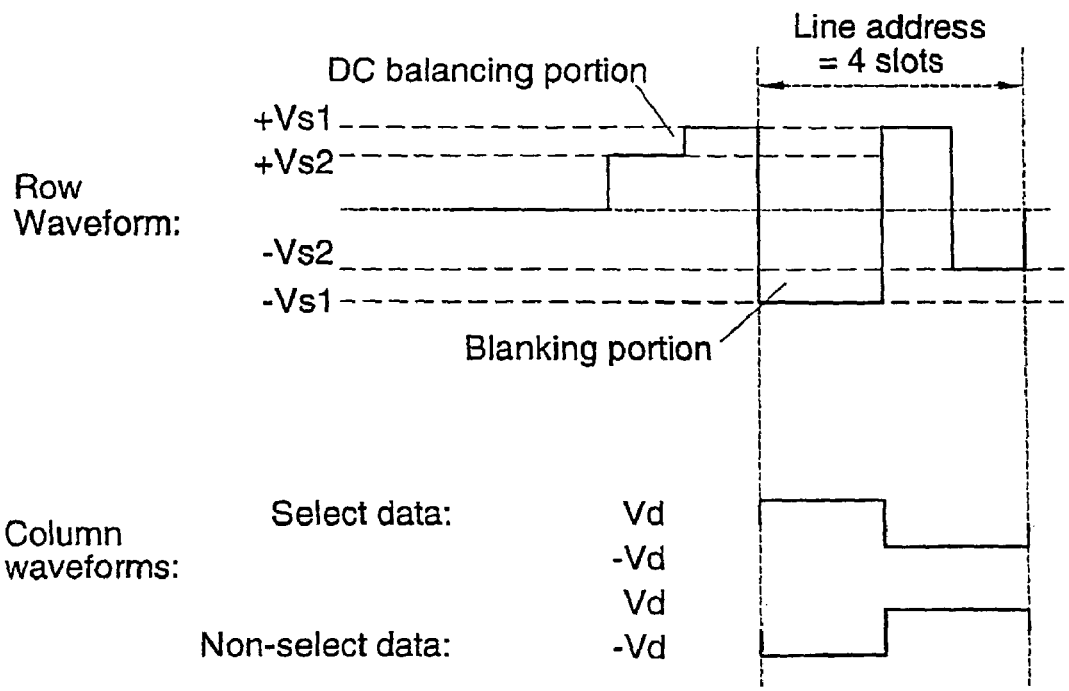
Figure 17:
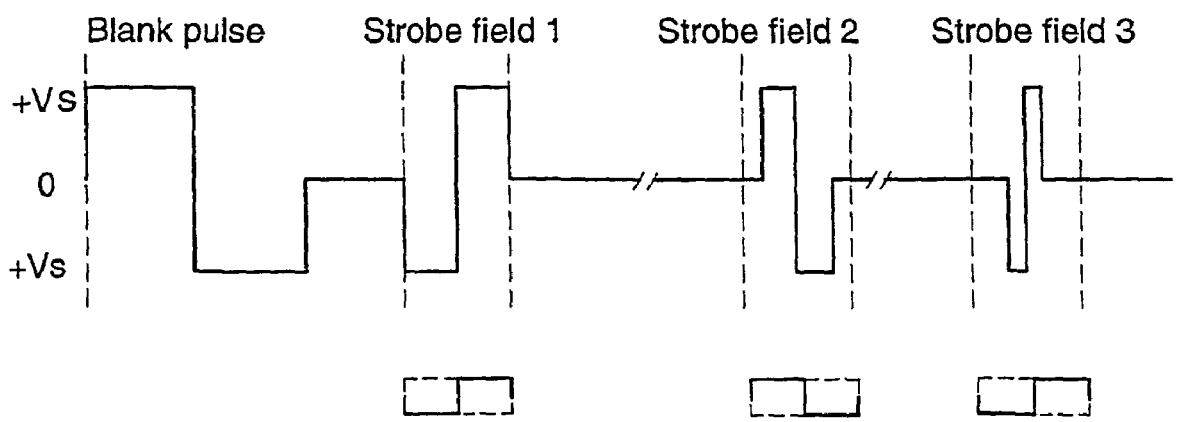
Figure 18:
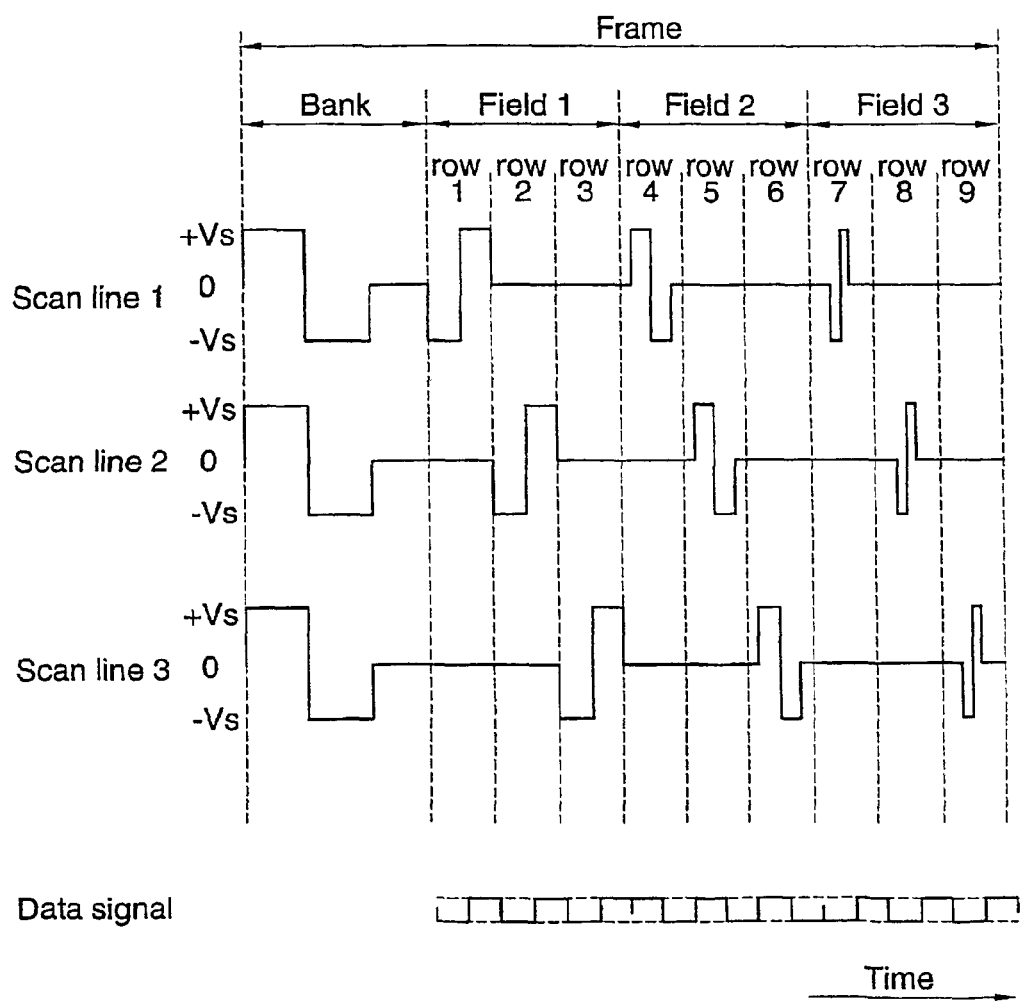
Figure 19:
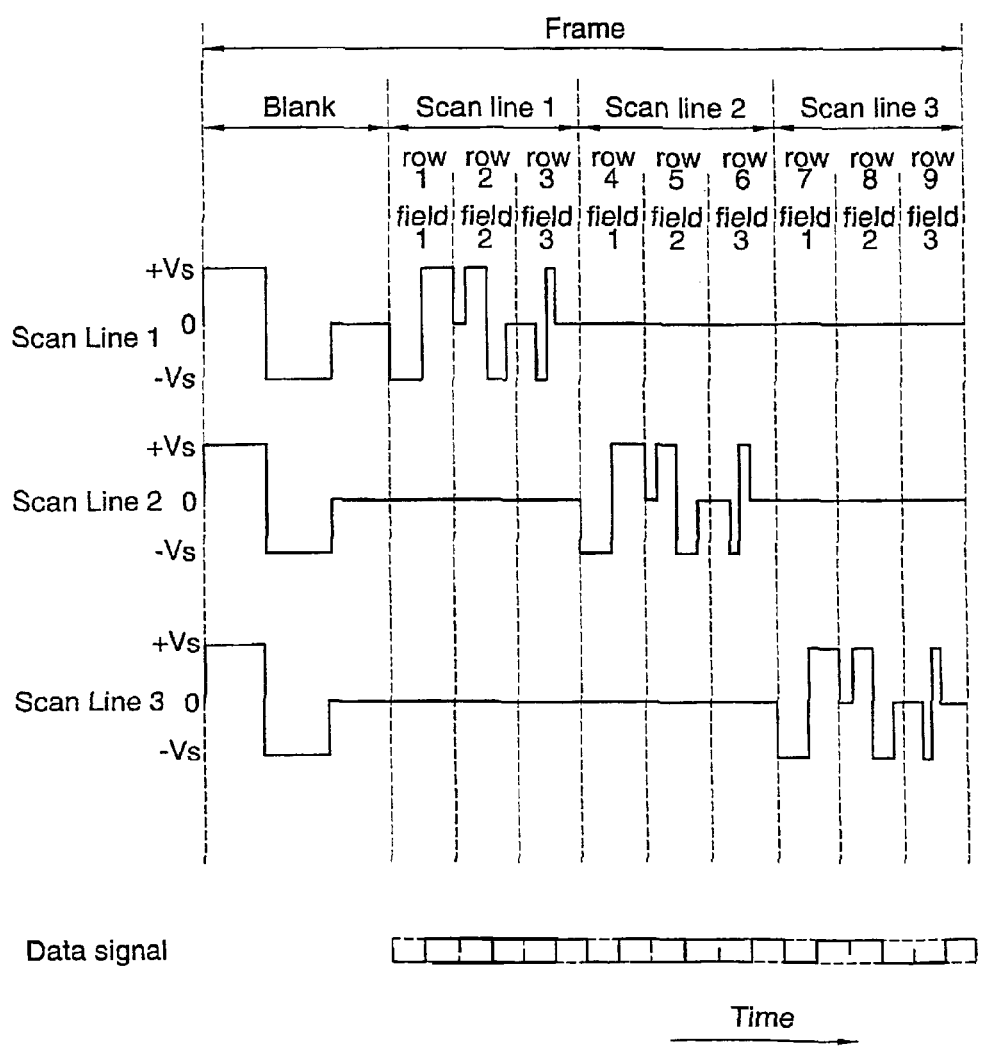
Figure 20:
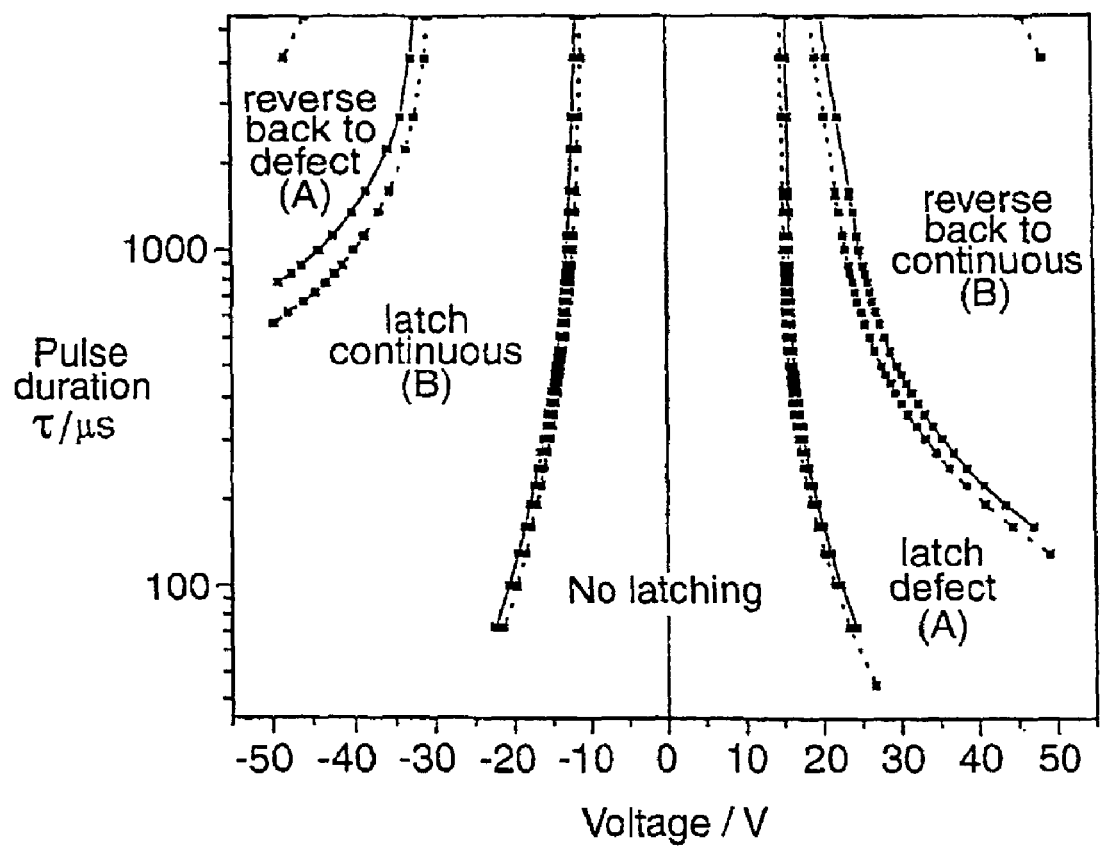
Figure 28:
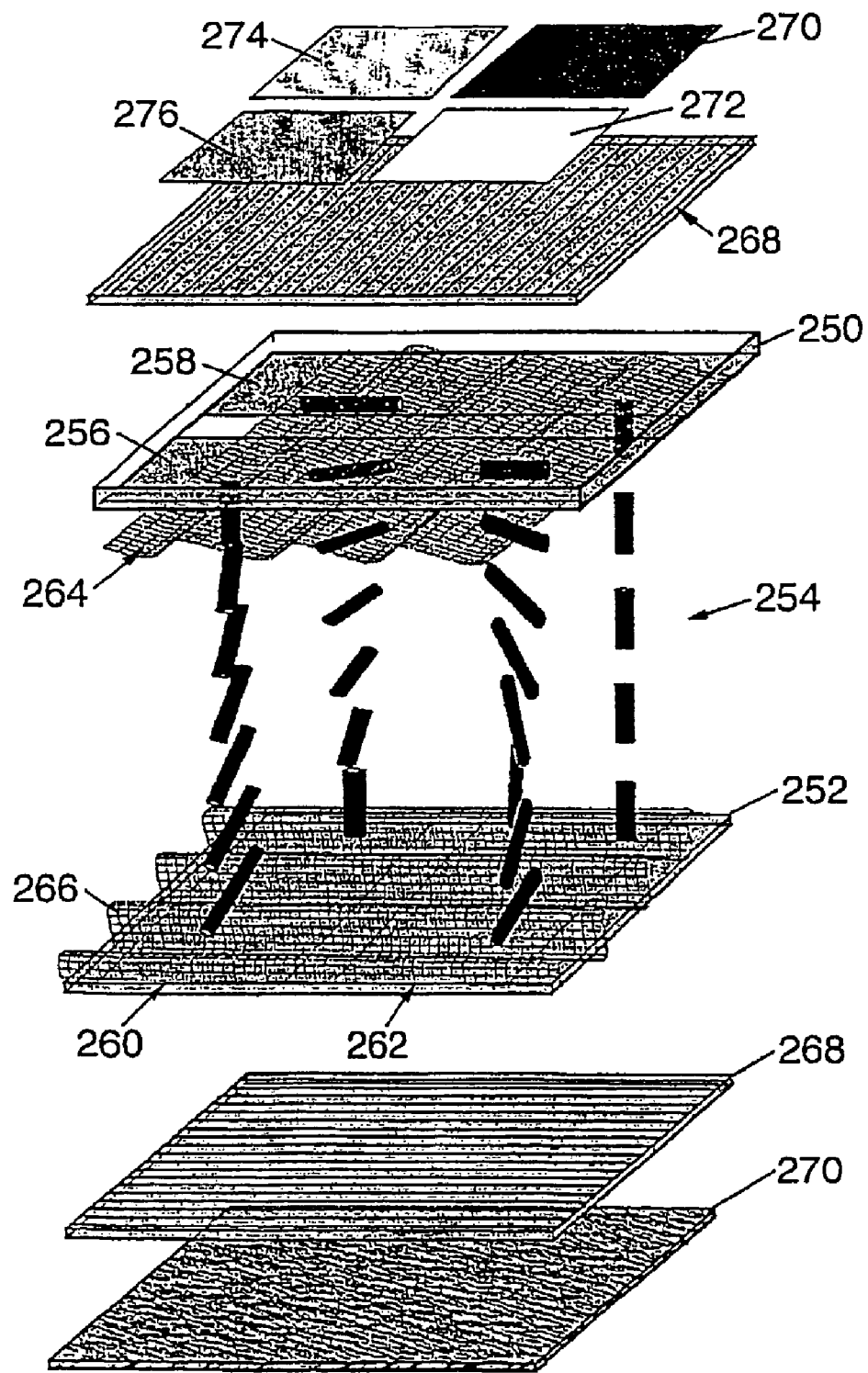
Figure 31:
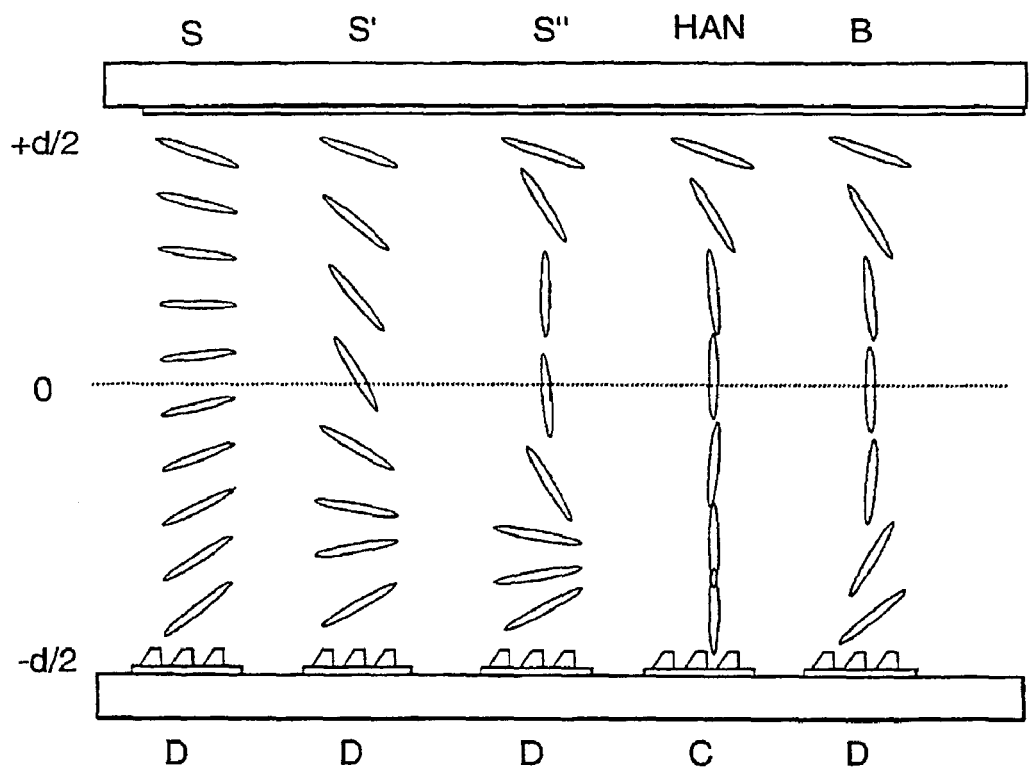
Figure 32:
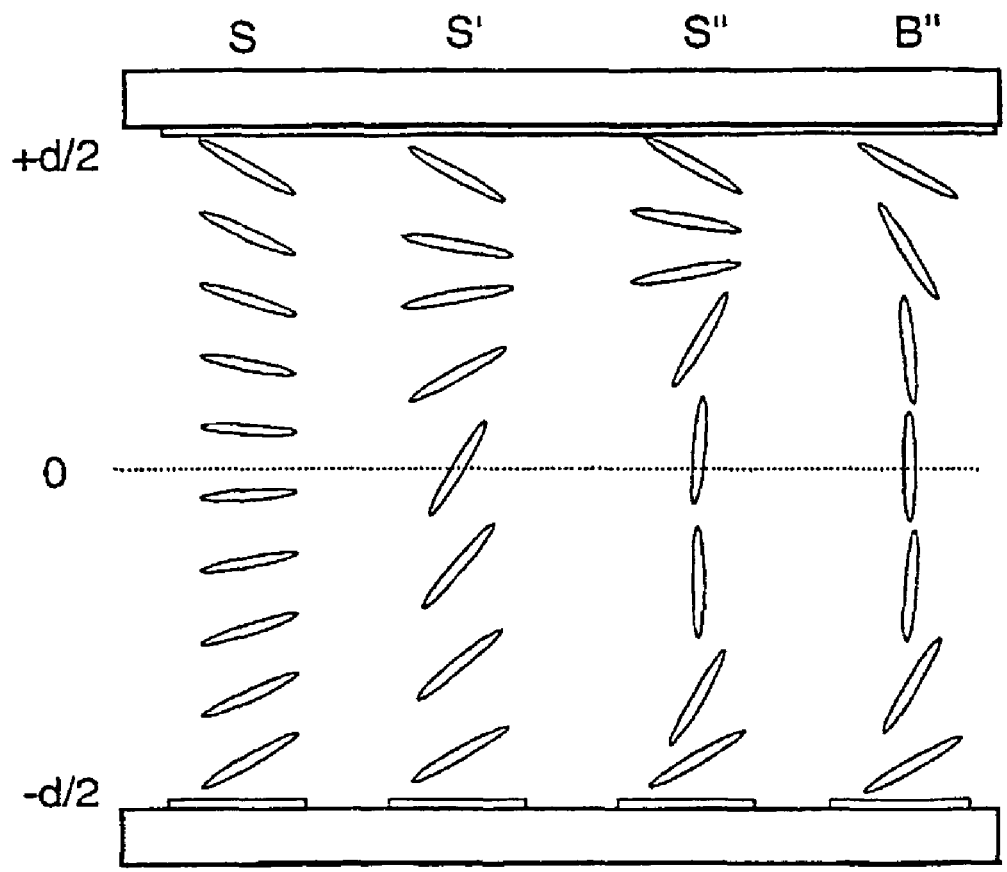
Figure 33:
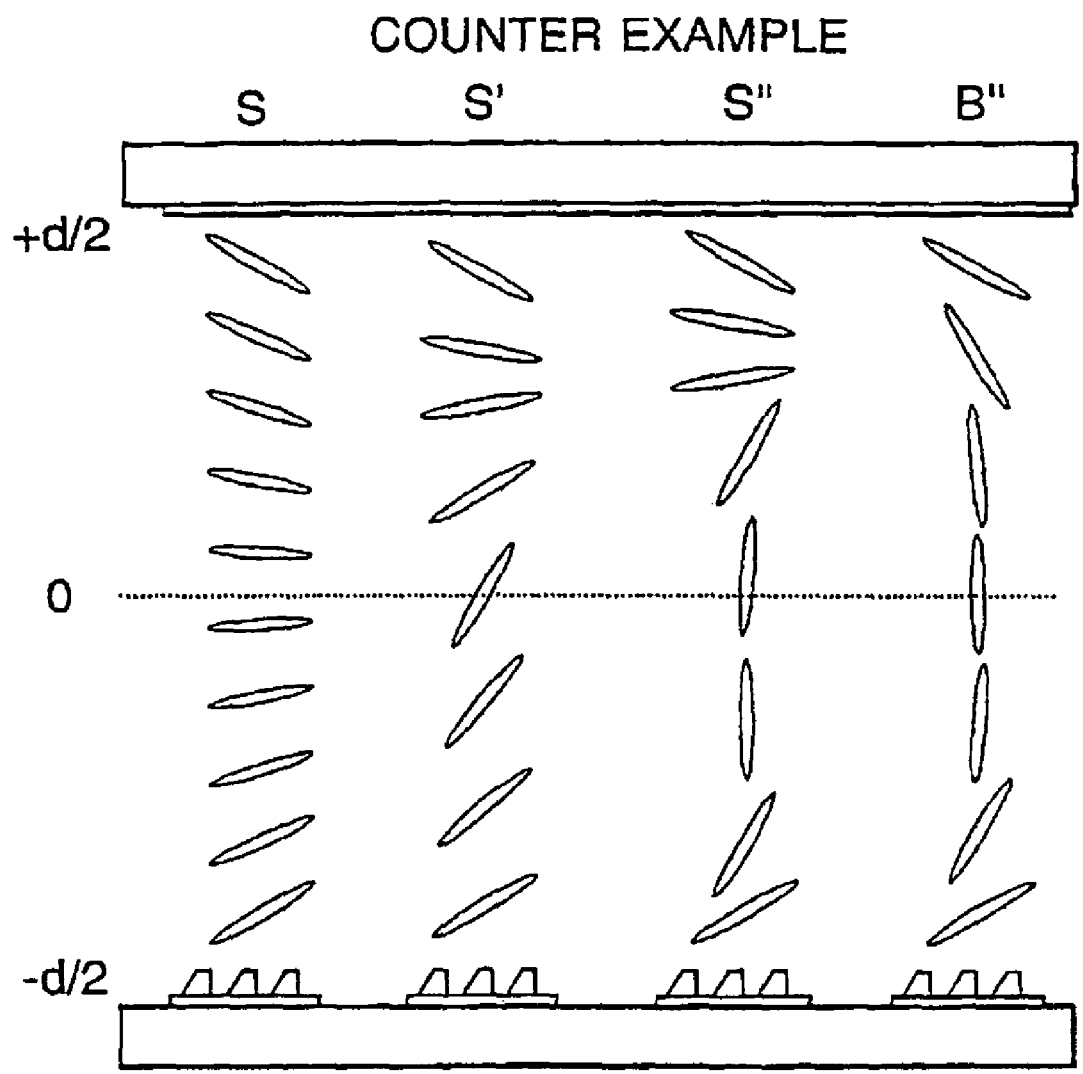
Figure 35:
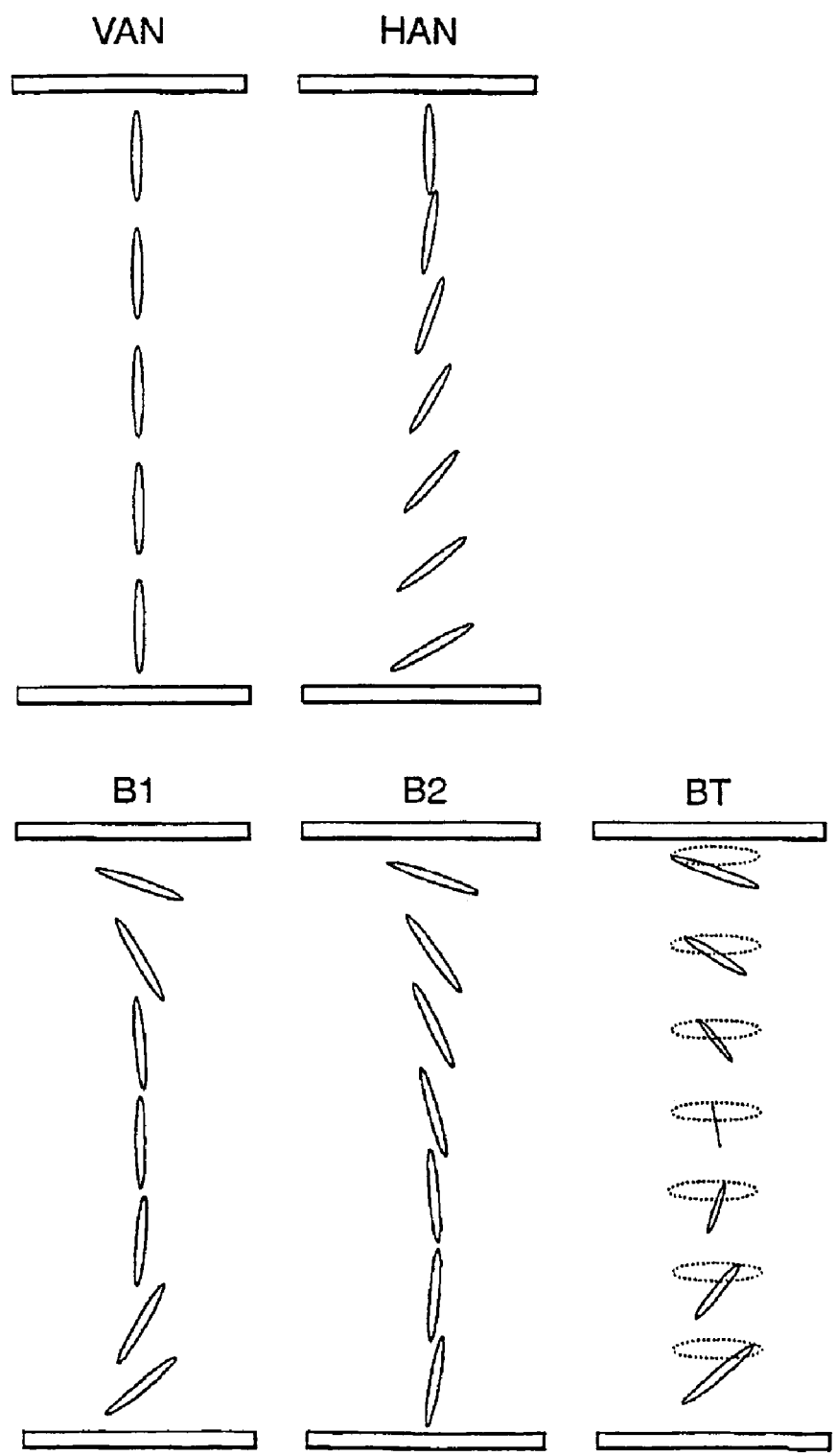
Figure 36:
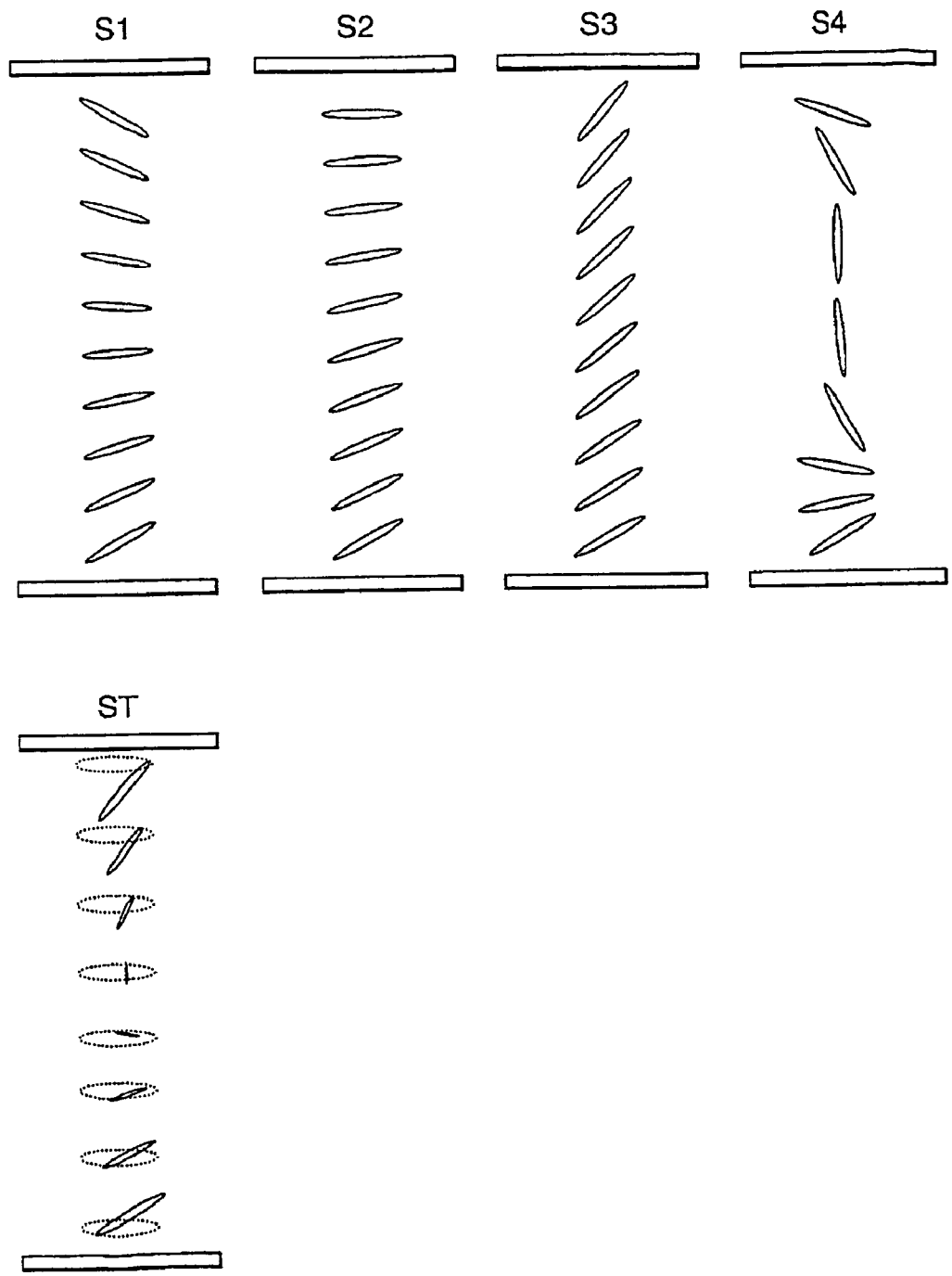
Figure 37:
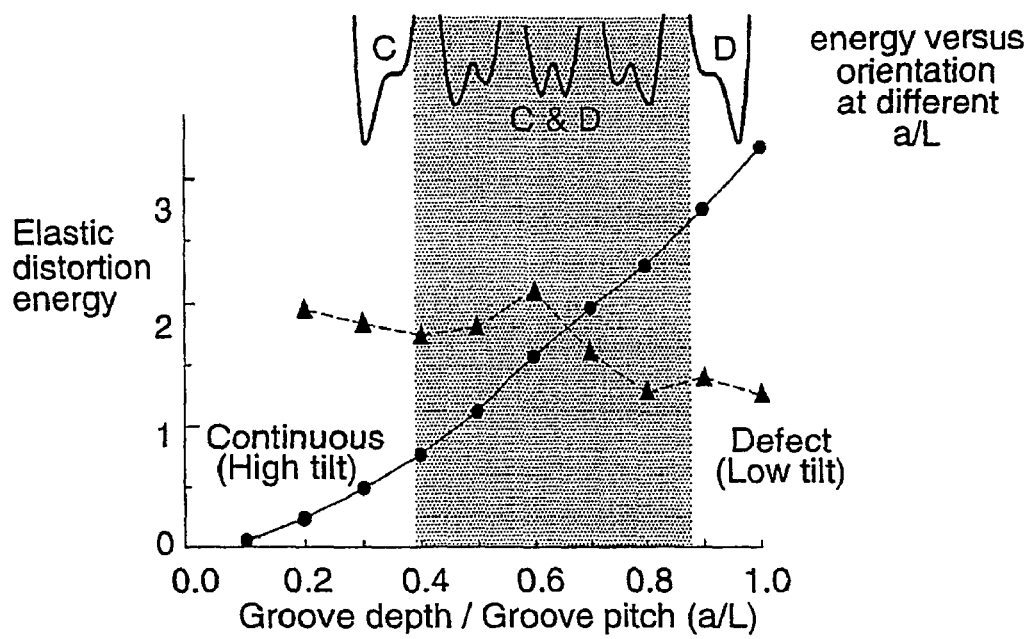
Figure 38:
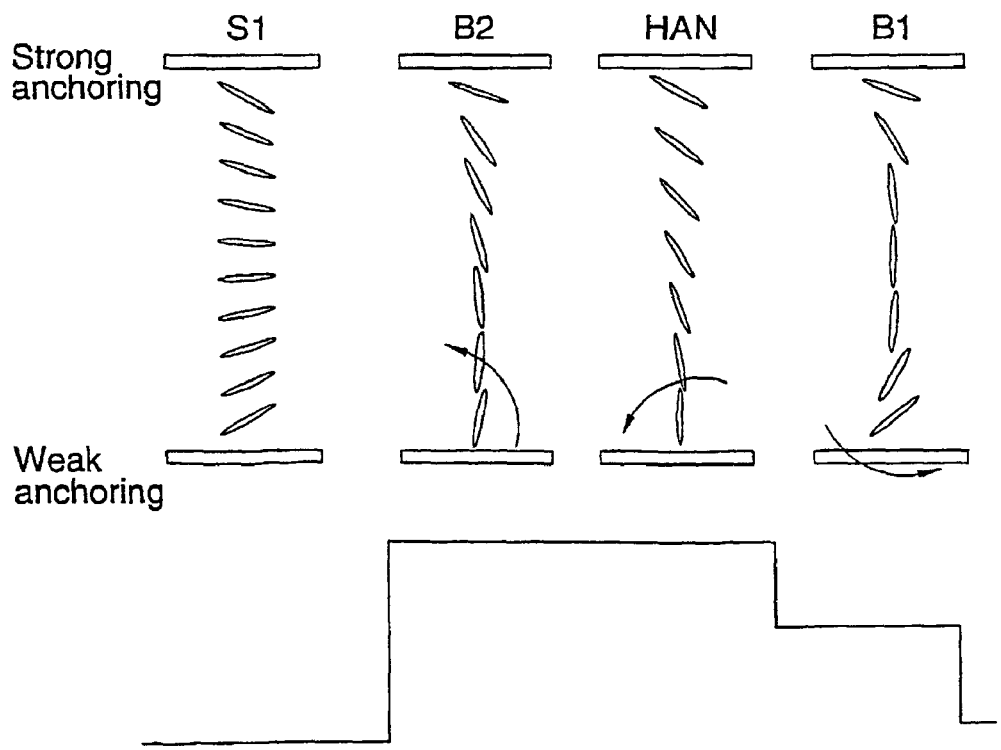
Figure 39:
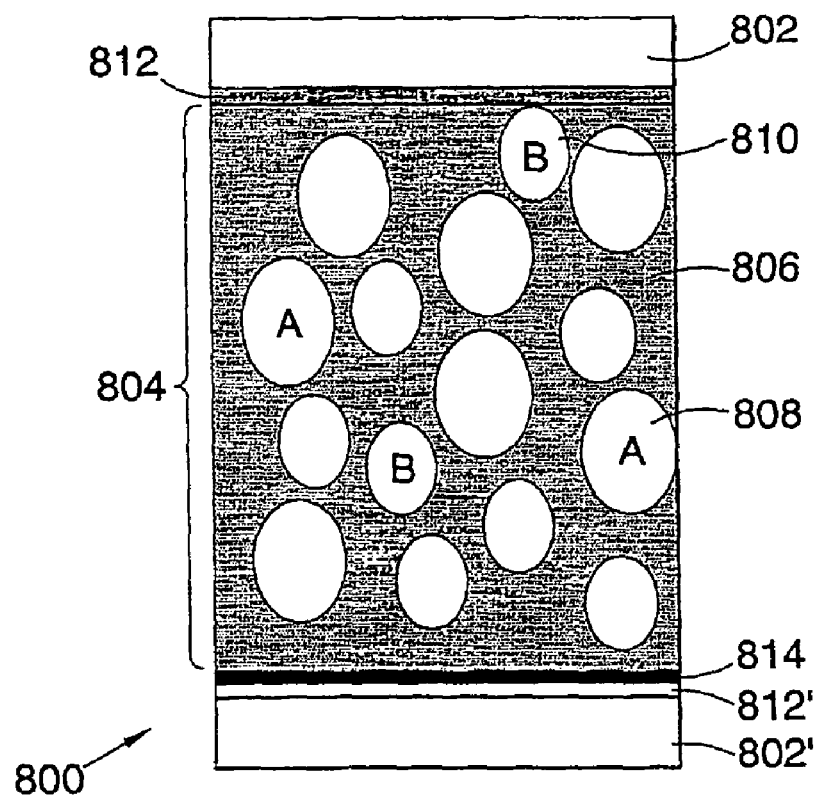
Figure 40:
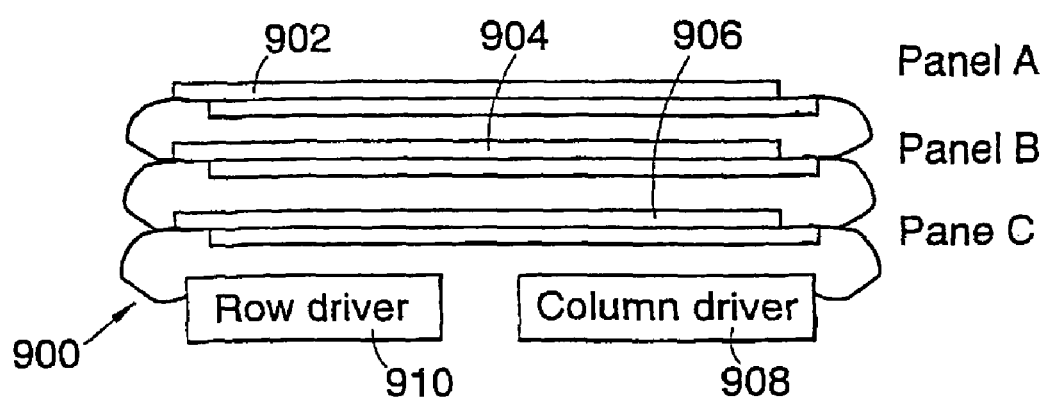

FIG. 3 illustrates the partial latching region of a prior art bistable liquid crystal device, FIG. 4 shows the random variations across a prior art panel that can provide areas of two different latching ranges, FIG. 5 shows the principle of data voltage selection according to the prior art, FIG. 6 illustrates a multi-scan technique according to the present invention, FIG. 7 shows a panel constructed in accordance with the present invention, FIG. 8 shows a cross-section of the panel of FIG. 7 along the line II-II, FIG. 9 illustrates the use of multiple scans to address a device having a continuum of transitions, FIG. 10 shows a five stage multi-scan technique, FIG. 11 illustrates how variation of strobe pulse width may be used in the multi-scan technique, FIG. 12 shows typical ZBD latching curves with no variation in asymmetry, FIG. 13 shows ZBD latching curves in which asymmetry is not retained, FIG. 14 provides an expanded plot of four switching regions of a ZBD device, FIG. 15 gives and expanded view of the display of FIG. 7 when addressed in accordance with the present invention, FIG. 16 provides examples of row and data signals that can be used to implement the present invention, FIG. 17 shows strobe and data signals that can provide three latching scans in accordance with the present invention, FIG. 18 shows how each scan of FIG. 17 can be applied to the whole display in turn, FIG. 19 shows how each of the three latching scans of FIG. 17 can be applied to each line in turn FIG. 20 shows the measured latching response of a ZBD cell, FIG. 21 shows measured defect-to-continuous and continuous-to-defect transitions for a cell comprising regions of different grating pitch, FIG. 22 is a series of photomicrographs showing latching, using multiple scans, of a cell comprising regions of different grating pitch, FIG. 23 plots experimental data of the defect-to-continuous and continuous-to-defect transitions for two regions of a ZBD cell of 0.6 µm and 0.8 µm pitch, FIG. 24 shows photomicrographs of two ZBD cell areas of 0.6 µm and 0.8 µm pitch addressed using the present invention;

FIG. 25 shows the electro-optic response of a double ZBD device,

FIG. 26 shows how a double ZBD device can be addressed using multiple scans from a first blanked state, FIG. 27 shows how a double ZBD device can be addressed using multiple scans from a second blanked state, and FIG. 28 shows an exploded view of a double ZBD device fabricated in accordance with the present invention, FIG. 29 shows the operation of a prior art pi-cell device, FIG. 30 illustrates the operation of a ZBD surface pi-cell of the present invention, FIG. 31 illustrates the operation of another ZBD surface pi-cell of the present invention, FIG. 32 shows in more detail the prior art transition from a splayed state to a bend state, FIG. 33 shows a counter example of a prior art ZBD device in which surface switching does not occur when forming a bend state, FIG. 34 illustrates a pi-cell double ZBD device in accordance with the present invention, FIG. 35 shows examples of substantially non-splayed states, FIG. 36 show various splayed states, FIG. 37 shows the energies of defect and continuous states in a ZBD device, and FIG. 38 shows rms operation of a device of the present invention, FIG. 39 shows a cholesteric device operable in accordance with the present invention, and FIG. 40 shows a multi-layer stack device operable in accordance with the present invention.

Referring to FIG. 6, the principle of the present invention is illustrated. The pulse duration versus voltage plot of FIG. 6 shows the latching properties of a first region 60 and a second region 62 of a bistable device. The first and second regions have different latching energies. For each area, a solid line represents the 90% latched point (i.e. $\tau V_{90\%}$) and a dashed line represents the 10% latched point (i.e. $\tau V_{10\%}$). This nomenclature is well known in the art and is described above with reference to FIG. 3.

In accordance with the invention, the first region 60 and the second region 62 are addressed in separate scans. The selection of the data voltages for the two distinct areas of behaviour are shown in FIG. 6. A first scan using a strobe voltage pulse of $V_{s1}$ is used in combination with a select ($+V_d$) or a non-select ($-V_d$) data voltage pulse to provide selective switching of the first region 60. A second scan using a strobe voltage $V_{s2}$ is used in combination with the select ($+V_d$) or non-select ($-V_d$) data voltage pulse to provide selective switching of the second region 62.

The use of two scans (i.e. the first scan and the second scan) enables the number of electronic drivers needed to address the entire panel to be reduced, and/or allows the use of lower data voltages (albeit with longer line-address-times). The invention thus allows a bistable panel to be latched into the required state with a low data voltage possible and/or with a reduced number of scan electrodes and/or drivers. The approach may be used to compensate variations of the latching response using multiple scans of the display.

The use of two scans (i.e. the first scan and the second scan) in which the first scan comprises an initial blanking pulse may be also be described as a three field multiplexing scheme. In other words, field one is the blanking pulse, field two applies pulses to address regions having a latching threshold within a first range and field three applies pulses to address regions having a latching threshold within a second range. A frame (i.e. the pattern of information written to the display) is thus written by the three fields.

It can thus be seen that the present invention permits discrimination for the two regions using data voltages that are slightly greater than the partial latch width, namely:

$$V_d \geq \left(\frac{|V_{100\%}| - |V_{0\%}|}{2}\right) \text{Area1} \approx \left(\frac{|V_{100\%}| - |V_{0\%}|}{2}\right) \text{Area2} \quad (3)$$

This has the potential to significantly reduce the data voltage towards a minimum of the partial latch width. This lower data voltage reduces power consumption during update and decreased optical transients and growback effects.

If the variations occur on the same scan electrode (whether by design, or because the variations are random), the same data is required to address both areas 1 and 2. This is done by ensuring the higher voltage area (area 1) is addressed first. The signal used to address area 1 into the desired states (say, black for Vs1−Vd and white for Vs1+Vd) is also applied to area 2 on the same row. The parts of the addressed row with the lower threshold (area 2) are latched by either resultant latch, which therefore appear (in this example) white, regardless of the data. In a subsequent scan of the line, however, the strobe voltage is reduced to Vs2, thereby allowing these areas to be addressed. In this subsequent scan, neither resultant (Vs2−Vd nor Vs2+Vd) has sufficient energy to latch area 1, and so the entire row is addressed with the desired image.

FIG. 7 shows a panel designed to exhibit three separate thresholds on each row electrode. The panel has four row electrodes 70a-70d (collectively referred to as row electrodes 70) and eight column electrodes 72a-72h (collectively referred to as column electrodes 72). Row driver electronic 74 and column driver electronics 76 are also provided. The row and column electrodes overlap to provide thirty-two regions which can be separately addressed by application of a voltage to an appropriate row and column. Each row electrode 70 comprises three areas with distinct latching thresholds; a first area 80, a second area 82 and a third area 84.

A cross-sectional view along the line II-II of the panel shown in FIG. 7 is given in FIG. 8. Referring to FIG. 8, an alignment grating forming the first area 80, second area 82 and third area 84 is shown. Also shown is the column electrode 72h, row electrodes 70a and 70b, a lower (homeotropic, mono-stable) alignment layer 86 and optical components 88. The optical components 88 may include polarisers, compensation plates, diffusers and/or reflectors used in any of a number of configurations familiar to those skilled in the art. It should be noted that one or both of the optical components 88 indicated may not be required to implement a certain device configuration.

It should be noted that the areas 80, 82 and 84 may be formed from other methods to alter the thresholds. Such methods include providing holes in the electrodes, alignment variation (e.g. photo-alignment), differences in pretilt, changes of grating shape or anchoring properties. The change may be on the bistable surface, or on the opposed monostable surface.

The dielectric material of the alignment grating forming the first, second and third areas 80, 82 and 84 is selected to be a different thickness in each of the three areas. This changes the cell gap and the voltage applied across the modulating medium (due to voltage drop across the dielectric layer), leading to different latching thresholds in the first, second and third areas 80, 82 and 84. It is assumed that the third area 84 has the highest latching threshold, because the dielectric mismatch of the alignment layer is more significant than the change in cell gap. However, it would be appreciated that it would also be possible to design the cell so that the first area 80 has the highest threshold.

In operation, each of the four rows 70 is sequentially blanked and then scanned three times, with appropriate data synchronously applied to the columns 72. Alternatively, all rows may be blanked initially and simultaneously and subsequently each scanned sequentially, either in turn or in some predetermined sequence. For the first scan of a particular row, the voltage (Vs1) is sufficiently high to indiscriminately latch the two lower threshold areas (i.e. the first and second areas 80 and 82) into one state regardless of the data applied to the column. The data signal, however, combines with Vs1 to either latch the third area 84 into the required state or to leave it unchanged. In the second scan of the row, the applied voltage is reduced to Vs2 chosen so that it latches the first area 80 indiscriminately of the data, whilst leaving the third area 84 unchanged; the second area 82 is discriminately latched according to the data ±Vd. The addressing of the row is completed on the third scan, where Vs3 leaves both the second and third areas 82 and 84 unchanged, but discriminately latches the first area according to the data.

In this fashion, it is possible to reduce the number of electronic drivers needed to address the entire panel. It can thus be seen that three times the number of pixels can be addressed without the cost associated with the additional driver electronics. In the panel described with reference to FIGS. 7 and 8, the image is twelve-by-eight (i.e. ninety-six) pixels, despite only four row electrodes 70 being used. Other advantages include reduction of the interpixel gap (i.e. fewer inter-electrode gaps) and hence improved contrast and reflectivity (i.e. increased aperture ratio for the pixels).

It is should be re-emphasised that the present invention is quite distinct to the various prior art techniques employed to achieve analogue greyscale. The present invention allows the electro-optic response of the device to be varied within a single electrically addressable area (e.g. the area of a overlap of a row and column electrode) by multiple addressing scans. In contrast, with analogue greyscale each data signal is modulated to latch the required proportion of a pixel area. The present invention thus provides a strobe voltage (which is usually a much higher voltage that the data voltage) that is modulated over successive scans. This strobe pulse modulation combined with multiple scans keeps the data voltage relatively low which, as described above, provides a number of benefits. Of course, the present invention may be combined with analogue greyscale techniques to provide a greyscale device with a reduced number of electronic drivers.

The method may also be used to reduce the number of drivers required to produce greyscale by means of spatial dither. In such an arrangement the areas (e.g. areas 80, 82, and 84 of FIG. 7) may be arranged to have different areas within each pixel. For example, the first area 80 may be four times greater in area than the third area 84, whilst the second area 82 may be half that of the third area 84. Such a digital weighting is well known to those skilled in the art of producing linear greyscale with the least number of separately addressable areas. If analogue greyscale levels are also included then a different weighting of areas may be used. For example, if three analogue levels are possible, then a total of twenty-seven greys can be achieved with 1:3:9 weighted areas. This occurs for a single row and column (i.e. a separate electrically addressable area) using the present invention.

In addition to employing the invention with panels that are designed to exhibit multiple-thresholds, multiple modulated scans may be used to compensate for random variations across a panel. This works in an analogous manner to the previous example, except the same data is used for each of the multiple scans. In other words, each scan writes the same data pattern but each scan only selectively latches material with a defined threshold range. In this way, the data is written to all regions of the display with material having a latching threshold within one of the scan ranges.

In practice, the latching curves for random variations across a panel are likely to vary in a continuous fashion, rather than forming two distinct operating areas. However, even in such cases, the display can still advantageously be addressed totally in two scans.

FIG. 9 shows data and strobe voltages suitable for addressing a panel in which there is a continuum of latching transitions. The device can be considered as having a lowest threshold area (curves 90) and a highest threshold area (curves 92). Data pulses ($+V_d$ and $-V_d$) and strobe pulses ($V_{s1}$ and $V_{s2}$) are selected such that the whole display can be addressed by two scans; the first with $V_{s1}$ combined with the required data and the second at $V_{s2}$ with the required data, where $V_{s1} > V_{s2}$.

The result of using two such scans is that the data voltage is (almost) halved, albeit at the expense of a doubled update rate. As described below, some overlap of the resultant voltages may be preferable (e.g. approximately $(\delta V)/2$) to ensure that areas of the cell with switching energies close to the cross over are latched into the desired state.

In the case of a device having the properties shown in FIG. 9, the data voltage required to ensure all areas of the panel are addressed properly is given by:

$$V_d \geq \frac{|V_{100\%}(\text{Max})| - |V_{0\%}(\text{Min})|}{4} \quad (4)$$

This is half the power needed by typical prior art schemes as given by equation (2)

In practice, it is preferable to use $V_d$ slightly higher than the equality of equation (4) to ensure that the whole display is in the desired state. Further reductions of $V_d$ are possible by increasing the number of scans of successively decreasing strobe voltage. In general, for n scans the data voltage is correspondingly reduced by a factor of n:

$$V_d \geq \frac{|V_{100\%}(\text{Max})| - |V_{0\%}(\text{Min})|}{2n} \quad (5)$$

The maximum number of scans that is considered worthwhile is:

$$n = \frac{|V_{100\%}(\text{Max})| - |V_{0\%}(\text{Min})|}{2(|V_{100\%}| - |V_{0\%}|)} \quad (6)$$

where $V_{100}\% - V_0\%$ is the inherent partial latch width of a microscopic region.

With n-line scanning the energy per update is then in the range:

$$\frac{1}{2} nf \cdot C \left(\frac{V_d}{n}\right)^2 \leq E \leq nf \cdot C \left(\frac{V_d}{n}\right)^2 \quad (7)$$

where f is the number of frame updates (e.g. the frequency for a constantly updated device) and C is capacitance. The use of a n times multi-scan approach results in an n times reduction in the energy required to update the display compared to conventional update techniques.

FIG. 10 shows how, for the continuum of transitions shown in FIG. 9, each line can be scanned five times (i.e. with voltages $V_{s1}$, $V_{s2}$, $V_{s3}$, $V_{s4}$, $V_{s5}$) enabling the data voltage to be reduced by almost a factor of five. It should be noted that the highest remaining voltage must be used with each successive scan.

Referring to FIG. 11, it is illustrated how the slot width of the strobe pulse could be changed instead of modulating the strobe voltage Vs between successive scans. In this instance, the longest duration slot is used first, and subsequent scans are successively shorter. To ensure wide operating ranges, a combination of both pulse width (τ) and pulse voltage (V) modulation may be preferred. In addition to alteration of pulse width and duration, changes to the resultant pulse shape and/or altering the delay between pulses may be used to provide the required discrimination.

Referring to FIG. 12, the switching curves of a ZBD device comprising first, second and third areas having different latching properties is shown. A first curve 121, a second curve 122 and a third curve 123 illustrate the voltage and time slot required to latch the device into the continuous state from the defect state in the first, second and third areas respectively. A first curve 121', second curve 122' and third curve 123' illustrate how a negative voltage pulse of a given time slot can latch the device from the continuous state from the defect state. The three different latching areas may be engineered, or may arise from non-uniformities across the device.

Symmetric devices are so-called when the same magnitude (i.e. |τV|) of voltage pulse latches both continuous-to-defect and defect-to-continuous, or where the difference in thresholds remains constant from one transition to another. A three area symmetric ZBD device having the properties shown in FIG. 12 may be latched into the defect state by the following procedure:
(i) Blanking the whole device into the defect state by applying a blanking pulse 124 of negative polarity.
(ii) Applying a $1^{st}$ scan of positive polarity (i.e. to switch from the defect state to the continuous state) with non-select data. This provides a first resultant pulse 126 which leaves the first area (i.e. the area having the first curve 121) unchanged, in the defect state. The second area (i.e. the area having the second curve 122) is partially blanked into the continuous state, and the third area (i.e. the area having the third curve 123) is fully blanked into the continuous state.
(iii) Applying a $2^{nd}$ scan is of negative polarity (i.e. to switch from the continuous state to the defect state) with select data. This provides a second resultant pulse 128 which leaves the first area unchanged, in the defect state. The second and third areas are now fully selected into the defect state.

Thus the device gives the desired final state even though area two was only partially latched to the defect state during the first scan. As an aside, if the data waveform is reversed a blanking pulse 124' would be used to switch the three areas into the continuous state. The first scan would then contain select data to provide a resultant pulse 130 that switches all areas into the defect state, and the second scan would have non-select data providing a resultant pulse 132 that does not switch any of the three areas.

However the above addressing methods assume that any asymmetry between the two transitions (i.e. the continuous-to-defect and defect-to-continuous) remains constant. Variations of offset, cell gap, or the pitch of the grating will result in little or no change to the amount of asymmetry of the device response. However, certain variations (e.g. in the mark to space ratio or shape of the grating) may result in a change to the amount of observed asymmetry.

The effect of asymmetry in latching response on the multi-scan technique of the invention is illustrated in FIG. 13. A first curve 131, a second curve 132 and a third curve 133 illustrate the voltage and time slot required to latch the device into the continuous state from the defect state in first, second and third areas respectively. A first curve 131', second curve 132' and third curve 133' illustrate how a negative voltage pulse of a given time slot can latch the device from the continuous state to the defect state.

The device of FIG. 13 thus has three sample areas that exhibit latching properties with constant asymmetry and with switching voltages equidistant apart. If the strobe and data voltages are selected so that both scans overlap by the partial latching width of the second area (i.e. the curves 132 and 132'), clean switching is observed over the two scans.

FIG. 14 shows an expanded view of the first, second and third curves 131, 131', 132, 132', 133 and 133'. Switching curves 132A and 132A' of a fourth area are now also shown. The fourth area (i.e. curves 132A and 132A') has similar latching properties to the second area (i.e. curves 132 and 132'), but with a variation in the asymmetry of the switching.

It can be seen that if the device is blanked into the defect state by a blanking pulse 134, then a non-select pulse applied during the first scan (i.e. a resultant pulse 136) will partially latch the fourth area into the continuous state. Furthermore, a select pulse applied during the second scan (i.e. resultant pulse 138) will only partially latch the fourth area back into the defect state. If the second area is already partially latched before the second scan is applied, the lower than full-switching voltage may be sufficient to switch the partial state into the defect state; however this will not apply for a large variations in asymmetry, this will not be possible. However, it can be seen that widening the overlap of adjacent scans would resolve this issue.

The basics of the invention are described above. However, in a practical device the invention is likely to be implement using a sequence of addressing pulses to enable the multiple pixels of the device to achieve the desired state. As also described above, prior art schemes include both two-field and blanked addressing. Both types of these types of addressing are possible with the present invention.

The following examples show addressing schemes applied bistable devices capable of being in either state A or state B for a given point in the device. Two points or areas on the cell are considered (i.e. AA, AB, BA or BB), the first requiring a higher threshold to latch than the second (i.e. high, low). It is assumed that a positive voltage (+Vs and +Vd) tend to latch the pixel into state A, whereas a negative voltage (−Vs, −Vd) latch a pixel into state B. In a display device, it will be common for one state to appear reflective or white (say state A) and the other to be dark (say state B). Where the pixel differs from the desired state (i.e. errors), the state is indicated in bold. The aim of the addressing scheme is both to ensure that there are no errors after the addressing sequence is complete and that the desired state is reached in the shortest time (that is, the least number of steps).

To highlight the advantages of the invention, several counter-example addressing sequences will first be considered. Firstly, take the situation shown in table 1 below. This uses a blanking pulse to latch both high and low areas into state B (BB). In the line address period, the first pulse is at amplitude V2 and has positive polarity to latch into state A. Selective latching of the low (second) threshold areas occurs according to whether or not the data is positive; none of the high (first) threshold areas receive pulses of sufficient energy to cause latching. In the second period, +V1 is applied, which combines with the data to latch the high areas into state A or leave them unchanged, depending on the data. However, all of the low areas are latched into state A regardless of the data. If the voltage were −V1 in this period, the low areas would be indiscriminately latched into state B instead. Neither case leads to the desired image, irrespective of starting configuration.

TABLE 1

Blanked low then high/no data inversion

| Initial State | Desired Final State | Blanked into B | Data | +V2 | +V1 |
|---|---|---|---|---|---|
| BB | AA | BB | + | BA | AA |
| BB | BB | BB | − | BB | BA |
| AA | AA | BB | + | BA | AA |
| AA | BB | BB | − | BB | BA |
| BA | AA | BB | + | BA | AA |
| BA | BB | BB | − | BB | BA |
| AB | AA | BB | + | BA | AA |
| AB | BB | BB | − | BB | BA |

In table 2 the last period is at −V2 and no part of the signal is sufficient to latch the high threshold area into the A state. When combined with the same data, this means that the whole of the second period has no effect and is redundant. If the data were to be inverted in the second period, the pixel would be latched to BB, regardless of the initial condition.

TABLE 2

Blanked low/no data inversion

| Initial State | Desired Final State | Blanked into B | Data | +V2 | −V1 |
|---|---|---|---|---|---|
| BB | AA | BB | + | BA | BA |
| BB | BB | BB | − | BB | BB |
| AA | AA | BB | + | BA | BA |
| AA | BB | BB | − | BB | BB |
| BA | AA | BB | + | BA | BA |
| BA | BB | BB | − | BB | BB |
| AB | AA | BB | + | BA | BA |
| AB | BB | BB | − | BB | BB |

Tables 3 and 4 show examples of two-field addressing that do not give the desired results. In table 3, the positive voltages are both applied in the first field and the negative voltages in the second. The second period in each field is redundant. Inverting the data in the second field (as in scheme of table 4) does not reduce the errors.

TABLE 3

Two field high then low/no alternation/no data inversion

| Initial State | Desired Final State | Data | +V1 | +V2 | −V1 | −V2 |
|---|---|---|---|---|---|---|
| BB | AA | + | AA | AA | AB | AB |
| BB | BB | − | BA | BA | BB | BB |
| AA | AA | + | AA | AA | AB | AB |
| AA | BB | − | AA | AA | BB | BB |
| BA | AA | + | AA | AA | AB | AB |
| BA | BB | − | BA | BA | BB | BB |
| AB | AA | + | AA | AA | AB | AB |
| AB | BB | − | AA | AA | BB | BB |

TABLE 4

Two field high then low/no alternation/data inversion

| Initial State | Desired Final State | Data Field 1 | +V1 | +V2 | Data Field 2 | −V1 | −V2 |
|---|---|---|---|---|---|---|---|
| BB | AA | + | AA | AA | − | BB | BB |
| BB | BB | − | BA | BA | + | AB | AB |
| AA | AA | + | AA | AA | − | BB | BB |
| AA | BB | − | AA | AA | + | AB | AB |
| BA | AA | + | AA | AA | − | BB | BB |
| BA | BB | − | BA | BA | + | AB | AB |
| AB | AA | + | AA | AA | − | BB | BB |
| AB | BB | − | AA | AA | + | AB | BB |

Table 5 shows a scheme that uses the sequence of +V1 and −V2 strobes, but still leads to error where the high threshold area is required to latch from an initial state A to the desired state B.

TABLE 5

Single field high then low/alternating polarities/no data inversion

| Initial State | Desired Final State | Data | +V1 | −V2 |
|---|---|---|---|---|
| BB | AA | + | AA | AA |
| BB | BB | − | BA | BB |
| AA | AA | + | AA | AA |
| AA | BB | − | AA | AB |
| BA | AA | + | AA | AA |
| BA | BB | − | BA | BB |
| AB | AA | + | AA | AA |
| AB | BB | − | AA | AB |

Tables 6 to 9 provide examples of how to address two areas with different thresholds according to the present invention. The examples all use the scheme to lower the data voltage required to address the panel and the desired states are either AA or BB (never AB or BA). The same principles apply to cases where the thresholds are deliberately altered to give individually addressable areas, but then the data may vary from one period to the next.

Table 6 shows a simple addressing scheme in that each area is blanked prior to the appropriate addressing signal being applied. Initially there is no restriction on the blank, which is chosen so that the whole panel is in state B, regardless of the initial state. This blank might be applied to all of the rows simultaneously, or it might be limited to one or several lines ahead of the addressing sequence. It may be DC balanced itself, or it might include parts that compensate for the net DC over the whole frame. Data can be applied to the columns to ensure blanking during this period, but the blank pulse will often be applied simultaneous to scan signals on other rows of the display. In such cases, the pulse is designed to latch into one particular state regardless of the data applied to the columns (i.e. the data associated with the scan signals on the other rows).

The blank is followed by the high latching pulse (+V1 in this example) together with the appropriate data on the columns, thereby latching the high threshold areas selectively, and latching the low threshold areas into the opposite state indiscriminately. Once the high threshold areas are addressed, the low threshold areas only must be blanked back to the first state to prepare them for the addressing the low threshold states in the following period. Ideally the blank pulse is selected such that it latches the low threshold areas completely without affecting the high threshold areas that have already been addressed.

TABLE 6

Separate blanks for high then low.

| Initial State | Desired Final State | Blank High (and low) into B | Data | +V1 | Blank low only into B | +V2 |
|---|---|---|---|---|---|---|
| BB | AA | BB | + | AA | AB | AA |
| BB | BB | BB | - | BA | BB | BB |
| AA | AA | BB | + | AA | AB | AA |
| AA | BB | BB | - | BA | BB | BB |
| BA | AA | BB | + | AA | AB | AA |
| BA | BB | BB | - | BA | BB | BB |
| AB | AA | BB | + | AA | AB | AA |
| AB | BB | BB | - | BA | BB | BB |

An alternative, and potentially more advantageous scheme, is shown in table 7. This scheme takes advantage of the fact that the first high switching voltage (+V1) effectively blanks the low threshold areas whilst selectively addressing the high threshold areas. Hence, if the following signal is inverted in polarity (as well as being set to the appropriate amplitude) then it combines with the data to give the desired state. In this fashion, two slots are required to ensure that the lower data addresses both areas.

TABLE 7

Blanked high then low/alternating polarities

| Initial State | Desired Final State | Blank High (and low) into B | Data | +V1 | -V2 |
|---|---|---|---|---|---|
| BB | AA | BB | + | AA | AA |
| BB | BB | BB | - | BA | BB |
| AA | AA | BB | + | AA | AA |
| AA | BB | BB | - | BA | BB |
| BA | AA | BB | + | AA | AA |
| BA | BB | BB | - | BA | BB |
| AB | AA | BB | + | AA | AA |
| AB | BB | BB | - | BA | BB |

Tables 8 and 9 illustrate similar schemes to that shown in table 7, but do not use a blanking pulse, instead using three slots to achieve the desired final states.

TABLE 8

One and a half field high then low/alternating polarities

| Initial State | Desired Final State | Data | +V1 | -V1 | +V2 |
|---|---|---|---|---|---|
| BB | AA | + | AA | AB | AA |
| BB | BB | - | BA | BB | BB |
| AA | AA | + | AA | AB | AA |
| AA | BB | - | AA | BB | BB |
| BA | AA | + | AA | AB | AA |
| BA | BB | - | BA | BB | BB |
| AB | AA | + | AA | AB | AA |
| AB | BB | - | AA | BB | BB |

TABLE 9

One and a half field high then low/alternating polarities

| Initial State | Desired Final State | Data | +V1 | -V1 | +V2 |
|---|---|---|---|---|---|
| BB | AA | + | AA | AA | AA |
| BB | BB | - | BA | BB | BB |
| AA | AA | + | AA | AA | AA |
| AA | BB | - | AA | AB | BB |
| BA | AA | + | AA | AA | AA |
| BA | BB | - | BA | BB | BB |
| AB | AA | + | AA | AA | AA |
| AB | BB | - | AA | AB | BB |

As described above, the addressing sequence described in table 7 above can be used to address each row in a higher number of scans, thereby allowing the data voltage to be reduced further and significantly. Case 10 extends the scheme of case 7 by dividing the range of random thresholds into three (i.e. areas of three distinct thresholds). This illustrates the use of the invention to compensate for random variations.

TABLE 10

Addressing three areas using multiple scanning.

| Initial State | Desired Final State | Blank All into B | Data | +V1 | -V2 | +V3 |
|---|---|---|---|---|---|---|
| BBB | AAA | BBB | + | AAA | AAB | AAA |
| BBB | BBB | BBB | - | BAA | BBB | BBB |
| AAA | AAA | BBB | + | AAA | AAB | AAA |
| AAA | BBB | BBB | - | BAA | BBB | BBB |
| BAA | AAA | BBB | + | AAA | AAB | AAA |
| BAA | BBB | BBB | - | BAA | BBB | BBB |
| BBA etc | AAA | BBB | + | AAA | AAB | AAA |

FIG. 15 shows how the scheme of CASE 10 is used to address 2 rows (scan) divided into three areas with different thresholds, and 8 columns (data), such as that described with reference to FIGS. 7 and 8.

FIG. 15*a* shows a two row (i.e. rows 70*a* and 70*b*) by four column (i.e. columns 72*a*, 72*b*, 72*c*, 72*d*) segment of the display shown in FIGS. 7 and 8. Row 70*a* is blanked black by a resultant blanking pulse produced by application of suitable signals to row 70*a* and the columns 72*a*-72*d*. Row 70*b* remains unchanged by the data signal applied to the column 72*a*-72*d*, represented by the grey status.

FIG. 15*b* shows the high threshold area (i.e. the first area 80) of the upper row being addressed. A select data waveform is applied to column 72*b*, whilst non-select data waveforms are applied to columns 72*a*; 72*c* and 72*d*. The desired pattern is thus written to the pixels of the first area 80 of the row electrode 70*a*. The resultant is sufficient such that the lower threshold areas (i.e. the second area 82 and the third area 84) are indiscriminately blanked white.

In FIG. 15*c*, the strobe voltage is reduced to Vs2 and polarity inverted. This blanks the lowest threshold area (i.e. the third area 84) back to black whilst leaving the highest threshold area (i.e. area 80) unchanged. Only the middle area (i.e. the second area 82) combines with the select and non-select data that are applied to the columns 72*a*-72*d* to give discrimination.

FIG. 15*d* show the third scan in which the voltage is reduced to Vs3 and polarity inverted. This addresses only the lowest threshold area (i.e. the third area 84) to the desired state, whilst leaving both higher threshold areas (i.e. the first area 80 and the second area 82) unchanged. Row 70a is now completely addressed.

FIGS. 15e and 15f shows how the process described above with reference to FIGS. 15a and 15b is repeated for row 70b. In this manner, data can be written to each pixel of the display.

It can thus be seen that despite only requiring drivers to address two rows, a total of six-by-eight pixels are addressed, rather than two-by-eight pixels. For simplicity, monopolar strobe and data signals are shown. It would however be recognised by the skilled person that, in practice, bipolar data may be preferred. For example, ZBD devices may operate better using such bipolar pulses in a frame scan, line scan or section scan arrangement.

The standard rules associated with prior art addressing techniques should generally also be followed when implementing the present invention. For example, the total signal applied to the rows must be DC balanced over a certain period, usually taken to be the complete frame. Also, the data signal should be DC balanced for each line to prevent unwanted latching for certain pixel patterns. Furthermore, the strobe (sometime also termed scan) pulses may be taken to be either bipolar or monopolar as long as the net resultant DC over time is zero. This DC balance prevents breakdown of the liquid crystal material. In fact, it has recently been found that ZBD devices operate better using bipolar pulses. This is due to the poling effect of the leading (non-latching, dc balancing) pulse lowering the latching threshold for the trailing (latching) pulse.

Examples will now be given in which the scan sequence is taken to be continuous for each line, each following on from the other until that line is complete and the next line (in whatever order) is addressed. This combines both the advantages of using bipolar addressing with an addressing scheme of the present invention.

It should be noted that rather than addressing each line in turn, the display may be scanned from top to bottom at the first strobe voltage, followed by subsequent scans of the whole display at a reducing strobe voltages. This arrangement is likely to be advantageous as it allows all of the rows to be connected to a single driver chip and to be scanned at one voltage first, before the total voltage level from that driver is reduced for the following scan, and so on. This enables low cost four level (STN) drivers to be used. In such cases, it may be preferable to ensure that both blank and scan signals are bipolar.

An example of a scheme used to address a single row using the method described in table 7 is shown in FIG. 16. This shows a four slot scheme $(-1, -1, +1, -2)Vs\_(\pm 1, \pm 1, \mp 1, \mp 1)Vd$ wherein the first two slots provide the blanking, and the latter two slots give discriminate latching (1>2). Four slots are required to allow the data signal to be DC balanced. Although selective latching occurs in the last two slots only, the first two slots are used to good effect, providing blanking immediately prior to selection.

The row waveform in this instance is not DC balanced within the line. This can be done using extra pulses either before or after the signal. If timed immediately before the scan signal as shown, the DC balancing pulses act to improve blanking. Alternatively (for example, due to limitations in the waveforms possible from the driver circuit) the whole waveform might be incorporated into a six slot line: $(+2, +1, -1, -1, +1, -2)Vs\_(+1, -1, \pm 1, \pm 1, \mp 1, \mp 1)Vd$.

Referring to FIG. 17, a three scan multiplexing scheme of the present invention is shown. A blanking pulse is followed by first, second and third strobe pulses synchronised with appropriate select or non-select data. The duration of each strobe pulse is reduced from scan to scan and inverted in polarity from the previous strobe pulse.

FIG. 18 shows how the first scan (i.e. the use of the first strobe pulse) can be applied to each line which is then followed by application of the second scan to each line, followed by the application of the third scan to each line. Hence, the entire display receives the first scan, then the second scan and finally the third scan. FIG. 19 show an alternative arrangement in which each line is latched using the three scans before the three scans are applied to the next line.

It should be noted that a combination of the schemes shown in FIGS. 18 and 19 is also possible. For example, consider a ten line display. Lines one to five (say) could be addressed in turn by the first, second and third scans. Subsequently, lines six to ten (say) could then be addressed by the first, second and third scans in turn. Various other combinations could be employed as required, so long as in each frame each separate electrically addressable region receives the first scan, second scan and third scan in the correct order.

The bipolar pulse latching response of a 3.5 μm ZBD cell at 25° C., measured using bipolar pulses, is shown in FIG. 20. This shows the asymmetric latching thresholds, which may require overlapping addressing regions as described. above. Negative fields, with respect to the grating, latch to the continuous state B at lower voltages than positive fields latching to the defect state A. Also indicated are the thresholds for the reverse transition caused by ionic contaminants to the liquid crystal. The voltages may also be variable in order to compensate for global variations, such as those of temperature. Voltages may also be selected to take into account any panel to panel variations.

In order to demonstrate the present invention a test cell has been built. The cell used in this investigation is denoted as cell number Z641, which is a ZBD greyscale cell having a number of areas fabricated using alignment gratings with different pitch and mark to space ratios. However, to illustrate the present invention the areas having fixed mark to space ratio and varied pitch will be considered as these areas have substantially constant asymmetry in the two switching thresholds they exhibit.

Figure 21A:
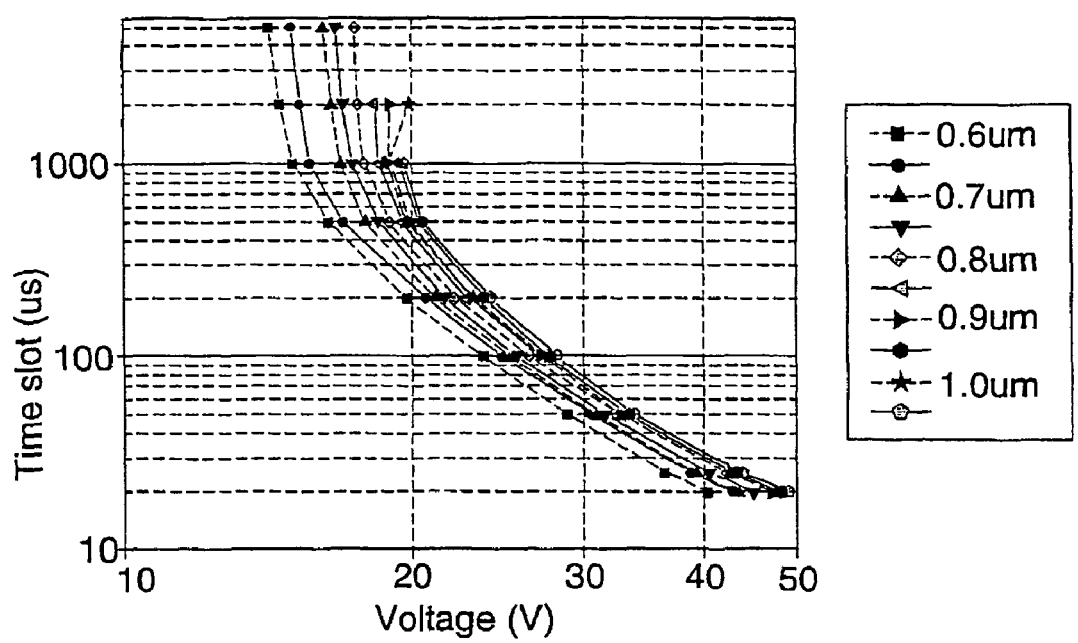
Figure 21B:
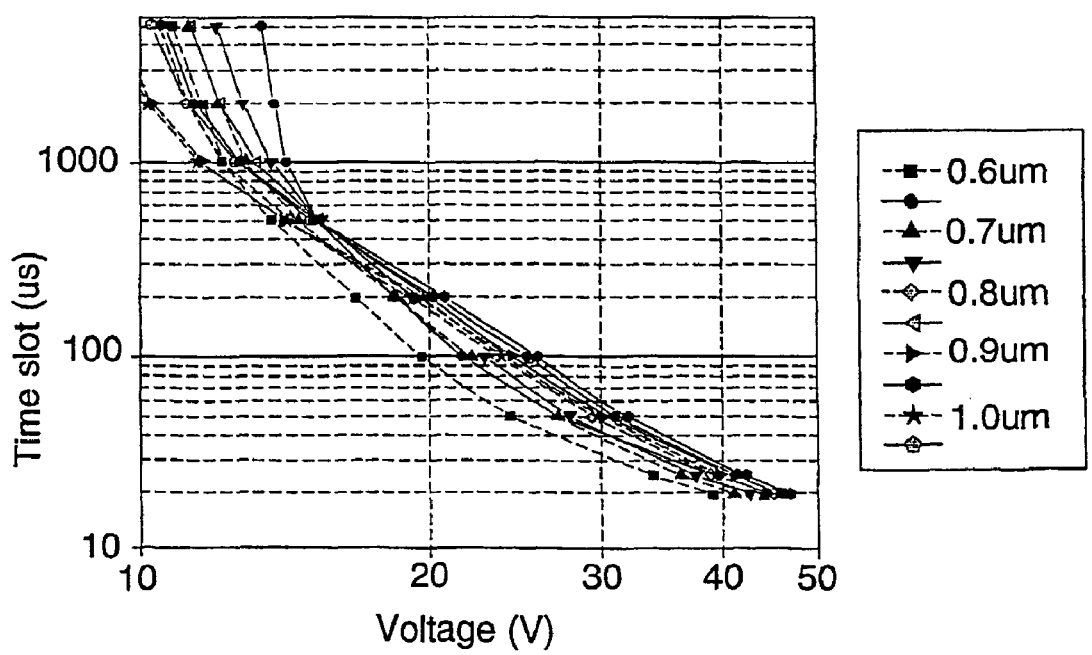

The pitch of the discrete areas in the cell is varied between 0.6 μm and 1.0 μm in 0.1 μm increments, and the resulting latching transitions from all these areas at a temperature of 25° C. are shown in FIG. 21. The dashed and solid lines in the figure show 10% and 90% levels of switching respectively. In particular FIG. 21a shows the various continuous-to-defect latching transitions whilst FIG. 21b shows the various defect-to-continuous transitions.

It can be noted that the width of the bistability window is insufficient for the whole range of grating pitches. This results in growback for the 0.6 μm pitch area, and little or no shift in the transitions on increasing the-pitch from 0.9 μm to 1.0 μm. FIG. 21 shows that the typical partial switch widths vary from 0.4V to 1.1V for the C to D transitions, and 0.7V to 2.1V for the D to C transitions.

The cell is firstly used to demonstrate how multiple scans in accordance with the invention can be used to reduce the data voltage while correcting for non-uniformities in the device switching. Note that the following is carried out on the light-box, in order to observe the whole of the device at any one time. This means that the temperature cannot be controlled, and will be greater than 25° C., therefore resulting in lower switching voltages across all the areas. However the transitions of each grating pitch area will still be shifted in voltage.

If a time slot of 100 μs is selected, then the C to D transition was found to require a data voltage of 2.25V for the transition from C to D, and 2.75V for the transition from D to C, in order to fully switch all areas under the application of a single bipolar pulse. If two scans are applied, with an overlap of 1.0V selected therebetween (note the effect of partial switch widths is discussed above), the first scan switching D to C with voltages $V_s$=19.6V, $V_d$=1.6V, the second switching C to D with voltages $V_s$=19.9V, $V_d$=1.4V, then all of the regions of cell Z641 with fixed mark to space ratio, are addressed fully either into the continuous state or the defect state.

Referring now to FIG. 22, the effect of the multi-scan technique on the test cell is shown. FIG. 22d shows the pitch (in μm) of the grating in the different areas of the test cell.

Figure 22A:
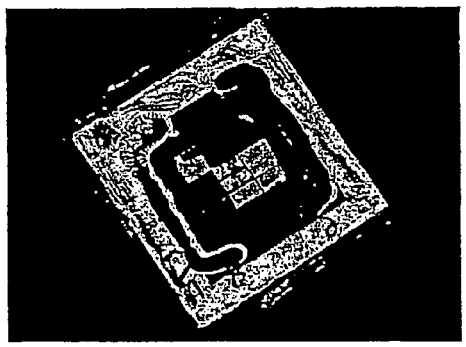

To illustrate the multi-scan technique, the device was initially blanked in the defect state, and then two scans were applied, the first scan with polarity to switch into the continuous state, the second scan with polarity to switch into the defect state. When switching the device to the defect state, the first scan contains non-select data, and the areas with higher threshold voltages remain in the defect state after the first scan as the non-select resultant is insufficient to switch into the continuous state. Other areas however are switching into the continuous state, as their threshold voltages are lower. This is shown in FIG. 22a as areas of shorter pitch (therefore lower threshold voltage) are switched into the continuous (black) state.

It can be seen, e.g. as there is not a clear distinction between the 0.8 μm and 0.9 μm pitch areas, that many non-uniformities are present in the test cell. In addition, a large amount of growback to the defect state is present in the 0.6 μm area, therefore resulting in a greater proportion of the area being in the defect state than should otherwise be the case. A skilled person would appreciate that the number of defects and the level of non-uniformities as present in the test cell would be significantly reduced in any production display.

Figure 22B:
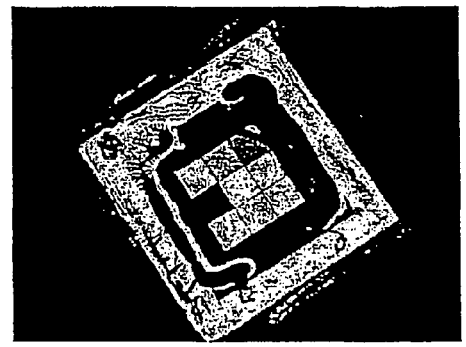
Figure 22C:
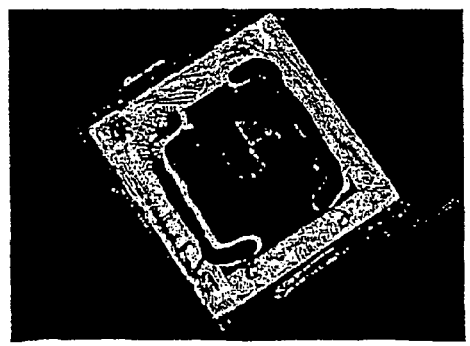
Figure 22D:
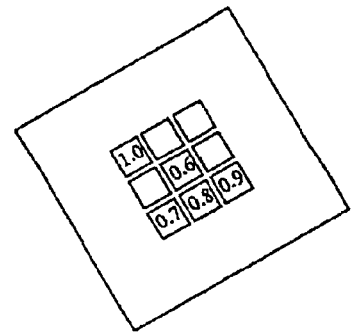

FIG. 22(b) shows the device fully switched after the second scan on switching to the defect state, which incorporates select data in addition to the strobe with polarity to switch defect. This voltage is sufficient to switch the areas into the defect state that were switched continuous in the first scan, and is insufficient to switch the areas defect that were not switched continuous.

On switching the device into the continuous state, the first scan now incorporates select data, which switches all areas into the continuous state, and the second scan incorporates a non-select data, which leaves all areas unchanged in the continuous state. The final state is shown, in FIG. 22(c), although the device is unchanged by the second scan.

It has thus been demonstrated that all the areas of the greyscale cell Z641 of fixed mark-to-space ratio can be addressed using two scans of opposite polarity using data voltage of 1.6V and 1.4V in the first and second scans respectively. This compares with a data voltage of 2.25V that would be required to switch the same areas using a single scan. A reduction in the data voltage of 33% has thus been demonstrated.

It is noted that further reduction in the applied data voltage will be required in order to reduce the data voltage to a level below the Fredericksz transition which is in the region of 1V for this device. However in typical cells (i.e. where the grating is fabricated with a fixed pitch and mark-to-space ratio) the local partial switch width is often 0.5V which is much narrower than the 1-2V different in many cases in the greyscale cell used here. Given such a narrow local partial switch region, data voltages of less than 1V may be used, which is lower than the Fredericksz transition. As described above, reducing the data voltage below the Fredericksz transition prevents display "flash" during addressing.

Figure 23A:
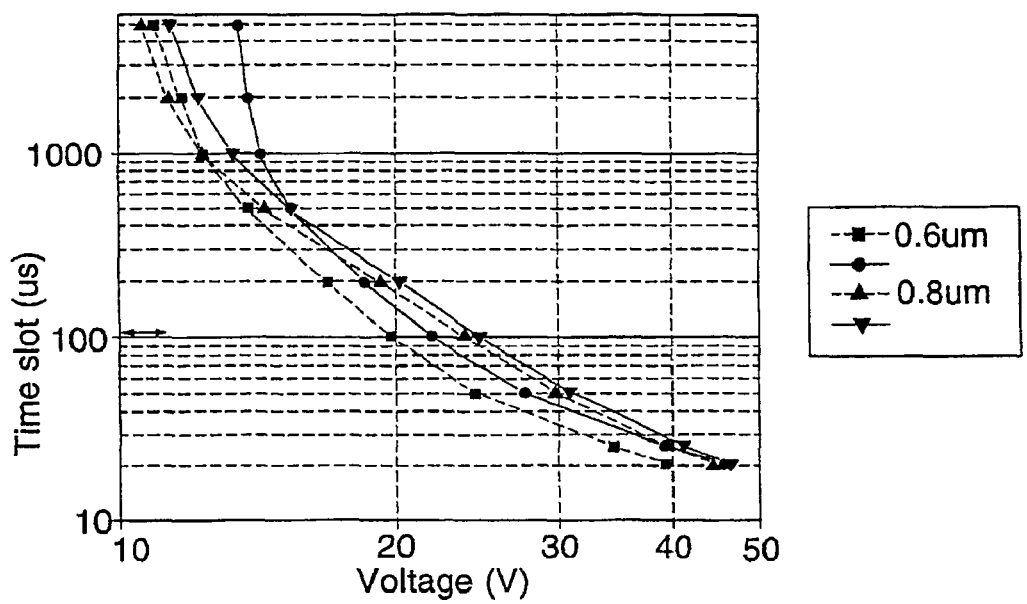
Figure 23B:
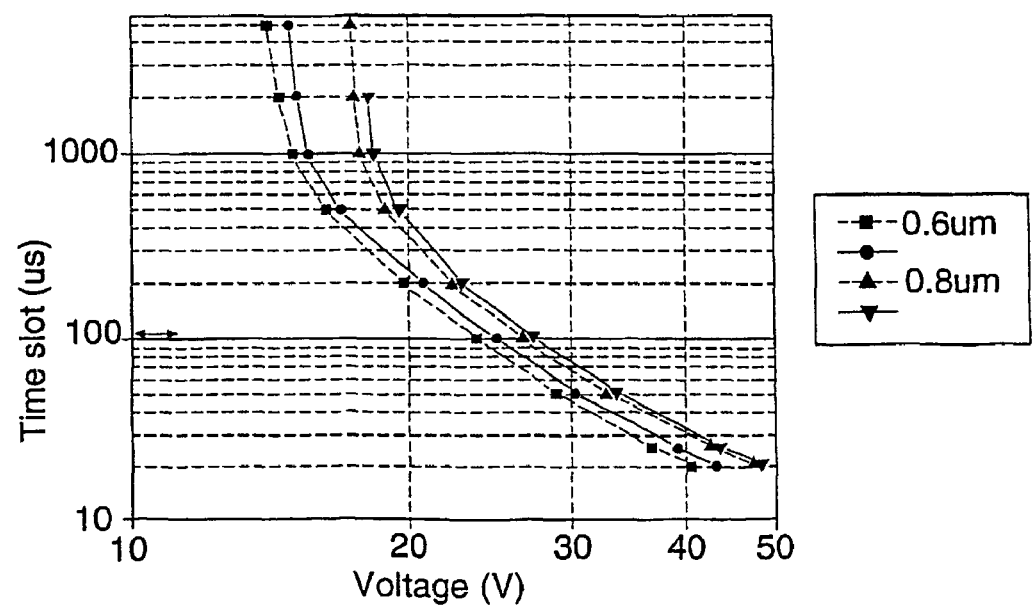

The areas with grating pitch 0.6 μm and 0.8 μm are positioned adjacent to one another on the greyscale device, and therefore allow investigation of the second application of using the present invention to reduce the number of drivers by fabricating areas of different threshold voltage. Now the cell is placed in the temperature stage, and set at a temperature of 25° C. The switching curves of the two areas being considered are shown in FIG. 23. FIG. 23a shows the defect-to-continuous transition for the two areas of the greyscale cell Z641 with 0.6 μm and 0.8 μm grating pitch, whilst FIG. 23b shows the continuous-to-defect transition for the same areas. Dashed and solid lines show 10% and 90% levels of switching respectively. The first scan is defined by the first arrow 200 (FIG. 23a) and the second scan by the second arrow 202 (FIG. 23b).

It can be seen from FIG. 23 that the largest difference in switching voltages for the two areas occurs at a time slot of between 50 μs and 100 μs (with 100 μs being selected as the time slot in this demonstration). If we therefore use the D to C transition as the first scan, with a strobe voltage of 24.5V, and the C to D transition as the second scan with a strobe voltage of 24V, then using a data voltage for both scans of 1V, depending on the combination of select or non-select data waveforms for the two scans we can select 4 separate states.

Figure 24A:
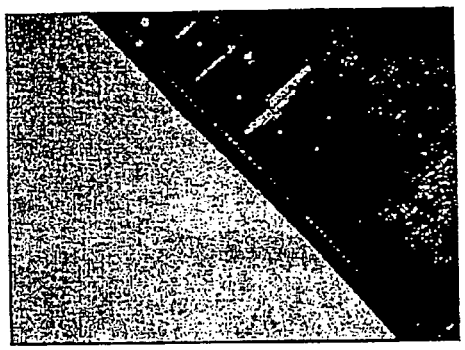
Figure 24B:
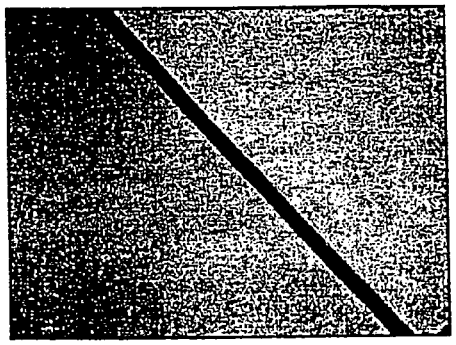
Figure 24C:
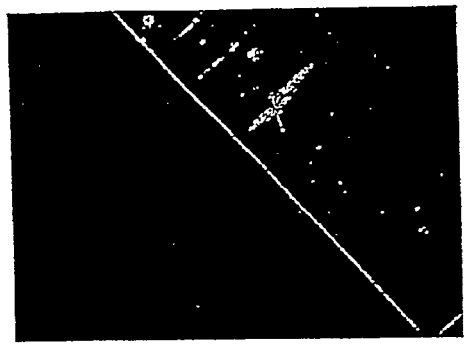
Figure 24D:
Figure 24E:
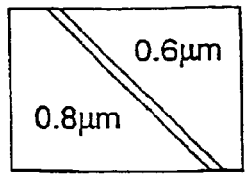

FIGS. 24a-24d are photomicrographs of the 0.6 μm and 0.8 μm regions described with reference to FIG. 23 above. FIG. 24e illustrates the position of the two different regions in the photomicrographs.

The cell is blanked into the defect state to latch both areas white. The defect-to-continuous transition is used as the first scan, with a strobe voltage of −24.5V. The continuous-to-defect transition is the second scan with a strobe voltage of 24V. The first and second scans use a data voltage of 1V. Depending on the combination of select or non-select data waveforms for the two scans, 4 separate states can be selected. FIG. 24a shows 0.6 μm/OFF, 0.8 μm/ON; FIG. 24b shows 0.6 μm/ON, 0.8 μm/ON; FIG. 24c shows 0.6 μm/OFF, 0.8 μm/OFF and FIG. 24d shows 0.6 μm/ON, 0.8 μm/OFF. The definition of the labels shown in FIG. 24 are given as the polarity of the data in the $1^{st}/2^{nd}$ scans, where + data has the same polarity as the corresponding strobe, and − data has the opposite polarity as the corresponding strobe.

Two areas with grating pitch 0.6 μm and 0.8 μm can thus be addressed selectively; using two scans and a 1V data pulse. Depending on the combination of select or non-select waveforms for both scans, four separate states can be selected. This allows the number of drivers to be reduced, for use in either greyscale, or a standard black and white device. This is achieved by fabricating areas of different grating pitch.

The multiscan technique can also be used to ensure operation across a wide temperature range with the need for a temperature sensor. The first scan is arranged to latch material where the threshold is high (e.g. low temperature) and subsequent scans latch material with a threshold in decreasing ranges (i.e. higher temperatures). This removes the requirement temperature sensing circuits and thus reduces costs. The temperature variations may be local or global.

It has thus been demonstrated that a display can be addressed using Multiscan in all cases, provided that the overlap of adjacent alternating scans is sufficient. Given no change in asymmetry of the two transitions across the cell, then this overlap corresponds to the local partial switch width. However if the asymmetry of the two transitions changes, then a larger overlap is required which may reduce the data voltage reduction benefits of the technique.

As outlined above, patent application WO97/14990 describes a zenithally bistable device (ZBD) having an alignment grating on at least one surface. Moreover, WO97/14990 describes the use of a zenithally bistable alignment grating on both surfaces of a device; herein such a device shall be termed a double ZBD device.

Firstly, it has been found that an electric field of a certain polarity applied across a double ZBD cell results in an electric field oriented into one surface, and away from the other. Hence, the field acts to latch one surface from state A to B (say from low tilt, defect state to high tilt, continuous state) whereas the same field tends to latch the opposite surface from B to A.

If the two surface of a double ZBD device are the same, the A to B and B to A transitions of both surface will be the same and hence an applied field will always tend to latch the device into either of the hybrid states AB or BA. In other words, both surfaces will switch at the same applied (negative or positive) voltage and hence only the hybrid states can be selected.

It has been found that a first improved double ZBD can be produced by constructing a device with the same grating on both surfaces, but with each surface arranged so that the transition from low tilt (e.g. state A) to high tilt state (e.g. state B) has a higher threshold energy ($\tau V$) than the reverse transition (B to A). In other words, the transition from A to B occurs at a first magnitude of voltage (but different voltage polarity) for both surfaces whilst the transition from B to A occurs at a second magnitude of voltage (but different voltage polarity) for both surfaces. These so-called asymmetric transitions provide a degree of independent control over switching at each surface.

FIG. 25 shows the measured electro-optic response of a double ZBD device having asymmetric transitions. Curves 221A shows the transition at the first surface (S1) from the high tilt state (state B) to the low tilt state (state A), whilst curves 222B show the transition at the second surface (S2) from the low tilt state (state A) to the high tilt state (state B). Curves 221B shows the transition at the first surface from the low tilt state (state A) to the high tilt state (state B), whilst curves 222A show the transition at the second surface from the high tilt state (state B) to the low tilt state (state A). The dotted lines represent the onset of the transition and full lines are for full latching. The cell had three different optical transmission states, due to the equivalence of the hybrid states AB and BA.

The latching thresholds were measured for bipolar pulses, with latching defined in each case using the trailing pulse. The switching results shown graphically in FIG. 25 are summarised, for 750 µs pulses with data signals of ±3V applied to the columns, in Table 11.

TABLE 11

Results for a double ZBD cell.

| Transition | Onset Voltage | Completion Voltage |
|---|---|---|
| S2 = B to A | −15.2 | −15.8 |
| S1 = A to B | −12.6 | −13.4 |
| S2 = A to B | 12.6 | 13.4 |
| S1 = B to A | 15.2 | 15.8 |

As an example, consider addressing the double ZBD device described with reference to FIG. 22 using an addressing scheme of the type used in the prior art. A first pulse applied to the addressed row of +20V ensures that the S1 is latched into state A and S2 into B (i.e. state AB). Blanking pulses such as this are often applied one or more lines ahead of the appropriate addressing signal. The +20V magnitude is sufficiently high to blank into BA, irrespective of the data applied. This allows data for some previous line to be applied simultaneously to the blank pulse.

After blanking, the row of interest is ready to be addressed. The first pulse of the addressing sequence should be of the opposite polarity to the blank and centred between the asymmetric transition energies. In this example, a pulse of −14V was applied. This latches S1 into the A state and S2 into state B when the data is +3V since the resultant −17V is above both transitions, but leaves both surfaces unchanged for negative data (resultant of −11V).

In the final pulse of the addressing sequence the polarity is inverted and the magnitude is reduced, so that the data causes latching or not of the lower threshold surface, but leaves the higher threshold surface unaffected. In this example, +11V was applied. Where the data is +3V, the voltage drop across the cell is only +8V, and the pixel is unchanged (either AB or BA from the first pulse). If the data is −3V, the +14V resultant latches S2 into state B and the pixel is either AB or BB. However, if the pixel is in the state AB from the first pulse, it will remain so even after the second pulse. The state AA has not been achieved. This addressing sequence is summarised in Table 12 in which the first letter corresponds with S1, the second with S2 and bold letters denote error. It is seen that any attempt to latch S2 into the required A state, will inevitably also latch S1 into state B.

TABLE 12

Example of a prior art addressing sequence applied to double ZBD

| Desired Final State | Blank (+) | Data 1 | −V1 | Data 2 | +V2 |
|---|---|---|---|---|---|
| BB | AB | + | BA | − | BB |
| AB | AB | − | AB | − | AB |
| BA | AB | + | BA | + | BA |
| AA | AB | − | AB | + | AB |

The multi-scan technique described above can be applied to double ZBD when it is arranged for the two surface to have different latching thresholds, irrespective of the resulting tilt in the low pre-tilt state. It is then possible to address the device so that the surface with the higher threshold is selectively latched in a first scan, whilst the surface with the lower threshold is selectively latched in a second scan.

The latching energy of a bistable grating surface may be varied by altering the grating shape (for example, the altering the pitch to depth ratio, the mark to space ratio, or the degree of asymmetry) or surface properties (e.g. surface energy). Providing different top and bottom surfaces leads to a wider addressing window in which selection of the desired state is possible independently of variations or changes of condition. In such cases, the bistable alignment on each surface may be gratings of different shapes, but different grating materials might be used for the two surfaces. Differences of dielectric constant for the two surfaces leads to different electric field profiles at the surface (even for the same grating shape), thereby resulting in different thresholds. Alternatively, the gratings might be coated with different materials, thereby altering the transition thresholds due to differences in surface energy.

A double ZBD device can thus be constructed in which the threshold voltage for a transition on the first surface differs from the threshold voltages of the analogous transitions on the second surface. Because of the reversal of field for the top and bottom surfaces, this may even be achieved using surfaces with equivalent alignment properties top and bottom. In other words, an improved operating window results when asymmetric transitions are used, but the polarities are inverted (i.e. for one surface A to B is lower than B to A, but vice-versa for the other transition).

As an example, consider selection of conditions AA and BB where the first letter represents the higher threshold surface state, and the second letter the lower threshold surface state. The use of multi-scan addressing requires that the higher threshold surface be latched first if required. The first pulse applied to selectively latch the higher threshold surface will always latch the lower threshold surface, thereby leading to a transient hybrid state. This first pulse can followed by a second pulse that may selectively (i.e. according to the data) latch the lower threshold surface, without affecting the condition of the higher threshold surface.

The use of two scans to separately address the top and bottom surfaces allows all four states (AA, AB, BA and BB) to be discriminately selected, as shown in table 13. In this example, $|V1|>|V2|$, a $+V_d$ data pulse latches towards AB whilst a $-V_d$ pulse latches towards BA. In each case, the first letter in table 13 denotes the high threshold surface and the second letter denotes the low threshold surface. It is possible that the negative thresholds and positive thresholds may be reversed, but the same basic principles would still apply.

TABLE 13

Addressing sequence for Dual ZBD according to the present invention.

| Initial State | Desired Final State | Blank (−) | Data 1 | +V.1 | Data 2 | −V2 |
|---|---|---|---|---|---|---|
| BB | Aa | BA | − | AB | + | AA |
| BB | Ba | BA | + | BB | + | BA |
| BB | AB | BA | − | AB | − | AB |
| BB | BB | BA | + | BB | − | BB |
| AA | Aa | BA | − | AB | + | AA |
| AA | Ba | BA | + | BB | + | BA |
| AA | AB | BA | − | AB | − | AB |
| AA | BB | BA | + | BB | − | BB |
| BA | Aa | BA | − | AB | + | AA |
| BA | Ba | BA | + | BB | + | BA |
| BA | AB | BA | − | AB | − | AB |
| BA | BB | BA | + | BB | − | BB |
| AB | Aa | BA | − | AB | + | AA |
| AB | Ba | BA | + | BB | + | BA |
| AB | AB | BA | − | AB | − | AB |
| AB | BB | BA | + | BB | − | BB |

Referring to FIG. 26, the addressing sequence of a dual ZBD in accordance with the present invention is illustrated.

Figure 26E:
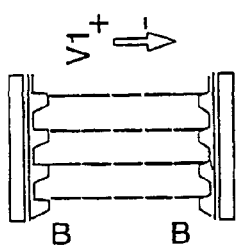
Figure 26F:
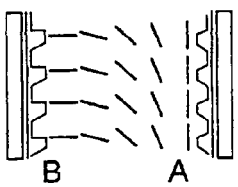
Figure 26G:
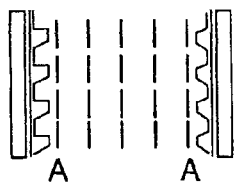
Figure 26H:
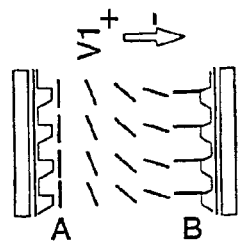
Figure 26C:
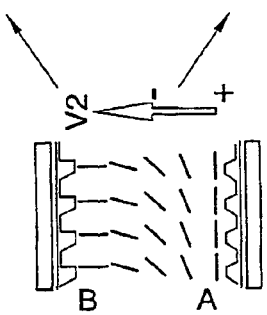
Figure 26D:
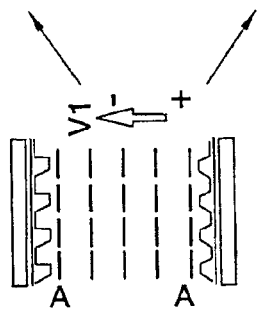
Figure 26B:
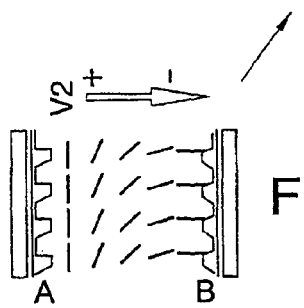
Figure 26A:
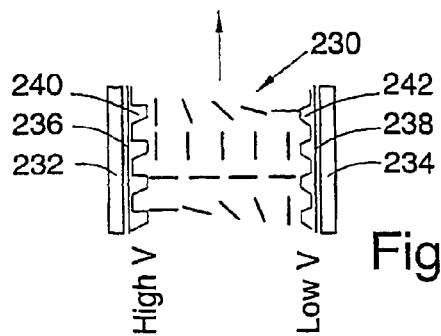

FIG. 26a shows a ZBD cell comprising a nematic liquid crystal layer 230 contained between first and second bounding glass walls 232 and 234. First and second electrodes 236 and 238 are applied to the internal surfaces of the first and second bounding glass walls 232 and 234 respectively. The liquid cell in FIG. 26a can be in any initial configuration; e.g. the mixture of different optical states shown.

A first alignment surface 240 is applied to the first electrode 236 and a second alignment surface 242 is applied to the second electrode 238. Each of the alignment surfaces comprise a surface relief structures (e.g. a grating) that can impart two stable alignment conditions to the nematic liquid crystal material in the vicinity thereof. However, the first alignment surface is arranged to provide latching between the two bistate surface states at a higher voltage threshold than the second surface.

FIG. 26b shows the orientation of the ZBD cell after blanking using a high negative pulse. A hybrid state (i.e. AB) is thus formed.

A first scan is then applied using a positive strobe pulse. If a negative (i.e. select) data pulse is combined with the positive strobe pulse, the resultant pulse is sufficient to latch both the high threshold surface and the low threshold surface; the hybrid state BA shown in FIG. 26c is thus formed. If a positive (i.e. non-select) data pulse is combined with the positive strobe pulse, the resultant is insufficient to latch the high threshold surface but will latch the low threshold surface; the state AA shown in FIG. 26d is thus formed. The first scan thus indiscriminately latches the lower threshold surface, and selectively latches the higher threshold surface.

Once the first scan is complete, a second scan is applied using a negative strobe pulse of a lower magnitude or duration than the positive strobe pulse of the first scan. The second scan is arranged to selectively latch the lower threshold surface, but has no effect on the higher threshold surface.

If the BA state of FIG. 26c was selected during the first scan, the resultant pulse produced during the second scan will latch the lower threshold surface to the state shown in FIG. 26e if a positive (select) data voltage is applied. Application of a non-select data pulse results in the BA state of FIG. 26c being retained as shown in FIG. 26f.

If the AA state of FIG. 26d was selected during the first scan, the resultant pulse produced during the second scan will latch the lower threshold surface to the state shown in FIG. 26h if a positive (select) data voltage is applied. Application of a non-select data pulse results in the AA state of FIG. 26d being retained as shown in FIG. 26g.

In this manner, multiple scans allow the state at the two surfaces of the device to be readily selected. In other words, states AA, BB, AB or BA may be chosen as required. It should be noted that although FIG. 26 shows initial blanking into state AB, it is also possible to use the technique after the device has been blanked into state BA. This is illustrated in FIG. 27.

FIG. 27a shows the liquid crystal material in a mixed configuration. After application of a positive blanking pulse, the hybrid state BA of FIG. 27b is formed. The first scan can either form the BB state of FIG. 27c or the AB state of FIG. 27d. If the BB state is selected in the first scan, this can be retained (FIG. 27e) or the BA state of FIG. 27f can be selected. If the AB state is selected in the first scan, this can be retained (FIG. 27h) or the AA state shown in FIG. 27g can be selected.

A person skilled in the art would recognise that double ZBD devices could be used in various optical arrangements known to those skilled in the art. It should be noted that a good optical response is obtained when state A for both surfaces has zero tilt, and state B has 90° tilt (i.e. parallel to the surface material). For example, a transmissive device could be produced using two polarisers or a single polariser and a reflector could be used to provide a reflective device. The optical characteristic could also be altered using compensation films, colour filters etc. The double ZBD arrangement gives excellent viewing angle characteristics for homeotropic and twisted nematic states.

Referring to FIG. 28, four segments of a double ZBD device are shown. The device comprises a first cell wall 250 and a second cell wall 252 that constrain a layer of nematic liquid crystal material 254. A first row electrode 256 and a second row electrode 258 are provided on the internal surface of the first cell wall 250. A first column electrode 260 and a second column electrode 262 are provided on the internal surface of the second cell wall 252. A first surface alignment grating 264 is provided to align liquid crystal material at the first cell wall 250, and a second alignment grating 266 is provided to align liquid crystal at the second cell wall 252.

The groove directions of the first and second gratings are orthogonal. A pair of polarisers 268 are also provided; one polariser placed either side of the cell and arranged such that their optical axes are orthogonal and lie along the groove direction of the respective surface grating. A backlight 270 is also provided.

The device of FIG. 28 thus contains four separately electrically addressable areas. The liquid crystal in the first electrically addressable area 270 (defined by the overlap of the second row electrode 258 and the second column electrode 262) is shown latched into the BB state and provides a black state. Liquid crystal in the second electrically addressable area 272 (defined by the overlap of the first row electrode 256 and the second column electrode 262) is shown in the BB state and provides a white state.

The A state of the second alignment grating is arranged to give a higher pretilt than the A state of the first alignment grating. Hence, the third electrically addressable area 274 (defined by the overlap of the second row electrode 258 and the first column electrode 260) provides a light grey state when in the AB state. This should be compared to the fourth electrically addressable area 274 (defined by the overlap of the first row electrode 256 and the first column electrode 260) that provides a light grey state when in the BA state.

This transmission difference between AB and BA thus means that four transmission levels are possible as described above. If the optics are chosen carefully, this arrangement may provide a satisfactory viewing angle; note the zero tilt, three state device AA, AB=BA, BB has perfect LCD optics.

It has thus been shown that it is possible to use a zenithal bistable alignment surface on both internal surfaces of an LCD. Designing the surfaces to give different switching thresholds for the two surfaces allows three or four states to be addressed separately. It is preferred that the device uses zenithal bistable grating surfaces arranged with the grating axes aligned at substantially 90° to each other. A second preference is that the low tilt state of the two surfaces is substantially different (although both should have below 60° pretilt from the average surface plane) and the two high tilt states are both in the pretilt range 88° to 90°. Moreover, it has been described how electrical signals can be provided that allow (at least) the device to be latched into both surfaces low tilt, or both surfaces high tilt independently.

Although the double ZBD device described is shown with periodic surface alignment gratings, a surface of the type described in WO 01/40853 may be used as one or both of the zenithally bistability alignment layers. In such alignment layers, the surface alignment of the low tilt state varies significantly from one point on the surface to another. Examples of such surfaces include homeotropic bi-grating, grating grids, or other such gratings, or pseudo-random surface features (pillars or blind holes) with size, shape and spacing in a range that gives zenithal bistability.

It should also be noted that the two scans to switch the two surfaces can be combined with the multiple scans to address different areas across the display. In other words, neighbouring double ZBD region may have different thresholds. This can reduce the data voltage, or reduce the number of electrodes/drivers as described above.

A pi-cell arrangement could also be provided.

Referring to FIG. 29, the principle of operation of a prior art pi-cell is illustrated. The pi-cell device comprises a layer of liquid crystal material 2 contained between a pair of cell walls 4. The walls comprise electrode structures and each wall is pre-treated to align the liquid crystal in contact with the wall in a single and particular direction.

Figure 1:
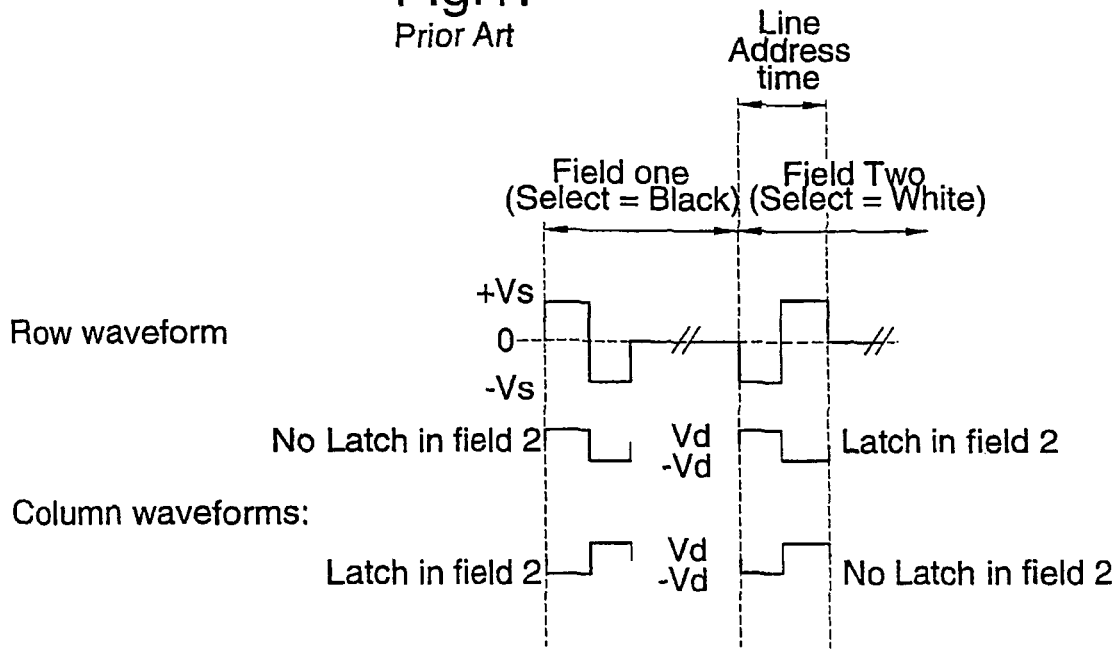
FIG. 1 shows a prior art two-field addressing scheme.
Figure 2:
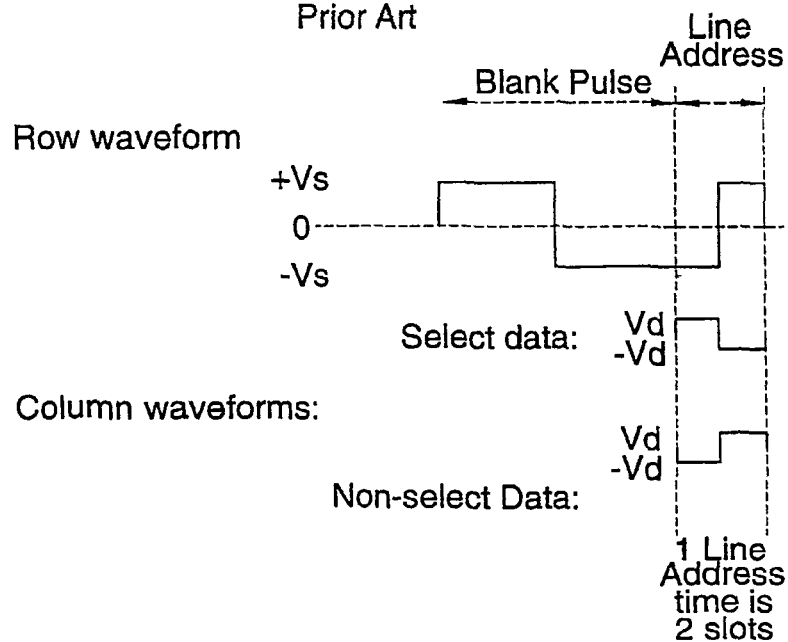
FIG. 2 shows prior art blanked addressing scheme.

In the absence of an applied voltage, the liquid crystal material 2 adopts a splayed configuration shown in FIG. 1a in which the liquid crystal molecules in the centre of the device lie substantially parallel to the cell walls 4. The centre of the device is means a plane parallel to the cell walls, and approximately equi-distant between them. Application of a voltage greater than a certain value allows the liquid crystal material to adopt a first bend (or non-splayed) state as shown in FIG. 1b after a certain time.

In the first bend state, the liquid crystal molecules in the centre of the liquid crystal layer are substantially perpendicular to the cell walls 4. The first bend state is retained after removal of the applied field and may last for periods of a second or longer. Application of a higher voltage causes a second bend (or non-splayed) state to be formed as shown in FIG. 1c, due to the electric field coupling to the positive dielectric anisotropy of the liquid crystal material and reorienting the director normal to the surfaces. The liquid crystal director remains substantially perpendicular to the cell walls 4 at the cell mid-point in the second bend state, and liquid crystal material throughout the remainder of the cell, apart from regions near each surface that are dominated by the anchoring effect of the surfaces, is also forced to lie substantially perpendicular to the cell walls.

The surfaces of the pi-cell are designed to give a pre-tilt of the liquid crystal director that is typically between 5° and 30°. The surface alignment directions are often arranged to be substantially in opposite directions. However, it is possible to result in a desired bend state using parallel or near parallel surface directions using a liquid crystal mixture with a suitable spontaneous twist (i.e. with a certain pitch) and device cell gap.

The pi-cell device provides optical contrast when switched between the first (low voltage) bend state shown in FIG. 29b and the second (high voltage) bend state shown in FIG. 29c. Furthermore, very fast (around 1-2 milliseconds at 25° C. in typical cell gaps of about 4 μm) switching between the first and second bend states can be achieved. However, removal of the applied voltage for a prolonged period of time will cause the liquid crystal material to relax back to the more energetically favourable splayed configuration of FIG. 29a. Switching from the splayed state to the non-splayed (bend) state is much slower than switching between bend states, taking typically 30 seconds or longer A particular disadvantage of known pi-cell configurations is nucleating and stabilising the first bend state for subsequent operation. It has been found that high voltages may be required to initially switch from the splay state to the bend (i.e. non-splayed) state. In certain devices, for example devices in which each pixel is driven by a thin film transistor (TFT), the voltage required to switch from the splay state to the bend state may be difficult to produce, and adds extra cost.

Koma et al (1999) Proceedings of the SID, p 28-31 found that the bend state is nucleated at certain "start points" within each pixel, usually associated with random irregularities, such as surface or electrode roughness. Devices without such nucleation sites did not readily form the desired bend state. It has also been attempted to use a high voltage for sufficient duration to provide a bend state, and to then stabilise the bend state using a polymer stabilisation network. This requires that a UV curable monomer is added to the liquid crystal and which is cross-linked after the formation of the required bend state upon application of the nucleating signal.

However, this has been found to lead to ionic contamination of the liquid crystal material and adds significant fabrication and yield costs A particular problem has also been found to arise when using pixellated pi-cell devices. In such devices, it is not possible to apply sufficient voltages to the inter-pixel gap regions, in particular to the mid-point between adjacent pixels. Hence, the liquid crystal material in the inter-pixel gap remains in the splay state. The presence of the splay state in the inter-pixel gap region tends to promote nucleation of the splay state in any pixels that have been switched into the bend state. U.S. Pat. No. 6,512,569 describes how a patterned inter-pixel gap can be used that promotes the formation of the bend state in the inter-pixel gap region. Just as the bend state does not form when the device has no nuclueation sites, then a device that is switched into the bend state will remain in that state if there are no nucleation sites for the lower energy splay state. Changing the alignment properties in the interpixel gap requires accurate alignment of the patterned alignment regions with the inter-pixel gaps of the electrode structures.

Referring to FIG. 30, a bistable pi-cell device according to the present invention is shown. The device comprises a layer of liquid crystal material 500 sandwiched between a first cell wail 502 and a second cell wall 504.

The internal surface of the first cell wall 502 has a surface profile (not shown) that imparts two stable alignment configurations having different pretilts to the liquid crystal material. The internal surface of the second cell wall carries a monostable surface treatment (e.g. silicon dioxide, an appropriately designed surface relief structure or a suitable prepared polymer surface, such as a rubbed-polymer or a photo-aligned polymer) that imparts a pretilt of less than 45° to the liquid crystal material in the vicinity thereof. Preferably the pre-tilt of the monostable surface is less than 30° and more preferably less than 25°. Preferably, the pre-tilt of the monostable surface is greater than 5° and more preferably greater than 10°.

In operation, the liquid crystal in the vicinity of the first cell wall is latched between the low pretilt (defect) state shown in FIG. 30a and the high pretilt (continuous) state shown in FIG. 30b. It can be seen that the defect state is a bend state, and that the continuous state is a hybrid state in which the splay component is small. Hence, because the device is latching between a bend state and a second substantially non-splayed states, the switching speed is high (typically below 5 milliseconds).

Preferably, the pre-tilt of the low tilt, defect state of the zenithal bistable surface is higher than the pre-tilt on the opposing surface as shown in FIG. 31. In this instance, if an unwanted splayed state is formed, the splay occurs closer to the zenithal bistable surface. Applying a pulse to latch the material adjacent the bistable surface into the high tilt continuous state causes the splay to move closer to the grating surface. The splay is then dissipated rapidly as the surface latches into the high tilt state.

This should be compared to the prior art pi-cell device shown in FIG. 32 in which both surfaces are monostable and the ZBD device shown in FIG. 33 in which the pretilt at the upper and lower surfaces is identical and the transition to a bend state occurs without a surface transition. In these cases, the transition from splay to bend takes significantly longer to occur than is found when surface mediated transitions are used in accordance with this invention.

In this fashion, the device is designed to provide a surface-latching mediated transition to the bend state. Using this surface transition enables the transition from a splay to a bend state to occur in a time that is orders of magnitude quicker than is possible using conventional prior-art pi-cell devices.

For applications where the optical contrast is required to be maintained throughout long periods without addressing (ie. Image storage) the device is designed to eliminate formation of splayed states. This is done by ensuring that there are no nucleation points for splayed states and/or that the energy of the bend states is relatively low (for example, using relatively high pre-tilts on both surfaces).

Other applications, such as those that require a fast update speed with regular updating, the device may be designed to give other important properties, such as wide viewing angle, high transmissivity/reflectivity, high contrast and good (saturated) white state. This may mean that the splay state is significantly lower energy than the bend state, and the device relax into this state after a period that is of similar (but longer) duration to the frame update period. For example, the pre-tilt at both surfaces may be as low as 10°, and may be as low as 5°.

Referring to FIG. 34, a second pi-dell device according to the present invention is shown. The pi-cell device comprises a first cell wall 502 and a second cell wall 506 with a layer of nematic liquid crystal material 500 sandwiched inbetween. The first cell wall 502 and the second cell wall 506 have surface profiles that can each impart, and can be latched between, two alignment states having different pretilt. In other words, a so-called double ZBD device is formed. However, unlike the double ZBD devices described above, the defect state (i.e. the state shown in FIG. 34a) is arranged to form a substantially non-splayed (bend) state.

To enable latching between the two substantially non-splayed states, the latching thresholds at the first and second cell walls are arranged to be different as described above. This allow the multi-scan technique also described above to be used to latch between the two configurations. As latching occurs between two substantially non-splayed states, the switching speed is significantly increased compared with that obtained when latching to/from a splayed state.

Ideally, the device is arranged such that the homeotropic (continuous) state of FIG. 34b is more energetically favourable than any defect state. This is achieved by careful selection of the surface profile of the alignment surfaces. In a pixellated device, this also means that the inter-pixel gap region will tend to form the continuous state of FIG. 34b. This helps to ensure that any liquid crystal material latched from the homeotropic state of FIG. 34b adopts the substantially non-splayed state of FIG. 34a rather then a splayed state. This should be contrasted to convention mono-stable pi-cell devices in which the inter-pixel gap regions relax to the splayed state and thus nucleate growth of the splayed state in the pixel regions.

There are a number of features of the zenithal bistable surface that may be varied to ensure a bistable surface that spontaneously forms a high tilt state on first cooling. In addition to using a shallow grating (eg low amplitude and/or long pitch) such as surface may be provided using rounded features (eg a blazed sinusoidal grating) or a relatively low anchoring energy.

It is also possible to arrange for both of the surfaces to be mono-stable, but one of the surfaces has substantially weaker zenithal anchoring energy, whilst maintaining a low tilt state when undeformed by an applied electric field. An electrical blanking pulse is then used at the outset of each addressing sequence that causes anchoring breaking, aligning the director vertical at the said weakly anchored surface. In this fashion, the bend state is again mediated by a surface transition from a low tilt to a high tilt state. A disadvantage to this type of device, however, is that the alignment properties of the cell are required to be carefully arranged to give the two required states (for example, stable states with different twists).

Although a bistable surface is described above, it would be recognised that a surface comprising three or more states (e.g.

a surface of the type described in WO99/34251) could be used. In such cases intermediate states would be formed that could, for example, allow the implementation of greyscale.

Referring to FIG. 35 a number of substantially non-splayed states are shown.

The states include vertically aligned nematic (VAN), in which both surfaces are substantially vertical homeotropic aligned (i.e. pre-tilts greater than 70°, usually greater than 85°). This is a special case, since the 1D director profile contains neither splay nor bend. A hybrid aligned nematic (HAN) is another non-splayed state in which one surface is high tilt (typically greater than 70°) and one surface is low tilt (typically between 0° and 45°).

Bend states are also non-splayed and B1, B2 and BT are Bend states. Bend state can be defines as a state in which the tilt of the director at some point in the bulk of the cell (i.e. between the two surfaces) is greater than the pretilt at both surfaces. Typically there is a point between the walls where the director is normal to the plane of the cell and the direction of bend changes either side of this condition. In B1 the pretilt at both surfaces are similar, and the tilt is substantially 90° close to the centre of the device. In B1, there is a significant difference in pre-tilt between the two surfaces and the tilt in the bulk of the cell is substantially 90° closer to the higher pre-tilt surface. In the twisted example BT, the director includes a twist deformation from one surface to the other with the director at some point in the bulk of the cell (in this case close to the cell centre) being perpendicular to the cell walls. Switching from HAN to B1 will take typically 2 ms.

Referring to FIG. 36, a number of splayed states are shown. In each of these cases the director in the bulk of the cell includes points at which the tilt is equal to or lower than the higher pre-tilt on one cell wall. Note, S4 is a transient state that may occur on the application of an applied field to an S1 state. Although the director may be at 90° at a point in the bulk of the cell (ie the director aligned parallel to the applied field) either side of this point the director has the same direction of bend. Moreover, there is a point within the bulk of the cell where the director is substantially splayed (close to the bottom surface) and the director is at a lower tilt than either of the two aligning walls. ST is an example of a splayed twist state, where the director in the bulk of the cell is equal or lower to the higher of the two aligning surface pre-tilts.

Referring to FIG. 37, theoretical energies for the continuous and defect states for a blazed sinusoidal grating surface from U.S. Pat. No. 6,249,332. Shaded area shows an example range of grating shapes that give an energy barrier between the continuous and defect surface states and the surface remains bistable. Designing the grating to give spontaneous formation of the C state on first cooling is possible, for example, by using a groove depth to pitch to the left of the cross-over point but within the range for bistability.

A device of the present invention may also be operated as a monostable device, wherein a surface transition is used at the beginning of a sequence of frames to ensure that a Bend state is achieved. This ameliorates the need for high latching voltages, nucleation points for the Bend state and/or long transition periods from a splay to bend.

The device may be in the splay state initially, when it is switched into constant update mode. Before each frame is addressed, perhaps using RMS multiplexing (Alt-Pleshko, MLA, 4-line addressing etc—standard TN or STN methods) or TFT addressing, a series of pulses is applied to latch the device into the required initial substantially non-splayed state. Preferably this initial state is a Bend state. For example, when in the splayed state and initial DC pulse to latch the zenithal bistable surface into the C state induces a HAN state. The director in the middle of the cell is switched quickly to vertical. Then latching to back to the Defect state induces the bend state. Having achieved the bend state in a period of typically about 1 millisecond or quicker, the Bend state may be modulated by the applied field in a similar fashion to a standard pi-cell arrangement (i.e. between the states of FIGS. 29b and 29c).

Alternatively a symmetric grating with two high tilt but opposite pre-tilt defect states may be used. The anchoring transition between these symmetric states enables a direct transition from the splay to bend states.

Alternatively, a weakly anchored surface may be switched vertical, and then the direction of tilt reversed (through suitable balancing of pitch and pretilt) into the bend state In such cases, the shape of the trailing part of the addressing pulse is varied to selectively latch into the required bend state rather than the splay state. This is shown schematically in FIG. 38.

Although the examples described herein are primarily directed to ZBD type devices, it should be appreciated that the invention can also be applied to any of a number of different display technologies including all the prior art display technologies described above. It should also be noted that the term "display" does not necessarily mean that an image is written that can be observed by a user. A display may include spatial light modulators and the like in which amplitude and/or phase modulation is imparted to light.

For example, and with reference to FIG. 39, a droplet based display 800 is shown. The display comprises a pair of cell walls 802 between which a layer of material 804 is located. The layer of material 804 comprises a matrix medium 806 in which first droplets 808 and second droplets 810 are contained. The cell walls 802 are typically glass plates carrying ITO electrodes 812 and having a black background layer 814 on the lower plate (alternatively the lower plate may be made from some other black conductive electrode structure).

The droplets may be formed from a bistable material that reflects some wavelengths in one state and transmits those wavelengths in the second stable state. The device may be arranged to give two different size droplets 808 and 810 such that the threshold to switch one droplet will be different to that of the other droplet. More than two droplet types may be used, and the droplet size may be the same or different as shown.

An example of such a device would use a cholesteric liquid crystal fabricated for example in the fashion of Yang et al (2003) Proceedings of SID XXXIV, Book 2, pp 959-961. The droplets would be sufficiently large to give two stable states—either a selective reflecting substantially planar (Granjean) state or a forward scattering polydomain sample (ie focalconic-like), preferably larger than 15 μm. In the planar state the larger droplet 808 would reflect say red light, but transmit blue and green. In the other state the larger droplet 808 would transmit all wavelengths. The smaller droplet 810 would have a lower threshold than the larger droplet 808 and reflect say green wavelengths in the planar state.

The device may contain a further droplets C (not shown) with a lower wavelength reflected in the planar state. The droplet types are readily formed in an emulsion separately, and then mixed together with a matrix material (in contrast to prior art methods, such as that of Yang et al ibid.).

To provide a colour device, an approximately equal mix of three droplet types is used, but colour balancing and off-axis reflectivity may be enhanced using other mixing ratios. Preferably, the matrix is made from a photopolymerisable or similarly cross linkable material, so that the layer forms a rigid plastic layer. One method to achieve different thresholds for the different droplets is to ensure that the cholesteric compound or mixture within each droplet have different dielectric anisotropies. Other methods include using different sized droplets, using aspherical drops with different eccentricities or alignments, or by varying the interaction between the liquid crystal and the droplet wall using different surfactants or wall materials for each of the droplets.

In accordance with the present invention, three scans may be applied to latch droplet types A, B and C of different threshold. On the first scan, the highest threshold droplets A are either latched into the reflective planar state or into the scattering focal conic state. Since droplets B and C do not reflect red light then if in the scattering state, then when droplets A are in the scattering texture the red light is eventually absorbed by the black at the rear electrode. In the second scan, droplets B are selected by the data into either reflect green or scatter green, leaving the red and blue light un-reflected (and preferably with little scattering). The third scan would select droplets C into either a reflect blue or scatter blue. In this fashion, a full-colour display can be fabricated without the poor reflectivity associated with a spatially divided colour panel or the costs associated with a multiple stack.

Alternative bistable media might include charged particles in which the optical properties differ depending on particle orientation (see, for example, Hattori et al (2003) Proc. SID, pp 846-849.). In such systems, the charge density of the droplets may be controlled to give different thresholds, as well as droplet size, shape and interfacial properties. Such particles will usually cause absorption of light, but will allow different colours to be mixed.

Referring to FIG. 40, the present invention may also be applied to a device that comprises a stack of two or more panels. A stacked device 900 comprises a first panel 902, a second panel 904 and a third panel 906. Each panel is used to modulate light within a certain wavelength range.

The row and column electrodes of each panel are connected to a single set of drivers. In other words, each column driver 908 is electrically connected to a column of each panel and each row driver 910 is electrically connected to a row of each panel. The three panels are arranged to have different threshold of latching. For field effect devices a simple method of altering the latching properties is to vary the cell gap for the different panels. The application of three scans in accordance with the teachings described above thus enables each panel to be latched into the desired state using the single set of driver circuitry. In this manner, a colour display can be constructed from the three panel stack with reduced driver cost.

The invention claimed is:

1. A liquid crystal device comprising:
   first and second cell walls;
   a layer of liquid crystal material disposed between said first and second cell walls, said layer of material being capable of adopting and being electrically latched between at least two stable configurations, said layer of material comprising at least one pixel, said at least one pixel comprising at least one electrically addressable region, each said region comprising:
      a first sub-region arranged to have a latching threshold within a first range; and
      a second sub-region arranged to have a latching threshold with a second range,
   said second range differing from said first range; and
   addressing means for writing to each of said at least one region using voltage pulses to selectively latch said layer of material as required, wherein the addressing means is arranged to write to each said region using at least first and second latching scans, the first latching scan arranged to selectively latch substantially all material in said first sub-region into any one of said at least two stable configurations and the second latching scan arranged to selectively latch substantially all material in said second sub-region into any one of said at least two stable configurations, the configurations of said first and second sub-regions are independent of each other, wherein said first latching scan additionally comprises a blanking waveform to latch all of said material of said region into one of said at least two stable configurations prior to the selective latching of all material in said first sub-region, wherein said first latching scan is applied prior to application of said second latching scan and said second latching scan is insufficient to latch material of said first sub-region.

2. A device according to claim 1 wherein said first latching scan indiscriminately latches material having a latching threshold within said second range.

3. A device according to claim 1 in which the addressing means applies one or more further latching scans after application of said second latching scan, wherein each further latching scan is arranged to selectively latch material having a latching threshold within a given range but is insufficient to latch material having a threshold within the threshold range of any preceding scan.

4. A device according to claim 3 wherein each further latching scan indiscriminately latches any material having a latching threshold within the given range of any subsequent latching scan.

5. A device according to claim 1 wherein the time-voltage product of the voltage pulse of the first latching scan is greater than the time-voltage product of the voltage pulse of the second latching scan.

6. A device according to claim 1 wherein latching of said material is polarity dependent.

7. A device according to claim 6 wherein said first latching scan latches material using a latching pulse of a first polarity and said second scan latches material using a latching pulse of an opposite polarity to the latching pulse of first polarity.

8. A device according to claim 3 wherein each said region comprises at least one further sub-region, said further sub-region having a latching threshold within the given range of one of said further latching scan.

9. A device according to claim 1 wherein the layer of material comprises a plurality of separate electrically addressable regions.

10. A device according to claim 9 wherein each of the plurality of separate electrically addressable regions comprise more than two sub-regions of different latching threshold.

11. A liquid crystal device comprising:
    first and second cell walls;
    a layer of material disposed between said first and second cell walls, said layer of material being capable of adopting and being electrically latched between at least two stable configurations, said layer of material comprising a plurality of pixels, each pixel comprising at least one separate electrically addressable region;
    addressing electronics configured to write to each said region using voltage pulses to selectively latch said layer of material as required, wherein the addressing electronics is configured to write to each said region using at least two latching scans, the first latching scan configured to selectively latch material having a latching threshold within a first range and the second latching scan configured to selectively latch material having a latching threshold within a second range, wherein said first latching scan additionally comprises a blanking waveform to latch all of said material into one of said at least two stable configurations prior to the selective latching of material having a latching threshold within the first range, wherein said first latching scan is applied prior to application of said second latching scan and said second latching scan is insufficient to latch material having a latching threshold within said first range, wherein each pixel comprises two or more sub-regions having different latching thresholds, the stable configurations of each of said two or more sub-regions are independent of another of said two or more sub-regions, wherein the proportion of said layer of material having sub-regions of different latching threshold is weighted within each separate electrically addressable region.

12. A device according to claim 1 wherein row electrodes are provided on said first cell wall and column electrodes are provided on said second cell wall thereby providing a matrix of separately addressable regions.

13. A device according to claim 12 wherein said at least first and second latching scans are applied by the addressing electronics to each separate electrically addressable area by application of strobe voltage pulses to said row electrodes and data voltage pulses to said column electrodes, said strobe and data voltage pulses being arranged to produce the required resultant voltage pulse at each separate electrically addressable region.

14. A device according to claim 13 wherein the addressing electronics supplies a select or non-select data pulse to latch or not latch respectively.

15. A device according to claim 13 wherein each row is addressed in turn with both said first latching scan and said second latching scan.

16. A device according to claim 13 wherein each row is addressed in turn with said first latching scan and subsequently each row is addressed in turn with said second latching scan.

17. A device as claimed in claim 13 wherein the applied data and strobe waveforms are substantially dc balanced.

18. A device according to claim 1 wherein, for each separate electrically addressable region, the addressing means is arranged to latch material having a latching threshold within the second range into the same configuration as material having a latching threshold with the first range.

19. A device according to claim 1 wherein, for each separate electrically addressable region, the addressing means is arranged so as to be capable of selectively latching material having a latching threshold with the second range into a different configuration to material having a latching threshold with the first range.

20. A device according to claim 1 wherein the device comprises a photosensitive layer such that the latching threshold of said layer of material is variable in response to optical illumination.

21. A device according to claim 1 and further comprising one or more colour filter elements.

22. A device according to claim 1 that is capable of adopting, and being electrically latched between, two stable configurations.

23. A device according to claim 1 wherein the liquid crystal comprises nematic liquid crystal material.

24. A device according to claim 1 wherein the transition between said two stable configurations is mediated by an alignment transition at said first cell wall.

25. A device according to claim 24 wherein the surface of the first cell wall that is in contact with said layer of liquid crystal material is profiled so as to provide at least two stable surface alignment configurations of the liquid crystal material in the vicinity of said first cell wall.

26. A device according claim 25 wherein the profiled surface of said first cell wall comprises a bistable surface alignment grating structure.

27. A device according to claim 25 wherein the surface of the second cell wall that is in contact with said layer of nematic liquid crystal material is profiled so as to provide at least two stable surface alignment configurations of the liquid crystal material in the vicinity of said second cell wall.

28. A device according to claim 27 wherein the profiled surface of said second cell wall comprises a bistable surface alignment grating structure.

29. A nematic liquid crystal device comprising:
first and second cell walls;
a layer of nematic liquid crystal material disposed between said first and second cell walls, said layer of material configured to adopt and be electrically latched between at least two stable configurations, said layer of material comprising a plurality of pixels, each pixel comprising at least one separate electrically addressable region; and
addressing means for writing to said electrically addressable region using voltage pulses to selectively latch said layer of material as required, wherein the addressing means is configured to write to each of said at least one separate electrically addressable region using at least two latching scans, the first latching scan configured to selectively latch material having a latching threshold within a first range and the second latching scan configured to selectively latch material having a latching threshold within a second range into any one of said at least two stable configurations, wherein the configurations of said material having a latching threshold within a first range and said material having a latching threshold within a second range are independent of each other, wherein said first latching scan additionally comprises a blanking waveform to latch all of said material into one of said at least two stable configurations prior to the selective latching of material having a latching threshold within the first range, wherein said first latching scan is applied prior to application of said second latching scan and said second latching scan is insufficient to latch material having a latching threshold within said first range, wherein the transition between said two stable configurations is mediated by an alignment transition at said first cell wall, wherein the surface of the first cell wall that is in contact with said layer of liquid crystal material is profiled so as to provide within each pixel at least two stable surface alignment configurations of the liquid crystal material in the vicinity of said first cell wall, wherein the surface of the second cell wall that is in contact with said layer of nematic liquid crystal material is profiled so as to provide within each said pixel at least two stable surface alignment configurations of the liquid crystal material in the vicinity of said second cell wall, wherein within each said pixel the latching threshold between the at least two stable surface alignment configurations of the liquid crystal material at said first cell wall are greater than the latching threshold between the at least two stable surface alignment configurations of the liquid crystal material at said second cell wall.

30. A device according to claim 29 wherein the latching threshold of the liquid crystal material at said first cell wall falls within said first range and the latching threshold of the liquid crystal material at said second cell wall falls within said second range.

31. A device according to claim 1 wherein said layer of material comprises electrophoretic components.

32. A device according to claim 1 wherein said layer of material comprises droplets of bistable liquid crystal material in a carrier matrix.

33. A device according to claim 32 wherein said droplets are coloured.

34. A device according to claim 32 wherein said bistable liquid crystal material comprises droplets of cholesteric material.

35. A device according to claim 32 wherein said bistable liquid crystal material comprises particulates.

36. A device according to claim 1 having a first layer of liquid crystal material and additionally comprising one or more further layers of material, each of said further layers of material being disposed between a pair of cell walls and comprising at least one separate electrically addressable region, wherein each separate electrically addressable region of each of said further layers of material are electrically connected to said addressing means in parallel with one of the electrically addressable regions of said layer of material.

37. A device according to claim 36 wherein the first layer of material and said one or more further layers of material are arranged in an optical stack.

38. A method of addressing a display device that comprises a constrained layer of liquid crystal material configured to adopt, and be electrically latched between, at least two stable configurations, said layer of material having at least one pixel, said at least one pixel comprising at least one separate electrically addressable region, said at least one region comprising a first sub-region configured to have a latching threshold within a first range and a second sub-region configured to have a latching threshold within a second range, said second range differing from said first range, said method comprising the steps of,
 (a) addressing each separate electrically addressable region of said display device with a first latching scan to selectively latch substantially all material having a latching threshold within said first range into a first desired stable configuration, and
 (b) subsequently addressing each separate electrically addressable region of said display device with a second latching scan to selectively latch substantially all material having a latching threshold within said second range into a second desired stable configuration, said first and second desired stable configurations are independent of each other, wherein said first latching scan indiscriminately latches material having a latching threshold within said second range into one of said at least two stable configurations and said second latching scan is insufficient to latch material having a threshold within said first range.

39. A method according to claim 38 and additionally comprising the step, after the steps of addressing said device with said first and second latching scans, of addressing said display with one or more further latching scans, each further latching scan being arranged to selectively latch material having a latching threshold within a given energy range wherein the upper energy of said given energy range is lower than the upper energy of the energy range of the preceding latching scan.

40. A method according to claim 38 in which the device comprises a plurality of separate electrically addressable areas.

\* \* \* \* \*